Figure 1:
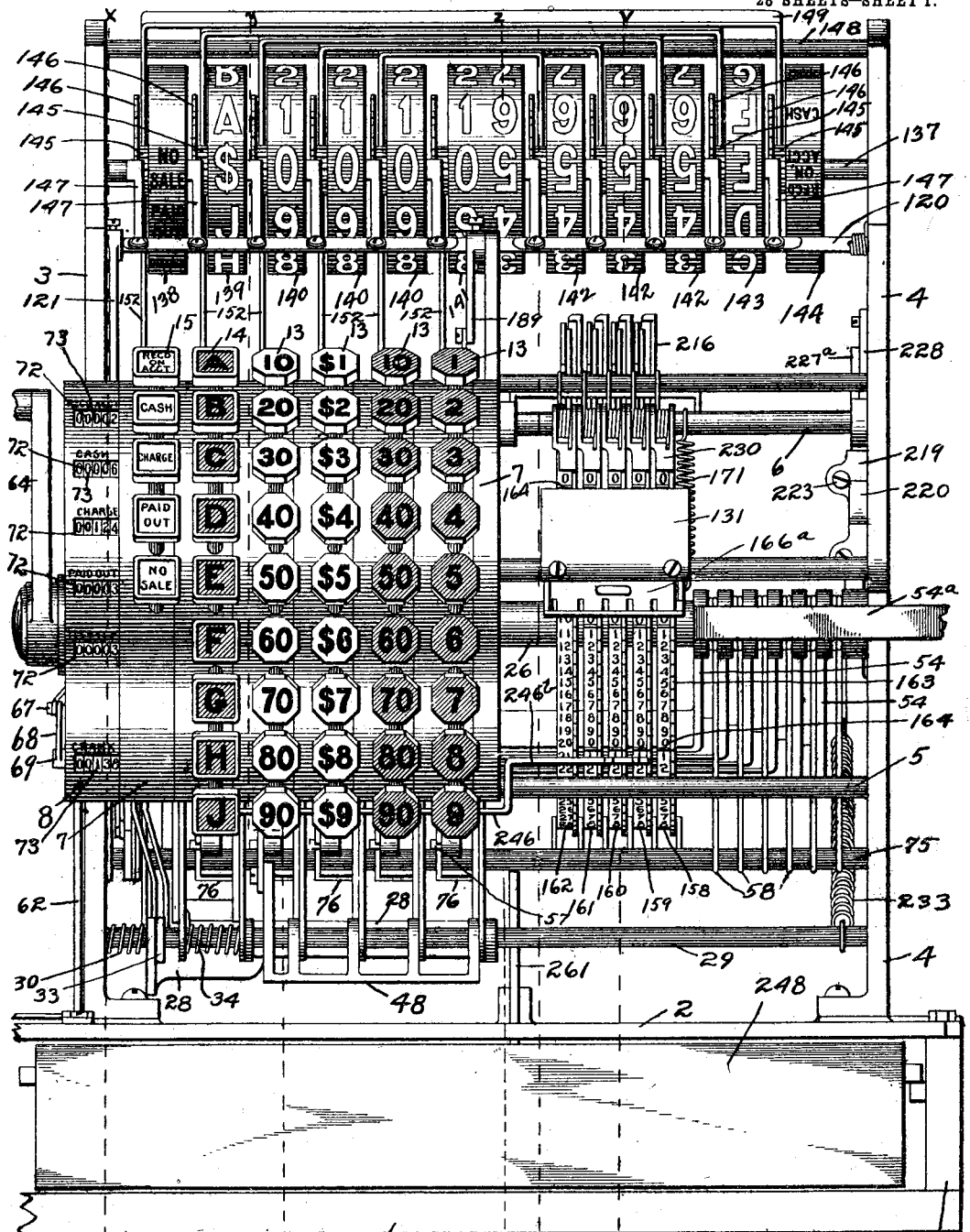

H. S. HALLWOOD.
CASH REGISTER.
APPLICATION FILED SEPT. 1, 1900.

1,085,680.

Patented Feb. 3, 1914.

28 SHEETS—SHEET 1.

WITNESSES:

INVENTOR
Henry S. Hallwood
BY
ATTORNEY

H. S. HALLWOOD.
CASH REGISTER.
APPLICATION FILED SEPT. 1, 1900.

1,085,680.

Patented Feb. 3, 1914.
28 SHEETS—SHEET 3.

H. S. HALLWOOD.
CASH REGISTER.
APPLICATION FILED SEPT. 1, 1900.

1,085,680.

Patented Feb. 3, 1914.
28 SHEETS—SHEET 4.

H. S. HALLWOOD.
CASH REGISTER.
APPLICATION FILED SEPT. 1, 1900.

1,085,680.

Patented Feb. 3, 1914.

28 SHEETS—SHEET 5.

WITNESSES:
H. B. Bradshaw
J. H. Frank

INVENTOR
Henry S. Hallwood
BY
C. C. Shepherd
ATTORNEY

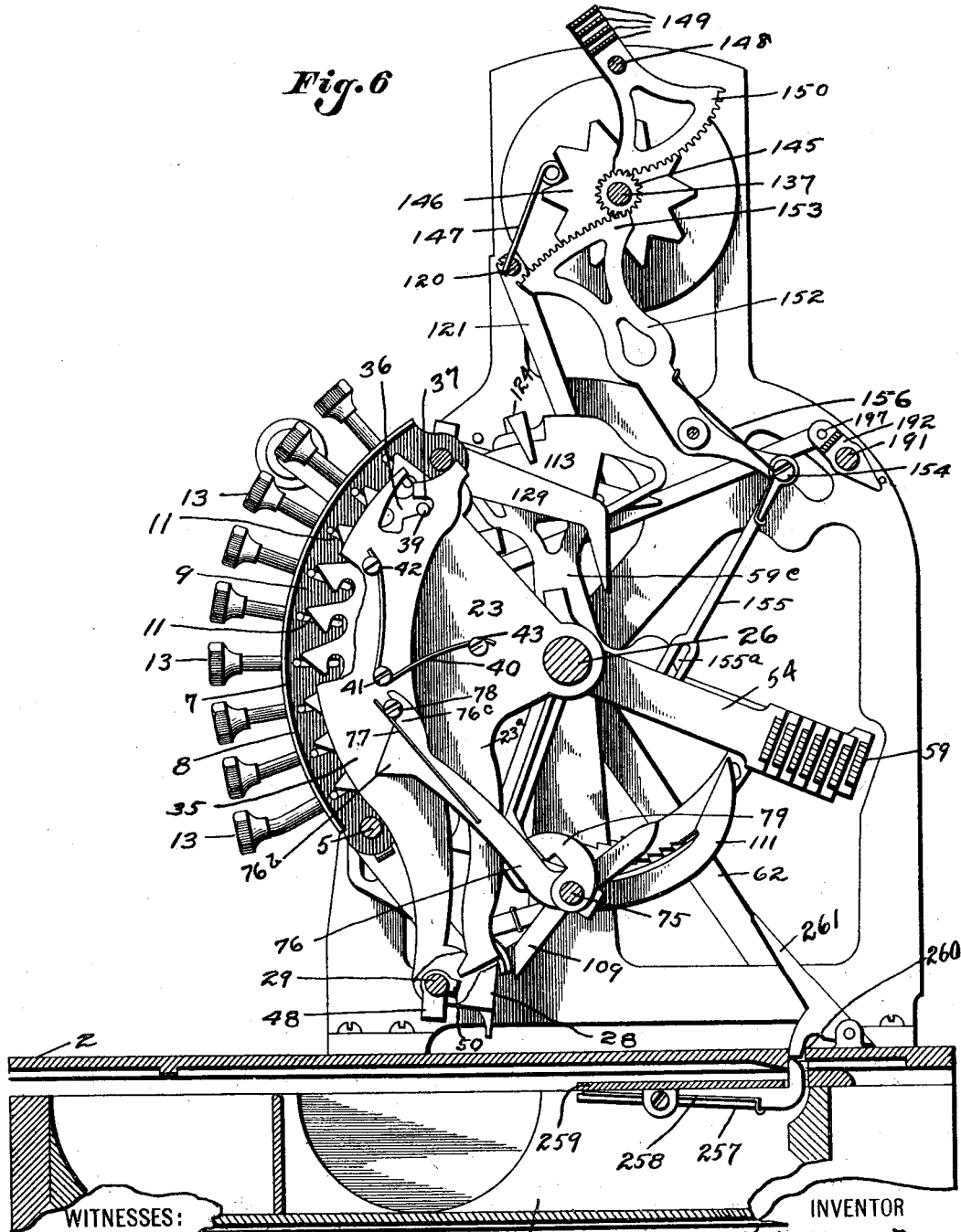

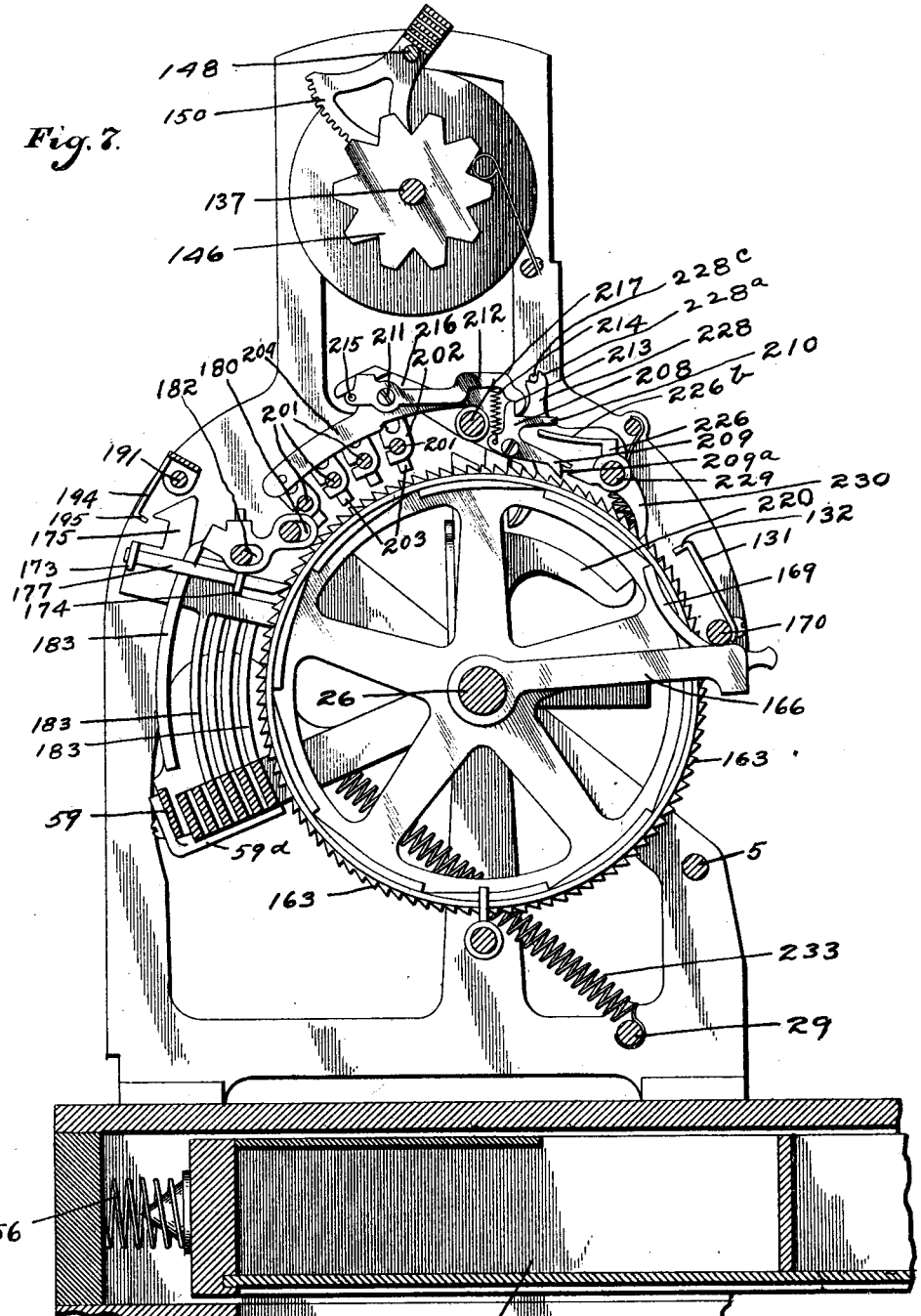

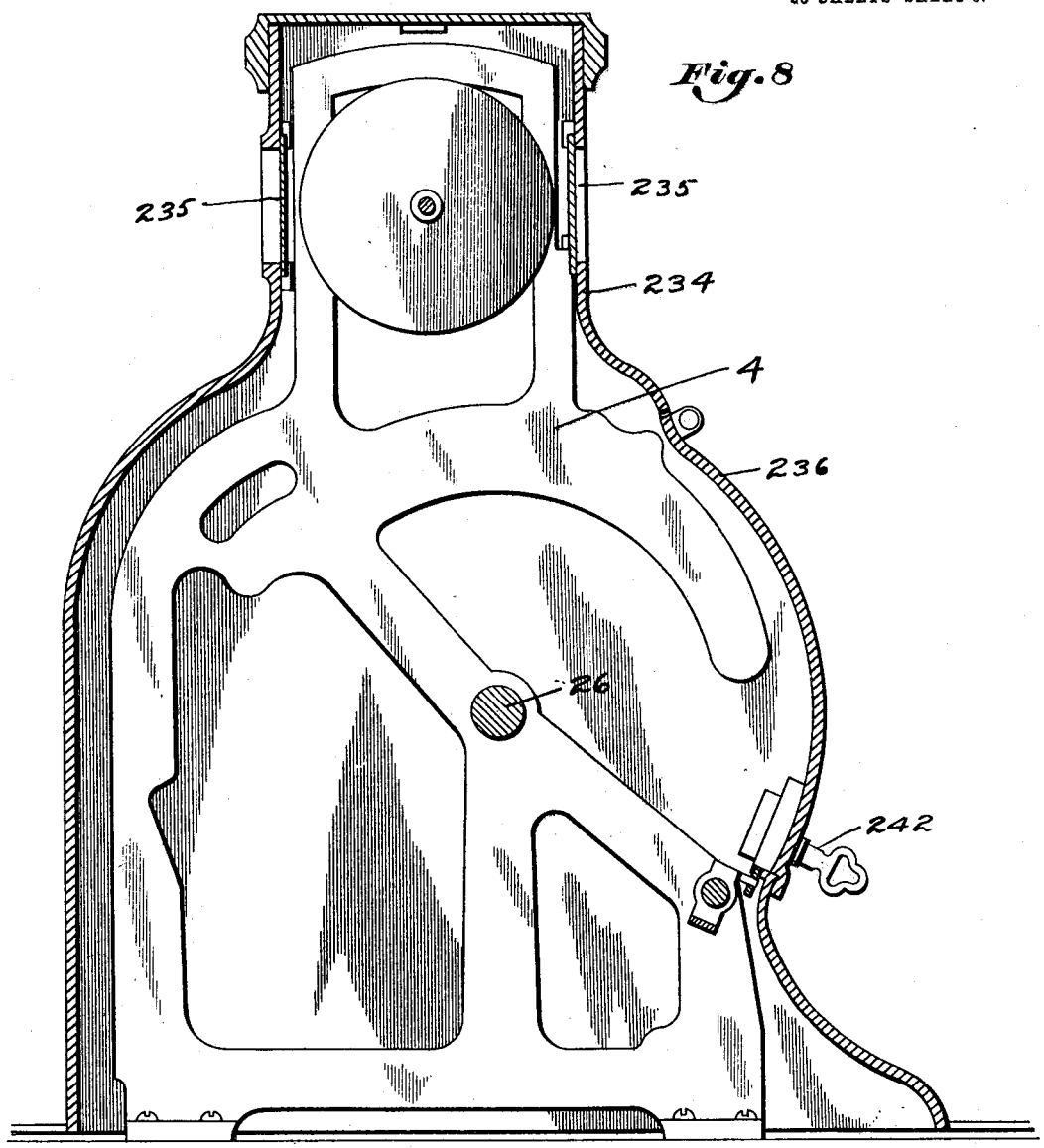

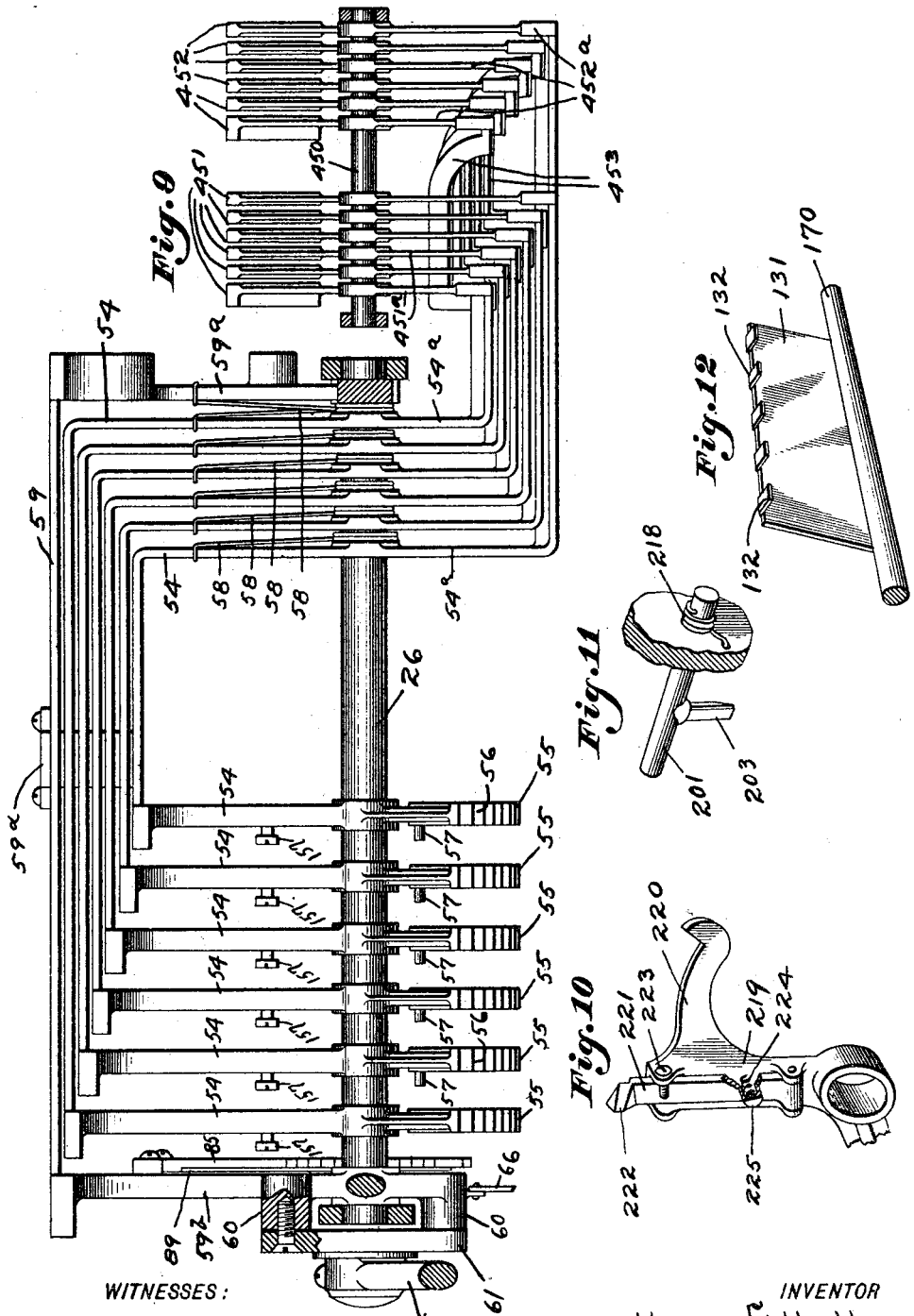

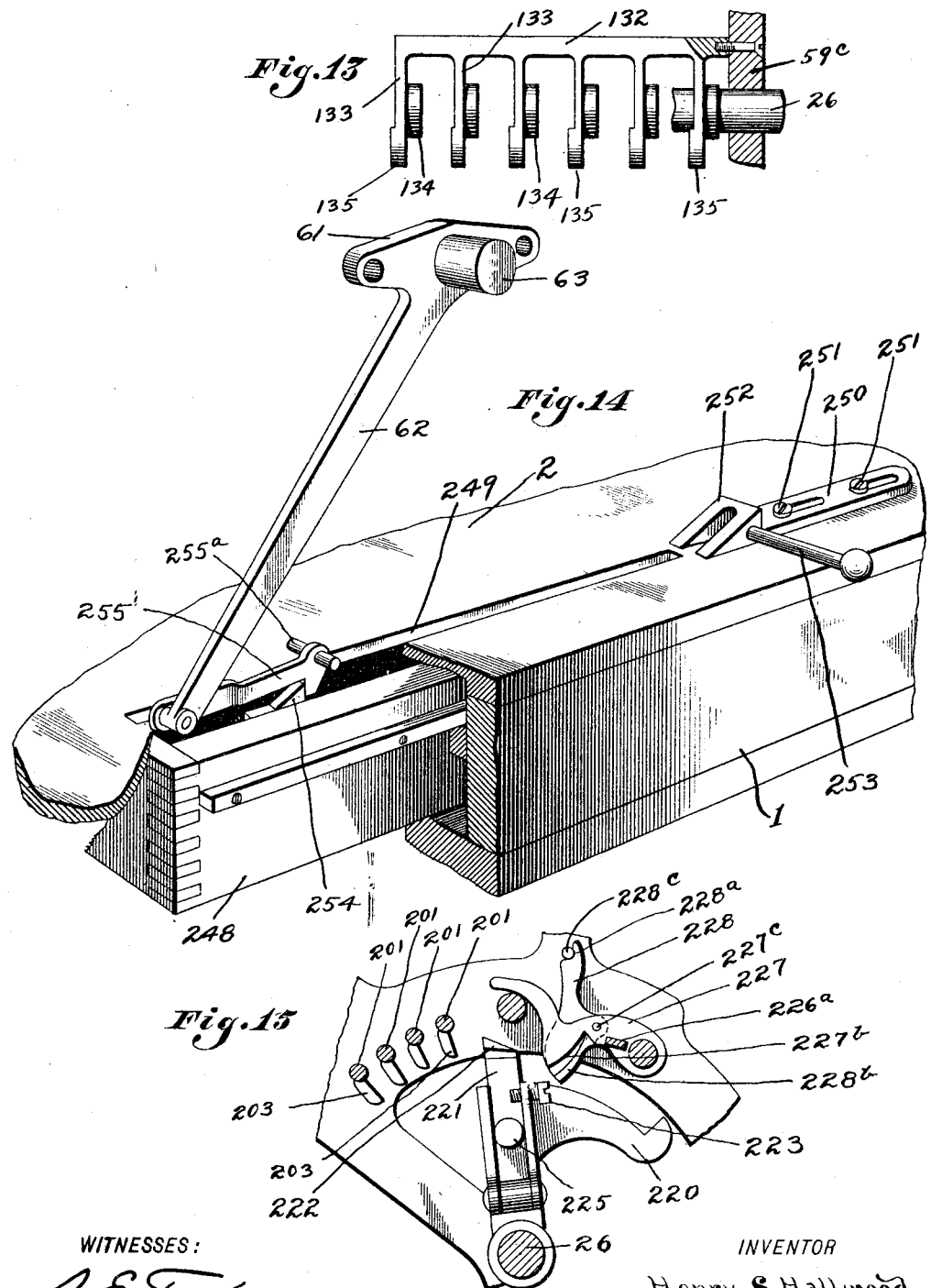

H. S. HALLWOOD.
CASH REGISTER.
APPLICATION FILED SEPT. 1, 1900.
1,085,680.
Patented Feb. 3, 1914.
28 SHEETS—SHEET 11.
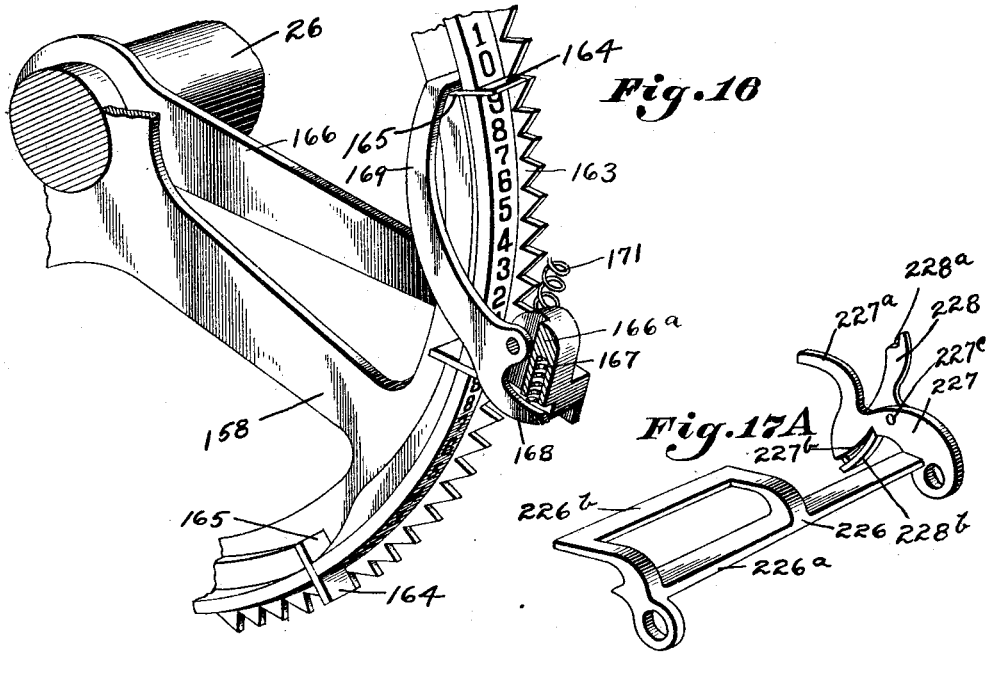
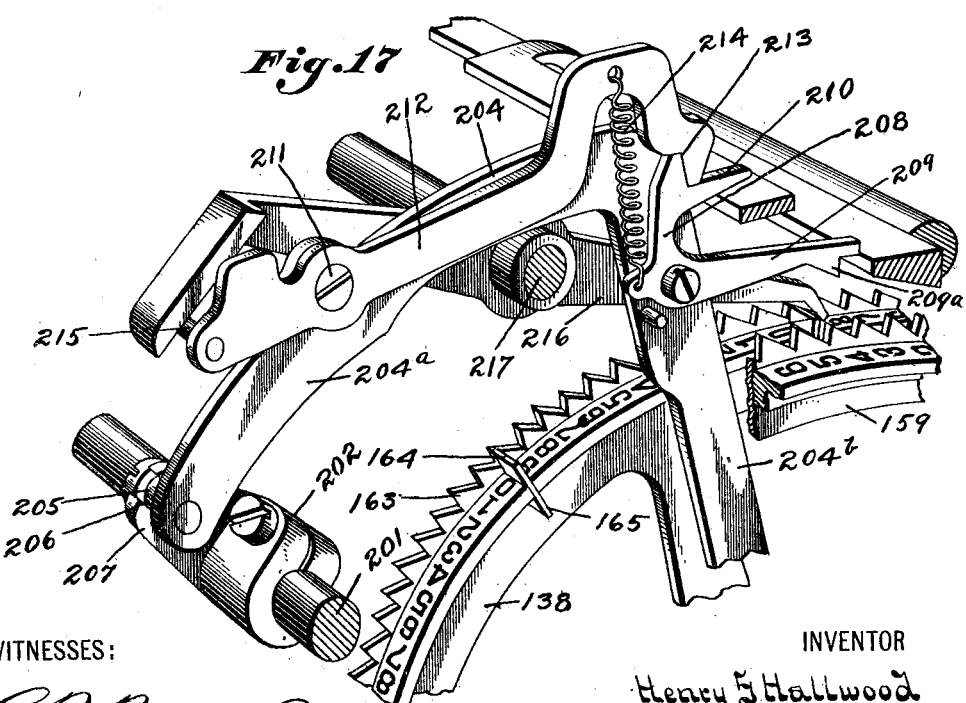
WITNESSES:
INVENTOR
Henry S Hallwood
BY
C. C. Shepherd
ATTORNEY

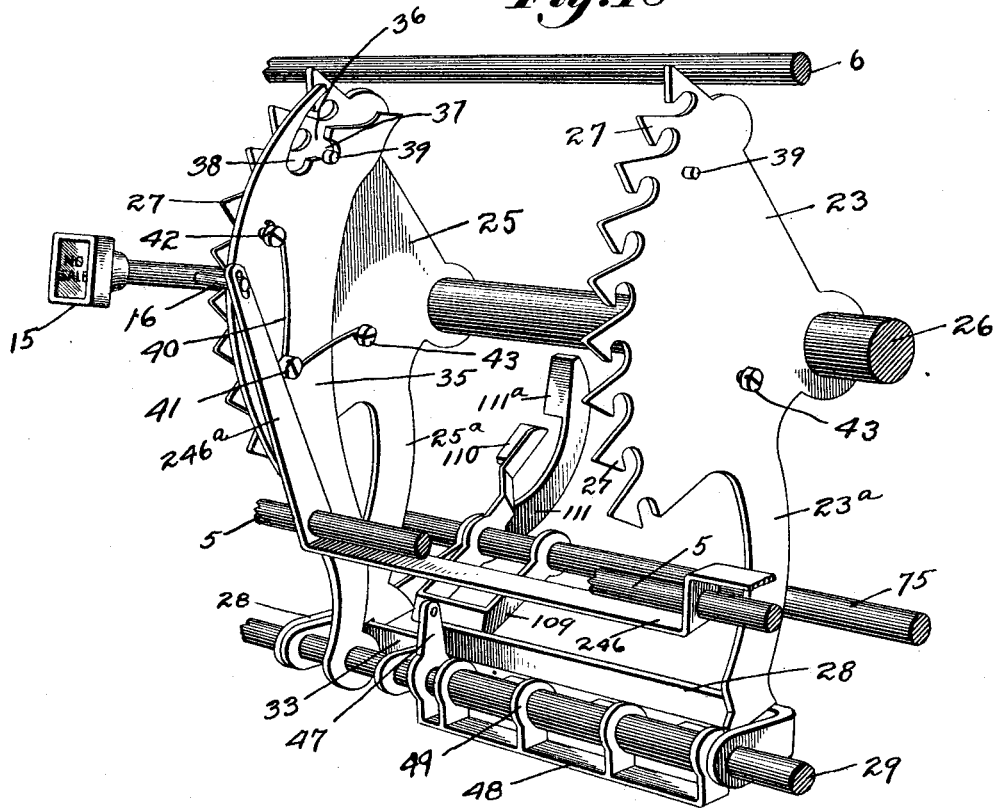
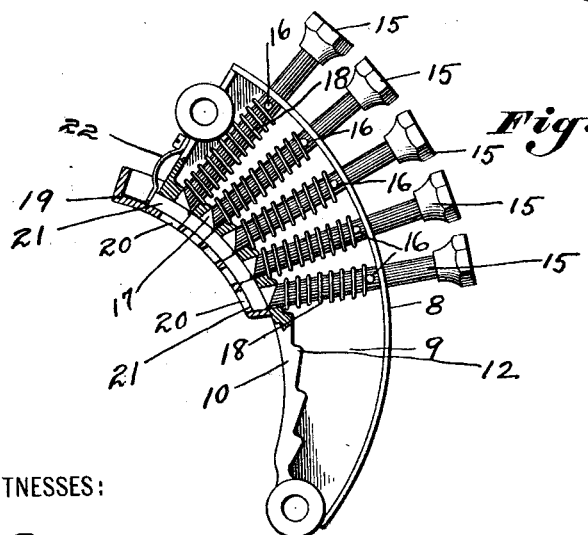

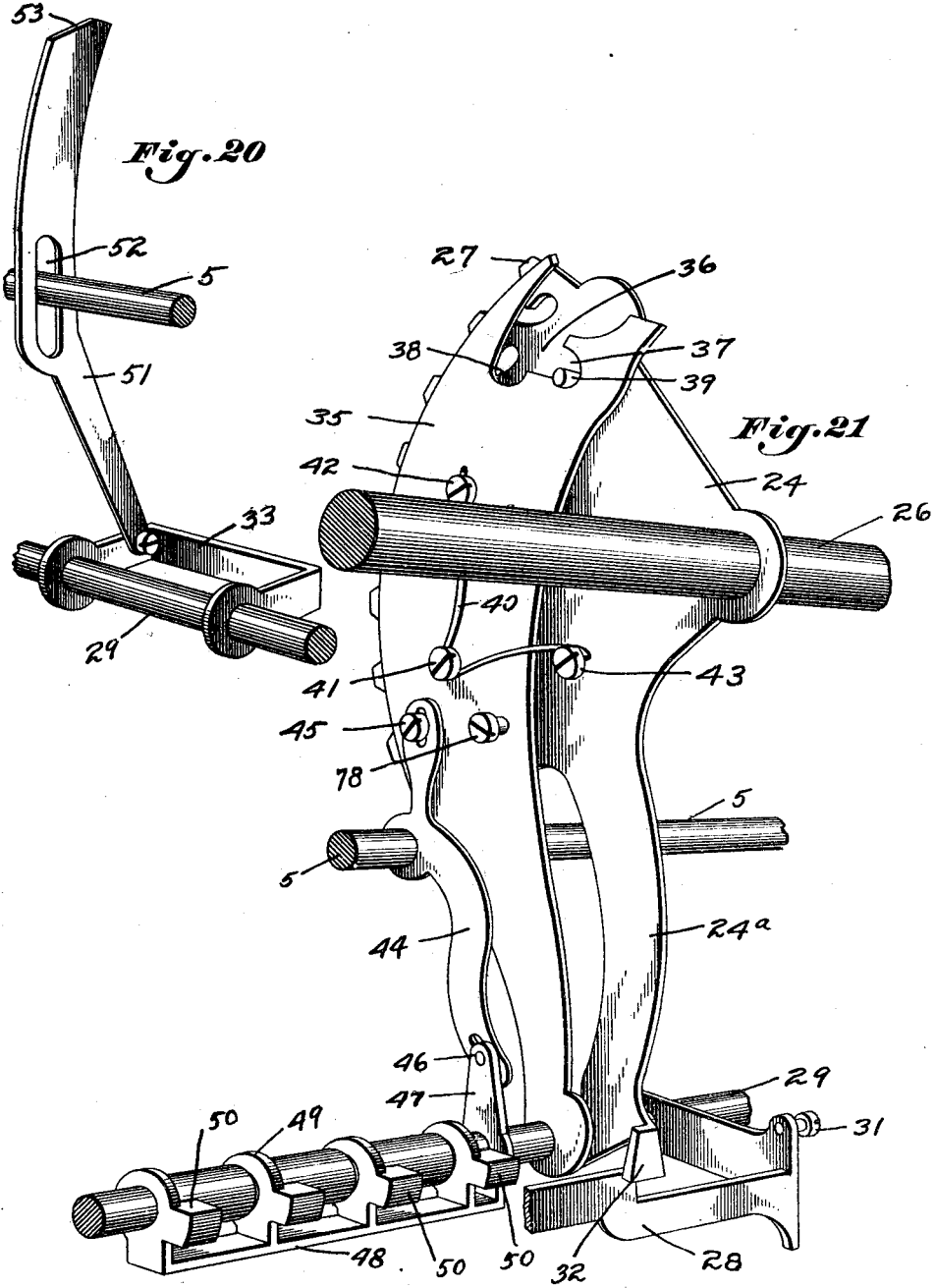

H. S. HALLWOOD.
CASH REGISTER.
APPLICATION FILED SEPT. 1, 1900.
1,085,680.
Patented Feb. 3, 1914.
28 SHEETS—SHEET 14.
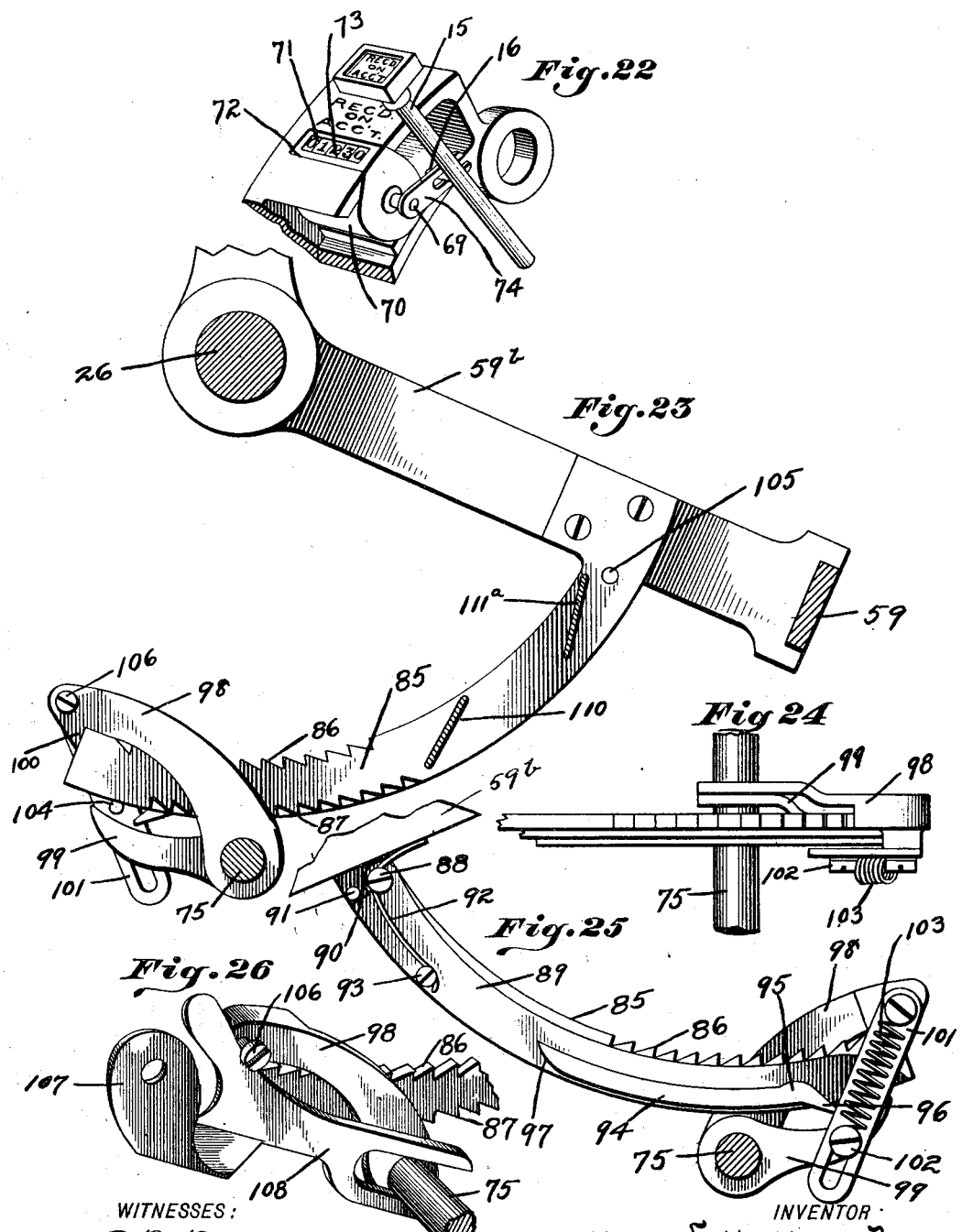

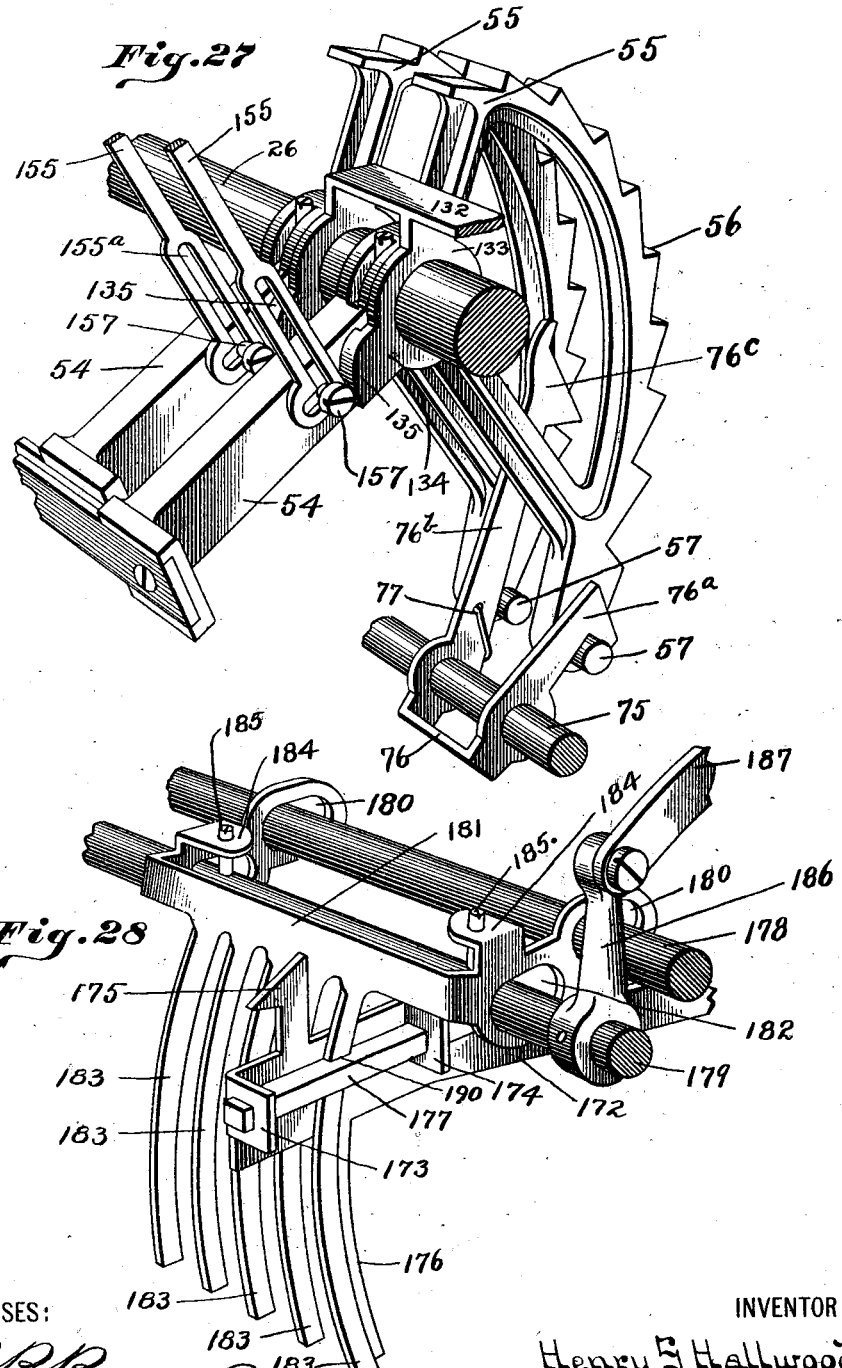

H. S. HALLWOOD.
CASH REGISTER.
APPLICATION FILED SEPT. 1, 1900.
1,085,680.
Patented Feb. 3, 1914.
28 SHEETS—SHEET 16.
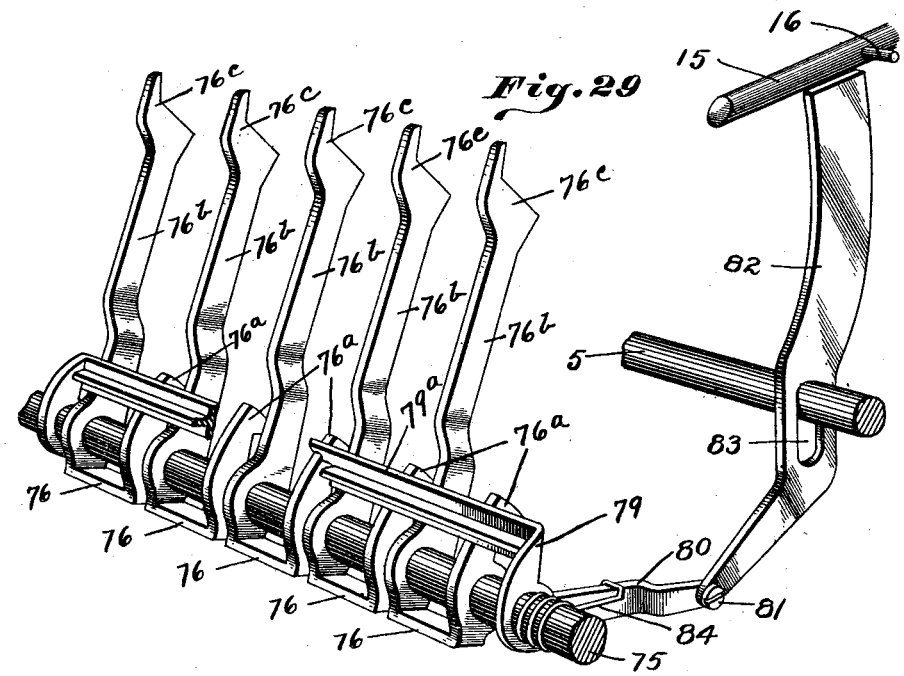
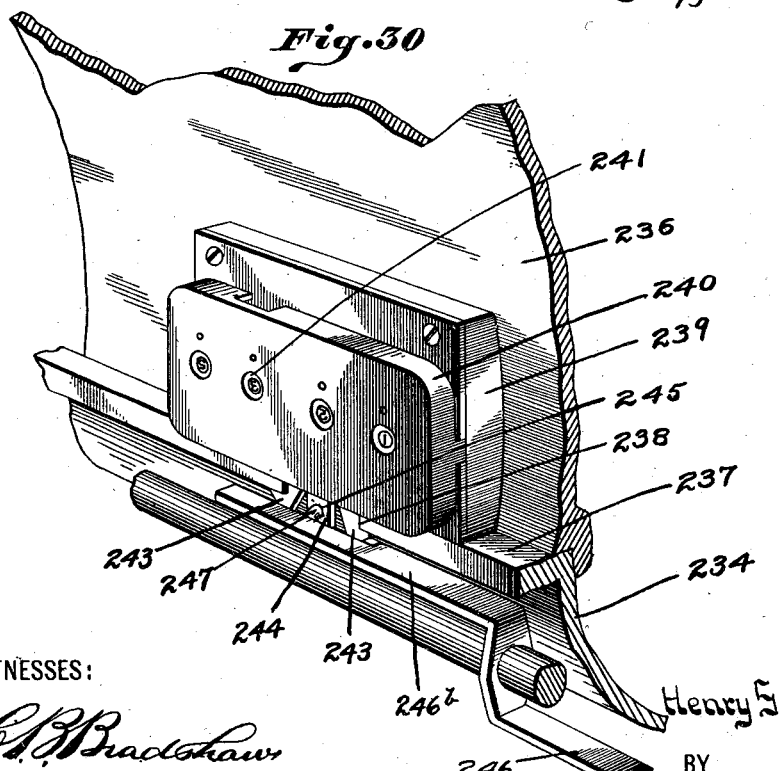

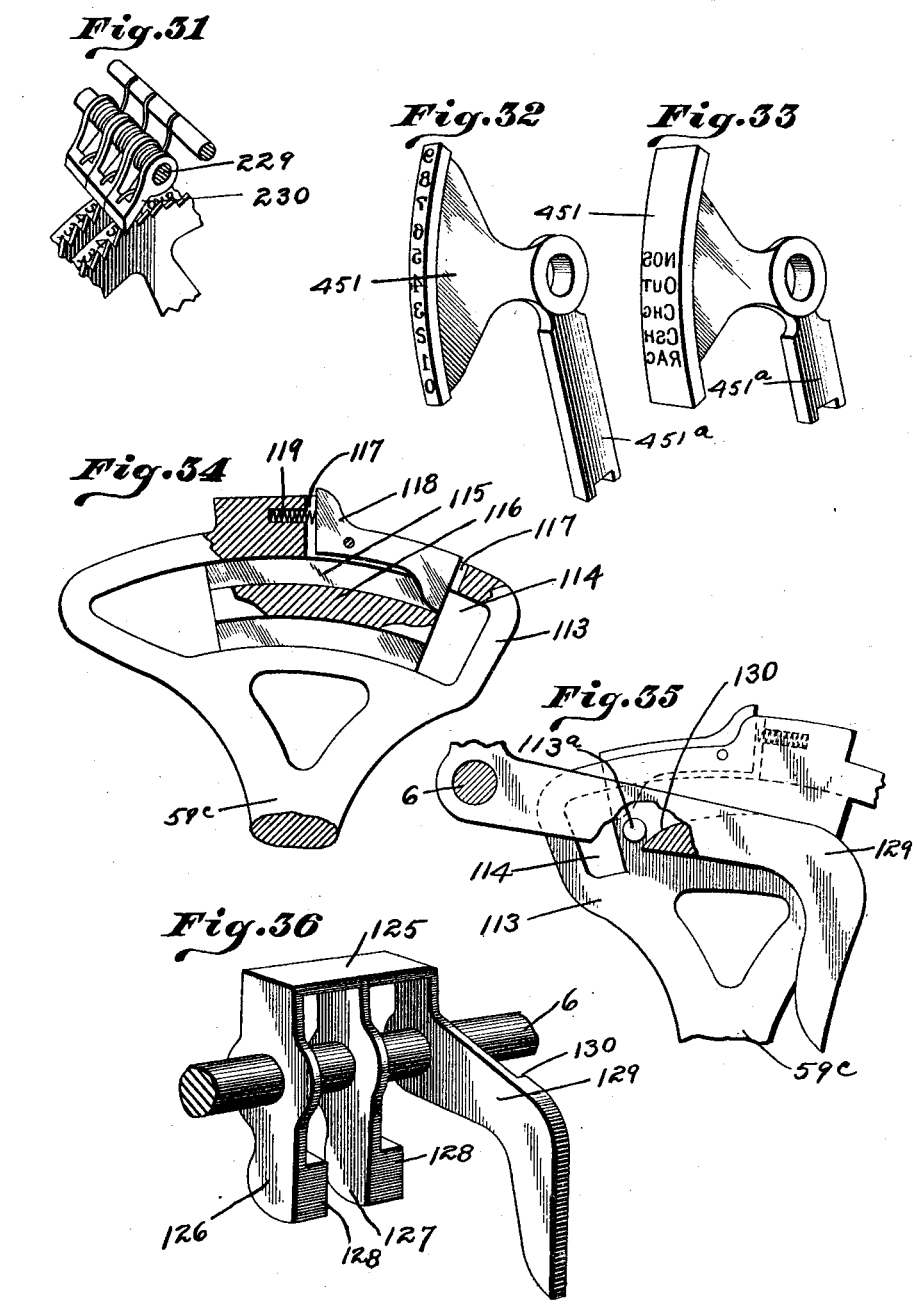

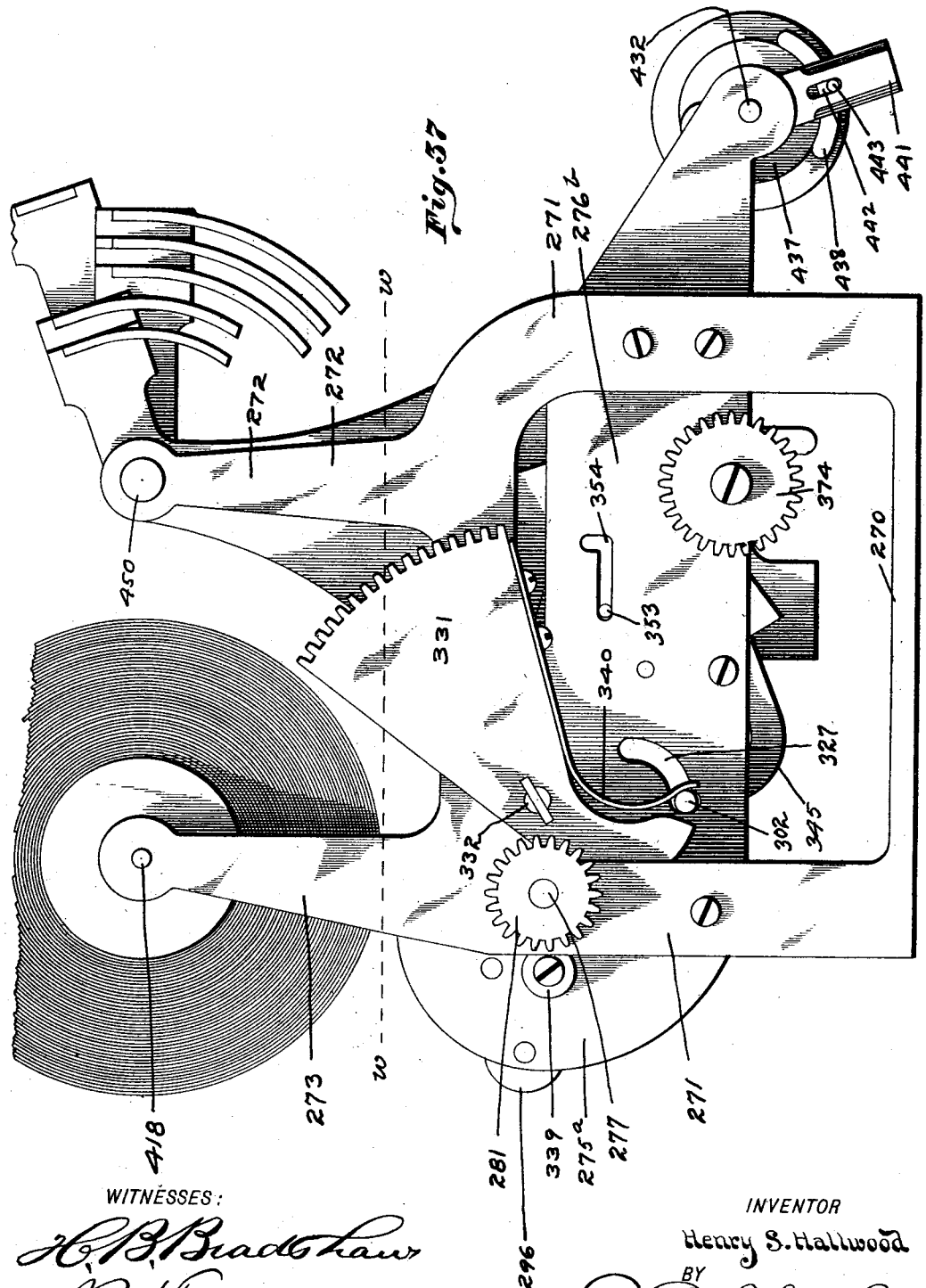

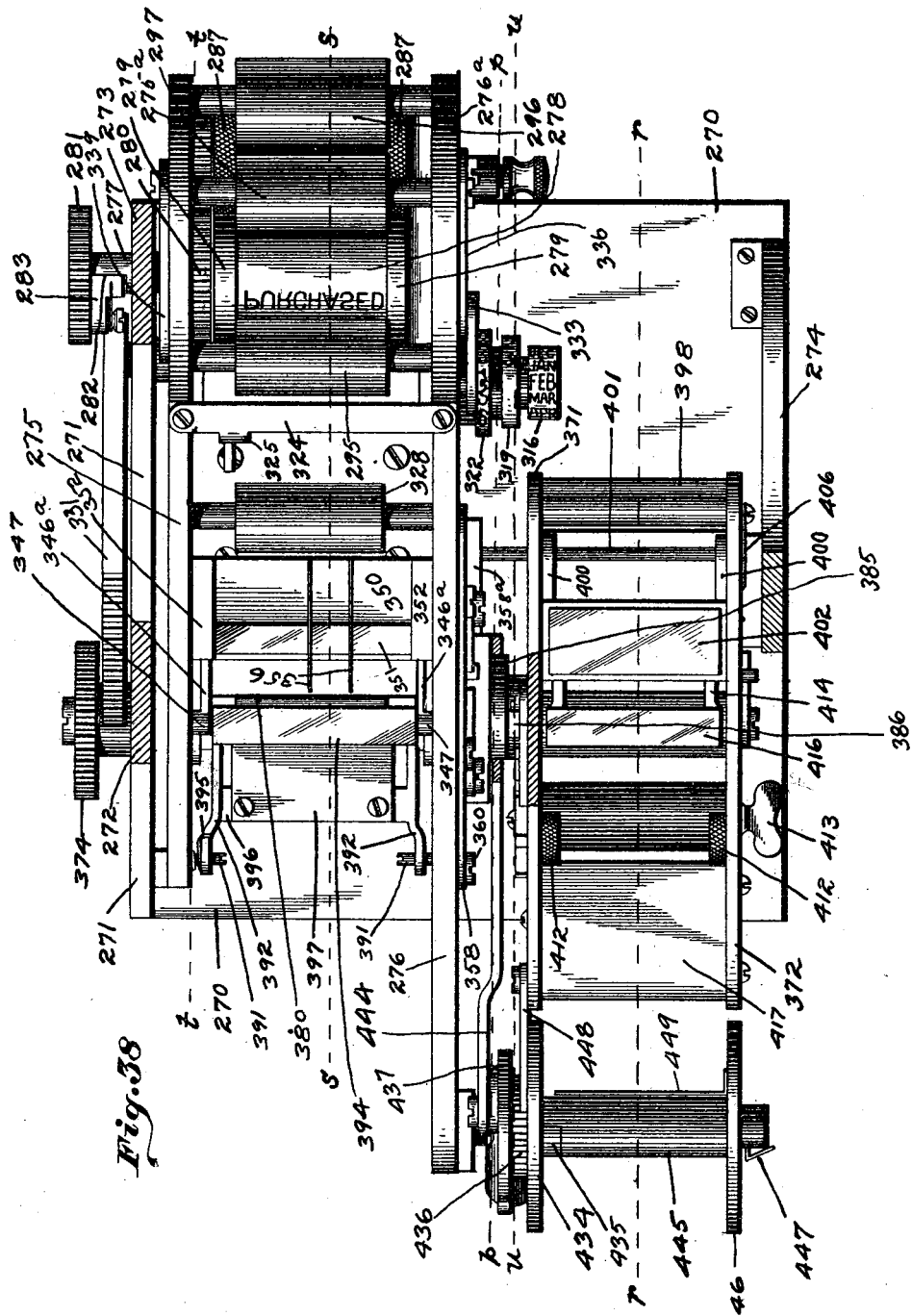

H. S. HALLWOOD.
CASH REGISTER.
APPLICATION FILED SEPT. 1, 1900.
1,085,680.
Patented Feb. 3, 1914.
28 SHEETS—SHEET 20.
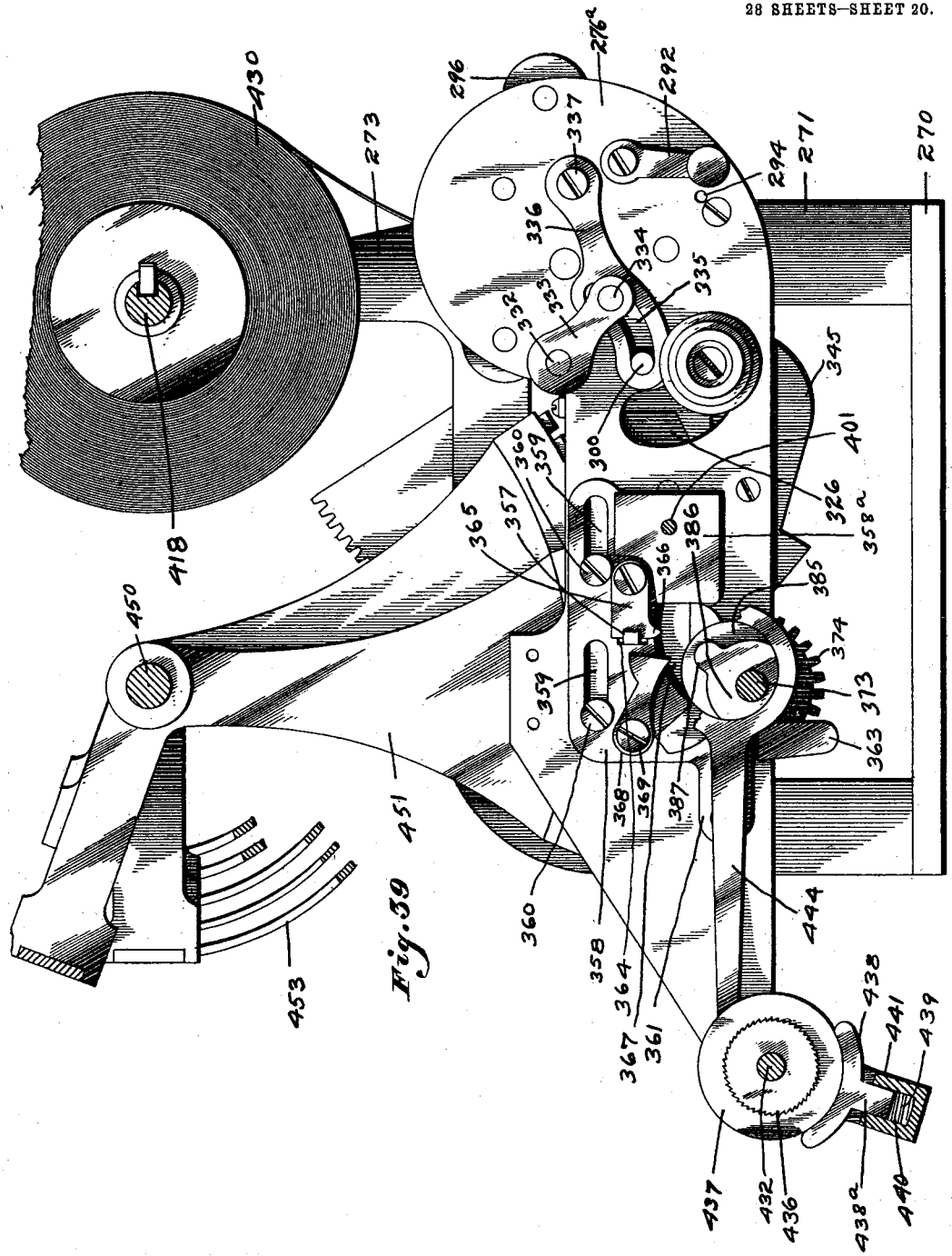
WITNESSES:
INVENTOR
Henry S. Hallwood
ATTORNEY

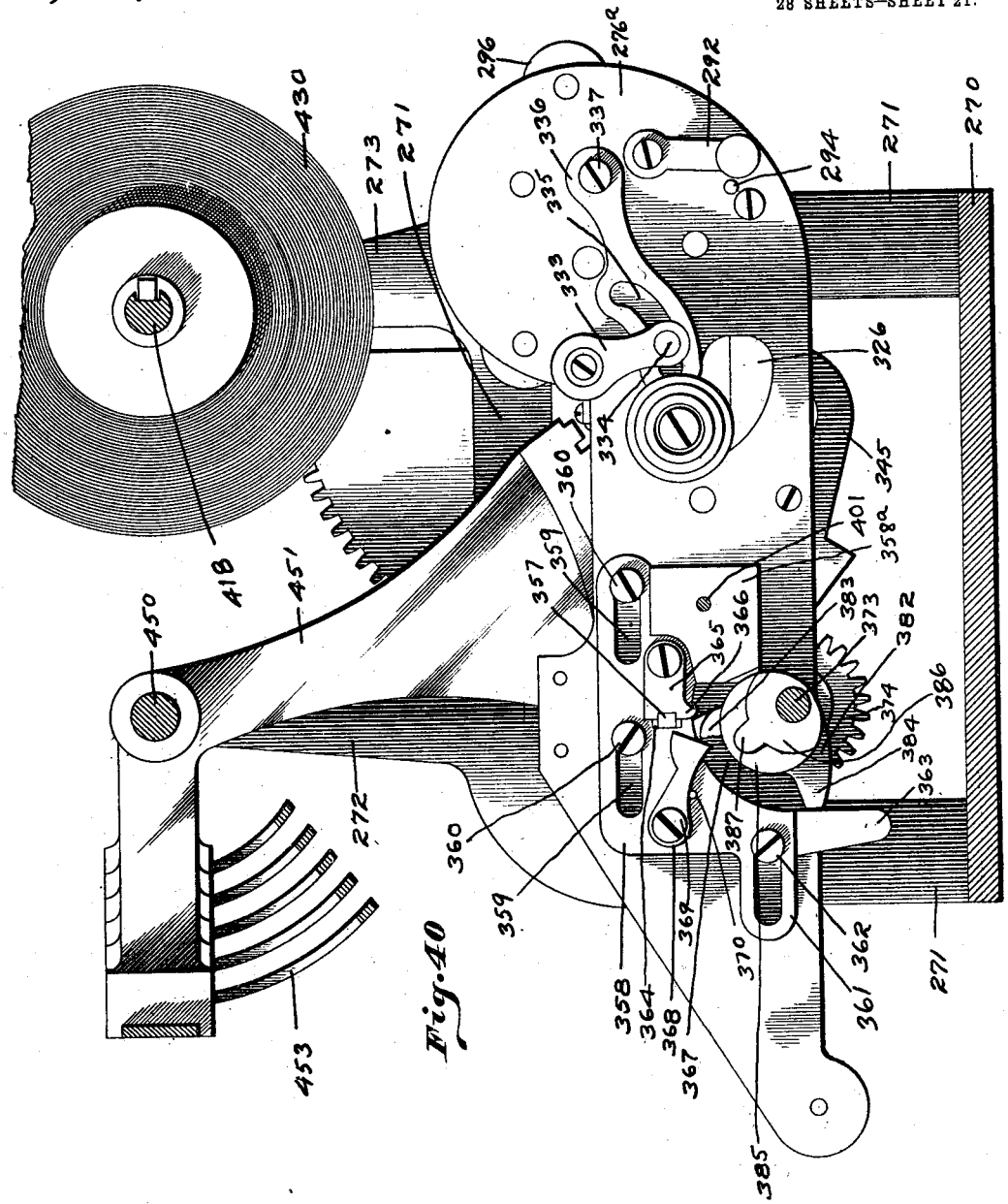

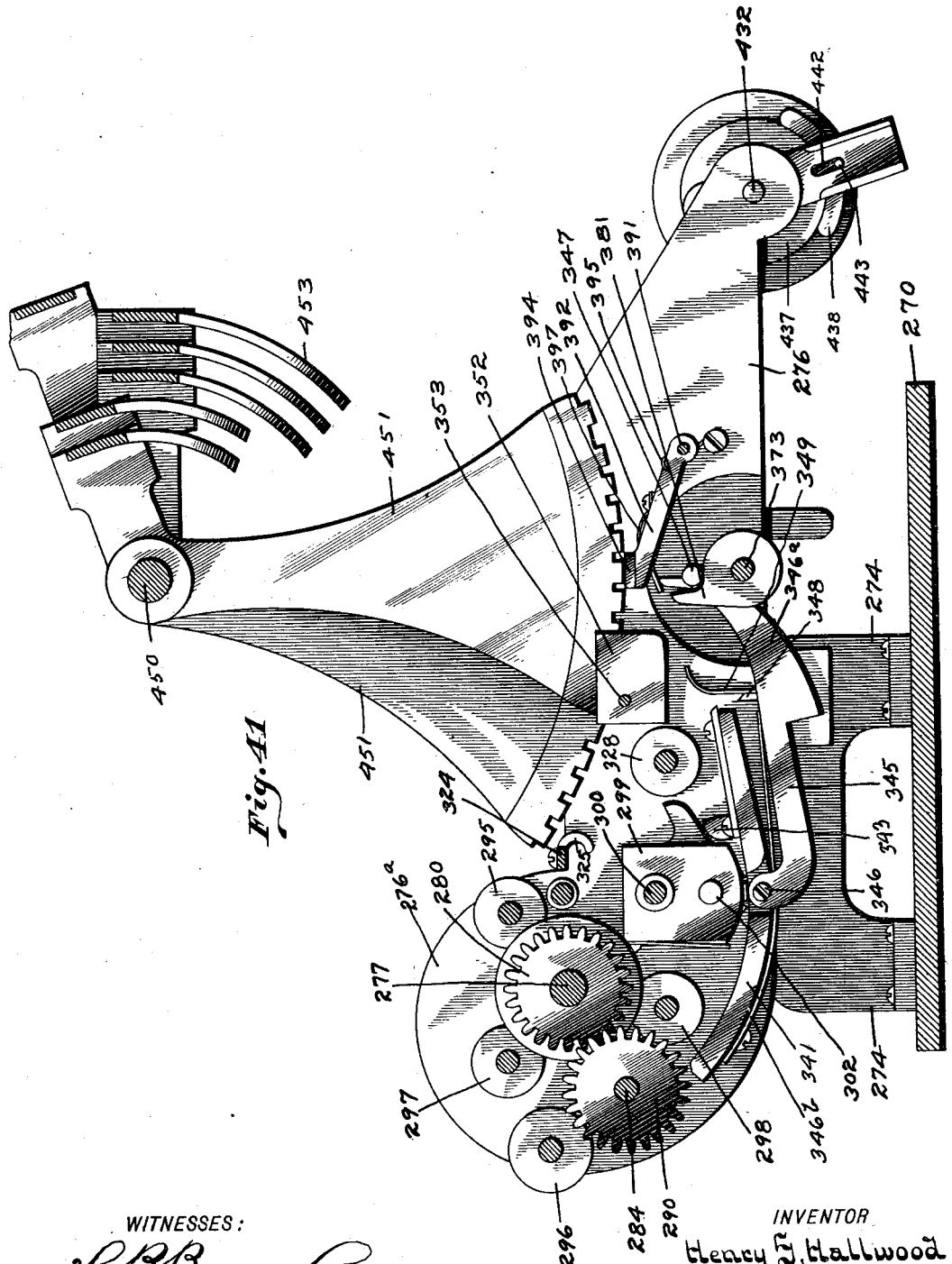

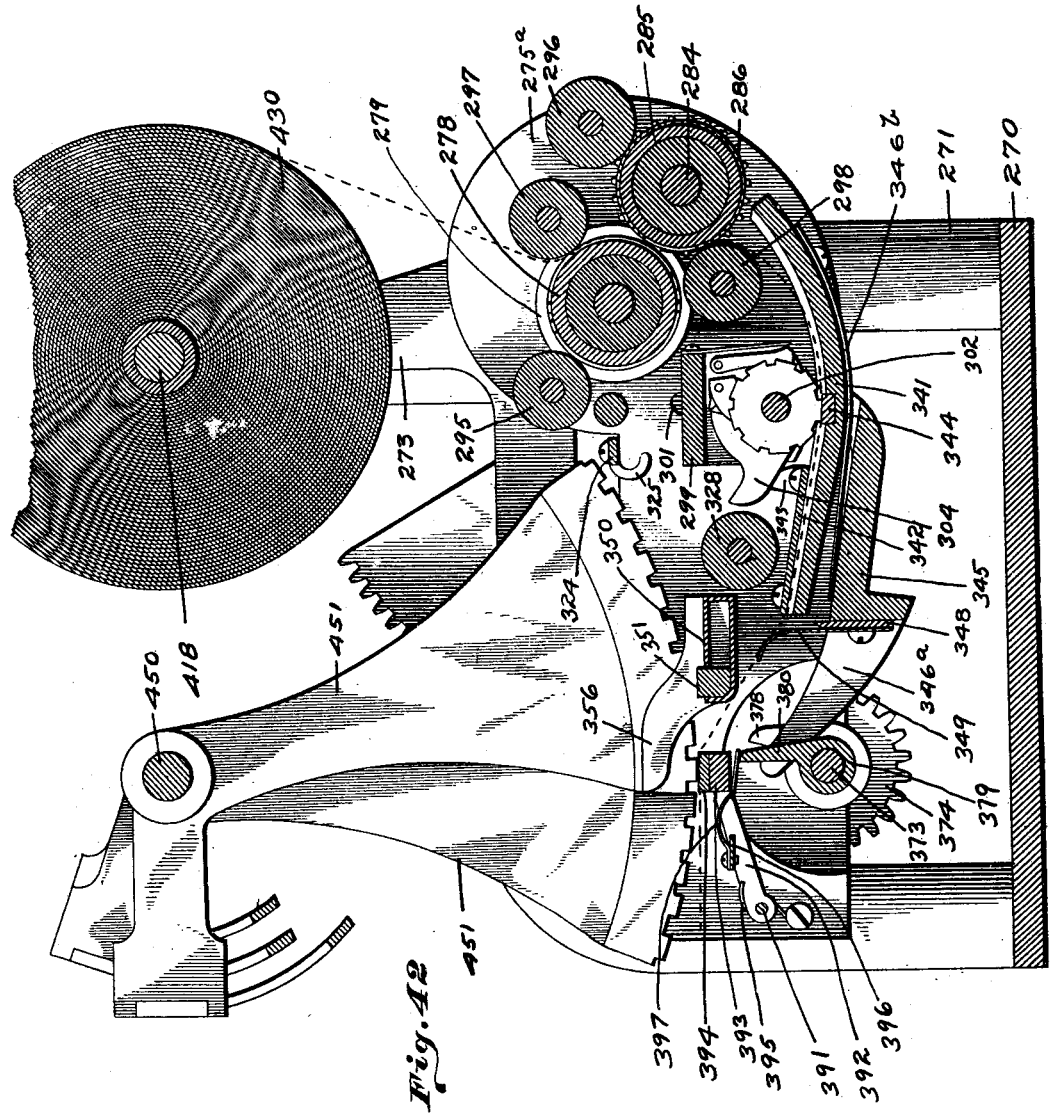

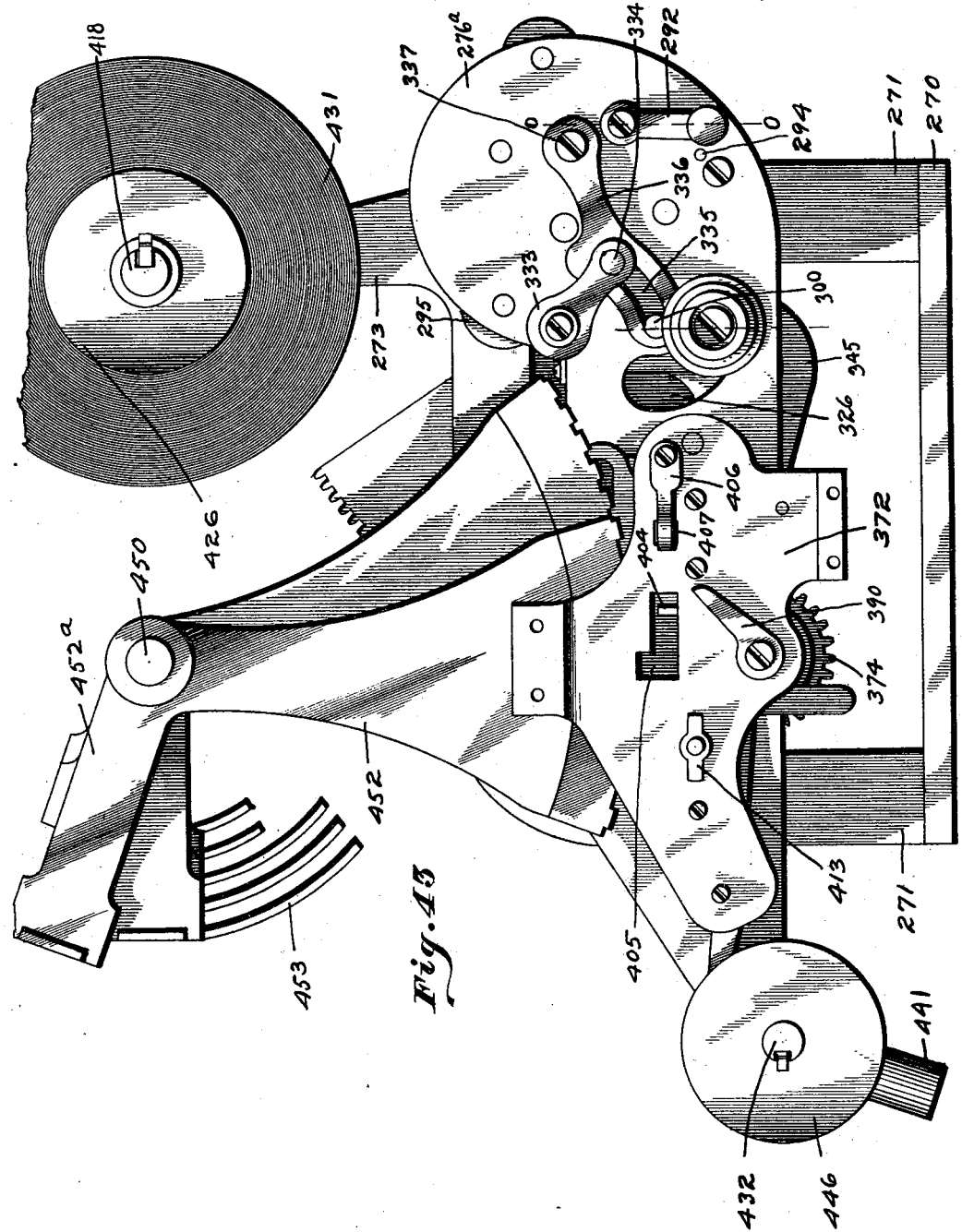

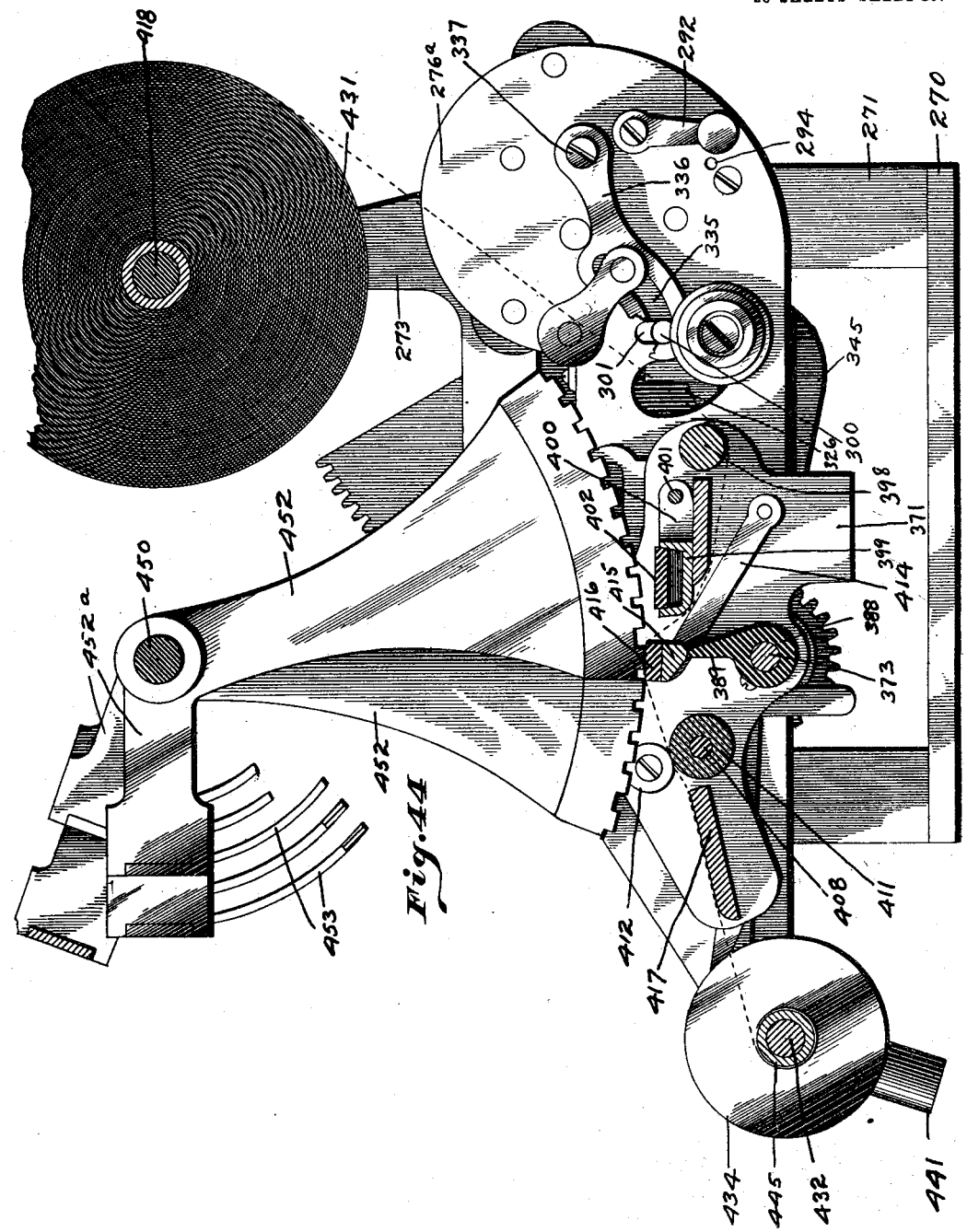

H. S. HALLWOOD.
CASH REGISTER.
APPLICATION FILED SEPT. 1, 1900.
1,085,680.
Patented Feb. 3, 1914.
28 SHEETS—SHEET 26.
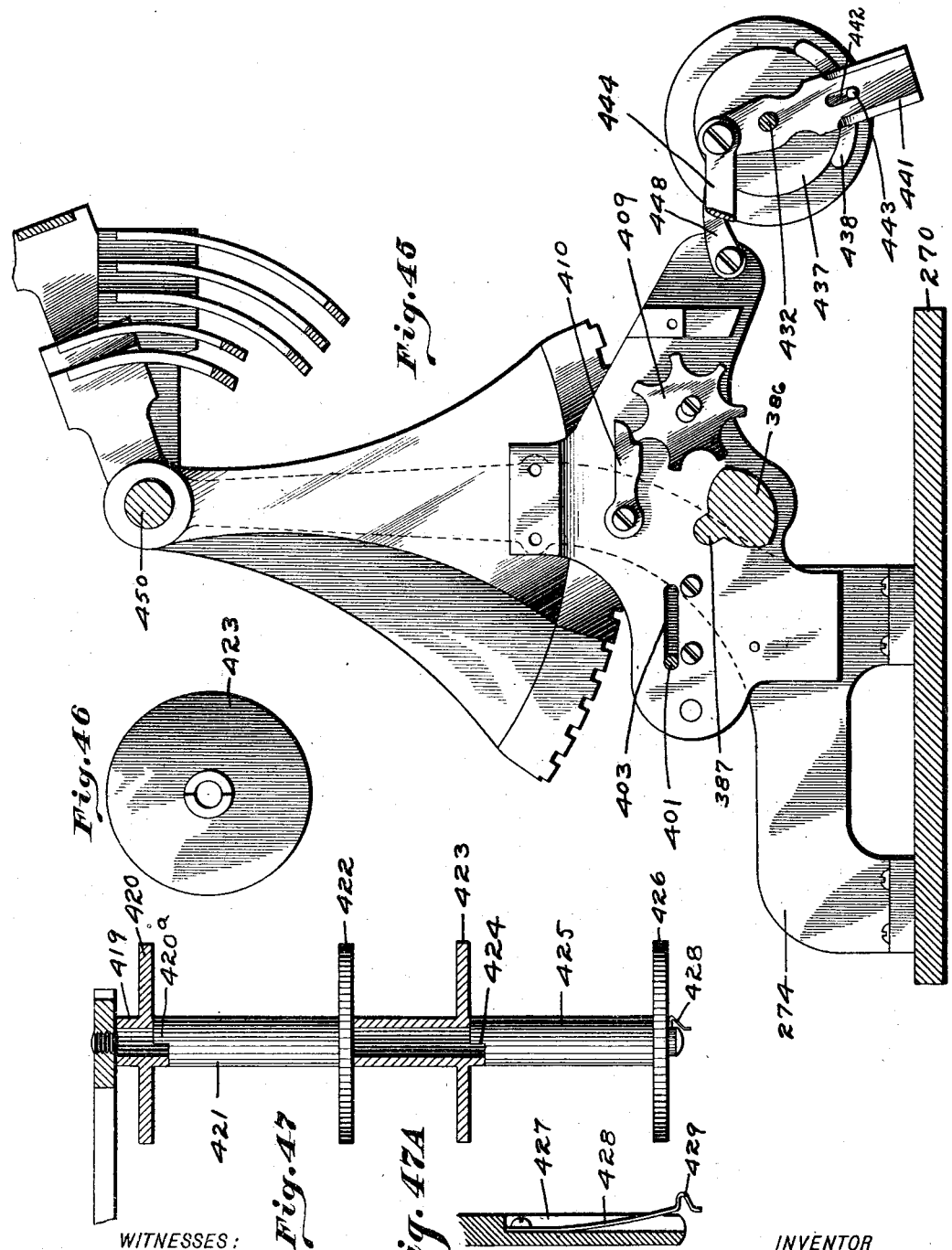
WITNESSES:
H. B. Bradshaw
J. H. Frawl
INVENTOR
Henry S. Hallwood
BY
C. Shepherd
ATTORNEY

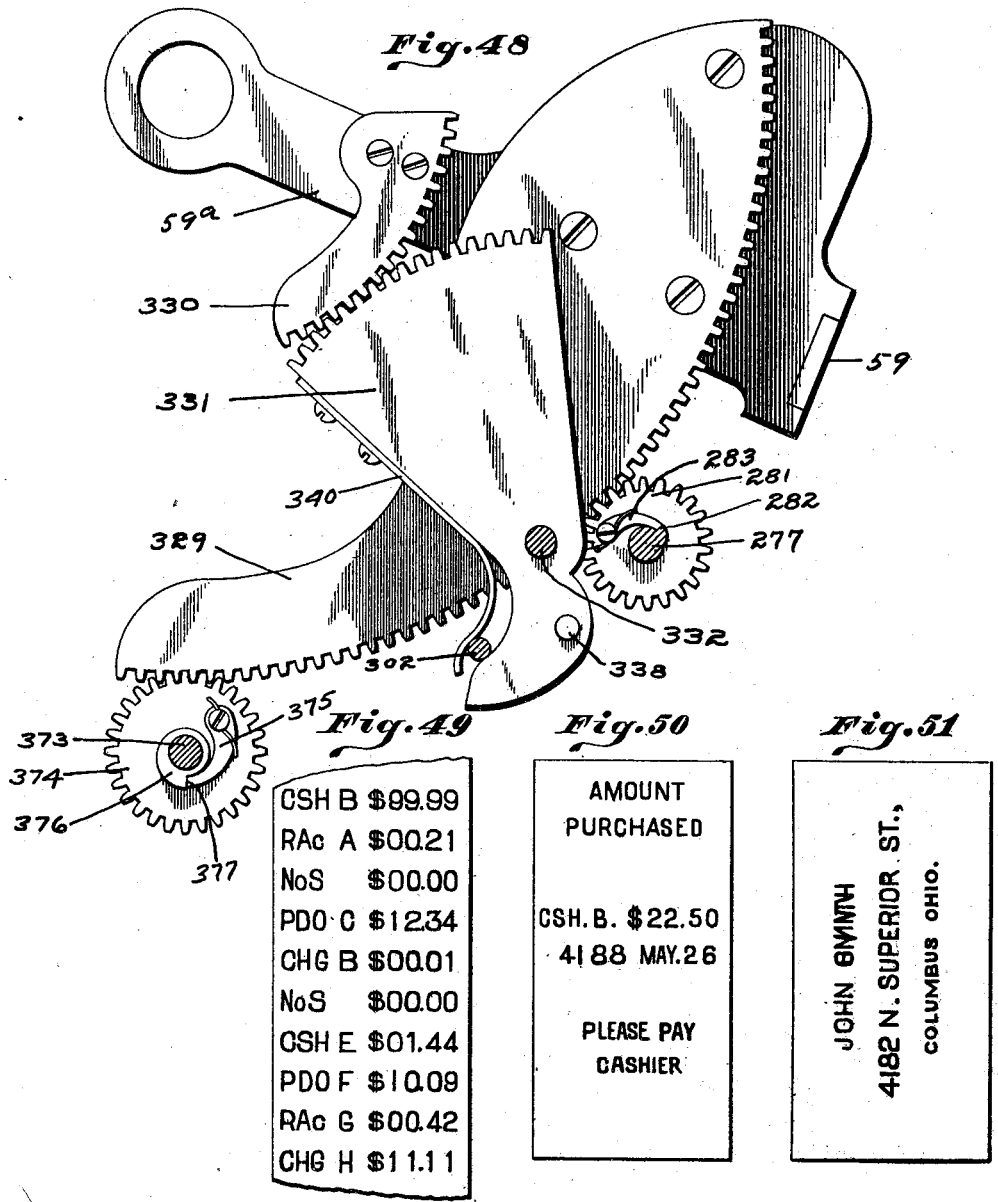

H. S. HALLWOOD.
CASH REGISTER.
APPLICATION FILED SEPT. 1, 1900.
1,085,680.
Patented Feb. 3, 1914.
28 SHEETS—SHEET 28.
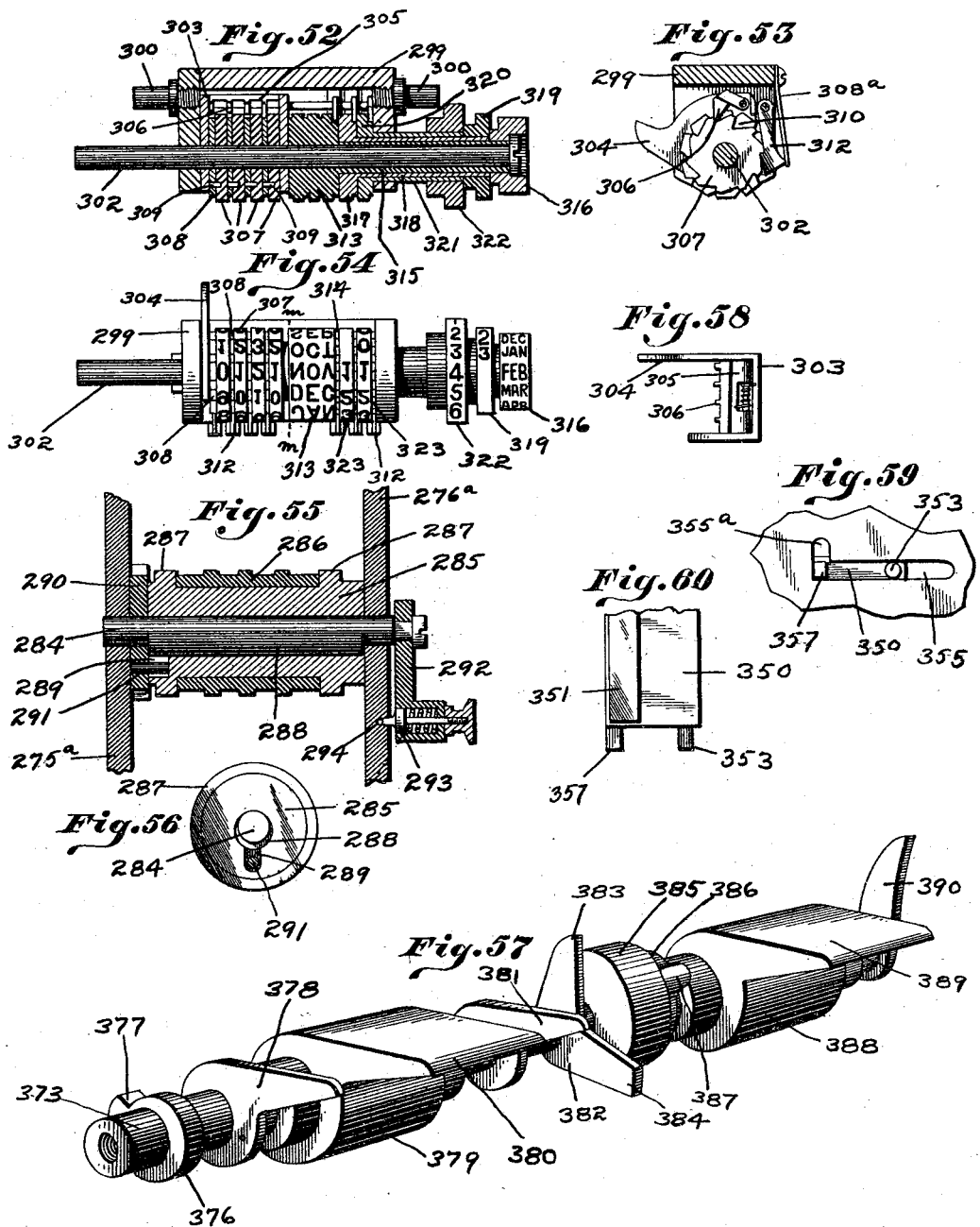
WITNESSES:
H. B. Bradshaw
J. H. Frank
INVENTOR
Henry S. Hallwood
BY
C. Shepherd
ATTORNEY

UNITED STATES PATENT OFFICE.

HENRY S. HALLWOOD, OF COLUMBUS, OHIO, ASSIGNOR, BY DIRECT AND MESNE ASSIGNMENTS, TO ANNIE HALLWOOD, OF COLUMBUS, OHIO.

CASH-REGISTER.

1,085,680.  Specification of Letters Patent.  Patented Feb. 3, 1914.

Application filed September 1, 1900. Serial No. 28,740.

*To all whom it may concern:*

Be it known that I, HENRY S. HALLWOOD, a citizen of the United States, residing at Columbus, in the county of Franklin and State of Ohio, have invented a certain new and useful Improvement in Cash-Registers, of which the following is a specification.

My invention relates to the improvement of cash registers and particularly relates to the improvement of lever operated as distinguished from that class or type of cash registers, the registering mechanism of which is operated by the movement of a cash drawer, such, for instance, as that shown in the existing patents to Sern P. Watt #434,897 and #454,990; John H. McCormick #570,141 and #610,365; John H. McCormick #610,366, and my former applications for patents, Serial Numbers 711,329 and 735,748.

The objects of my present invention are to provide an improved cash register of a type which in operation is entirely independent of the cash drawer, the mechanism of the register having no connection therewith, and in construction differing radically from the type known as drawer-operated registers; to provide a cash register with improved means for operating and actuating the operating mechanism; to provide a cash register with value, initial and department keys, with improved means necessitating the operation or depression of a key in each series before the machine can be completely operated; to provide means for locking the no-sale key against operation after a value key has been depressed; to provide improved means whereby the value, initial and department keys are locked against operation after the no-sale key has been depressed; to provide mechanism whereby the value keys may be depressed and returned to their normal positions and re-depressed prior to the depressing of an initial key, and mechanism preventing the depressing and returning of the value keys after an initial or department key has been depressed; to provide improved means for indicating the amount of the transaction, the character of the same and the initial of the operator; to provide improved means for destroying previous indications upon the depressing of an initial key, thus making it compulsory to depress both a value setting element and an initial setting element before a department setting element is effective for the purpose of creating a new indication and registration; to provide means whereby access to the registering wheels is prevented until the no-sale key has been depressed, and to combine with said no-sale key interlocking mechanism, a registering cabinet door lock for recording each opening of said cabinet door; to compel a complete operating movement of the operating lever and to provide means for recording each complete movement of the same; to so construct my improved cash register as to admit of the cash drawer being left open during a number of transactions or registrations, and to provide in conjunction with said mechanism means whereby the drawer may be automatically closed by the lever at the conclusion of each registration; to so construct my improved register as to admit of its being operated and utilized with the cash drawer entirely removed therefrom; to provide means for indicating amounts paid out and charged, and to prevent such amounts being registered or added upon the registering wheels; to provide an improved check printing and tape printing mechanism, and to so construct the same as to admit of both said check and tape printers being employed simultaneously or independently; to provide improved means for preventing an improper manipulation of the keys, the registering and printing mechanisms; to provide improved means for locking the operated keys into operated position, and the unoperated keys into unoperative position upon the depressing of a clerk's initial, and, connected therewith, locking mechanism whereby said clerk's initial key is locked into operative position, and the balance of the initial keys are locked into unoperative position. These objects I accomplish in the manner illustrated in the accompanying drawings, in which—

Figure 2:
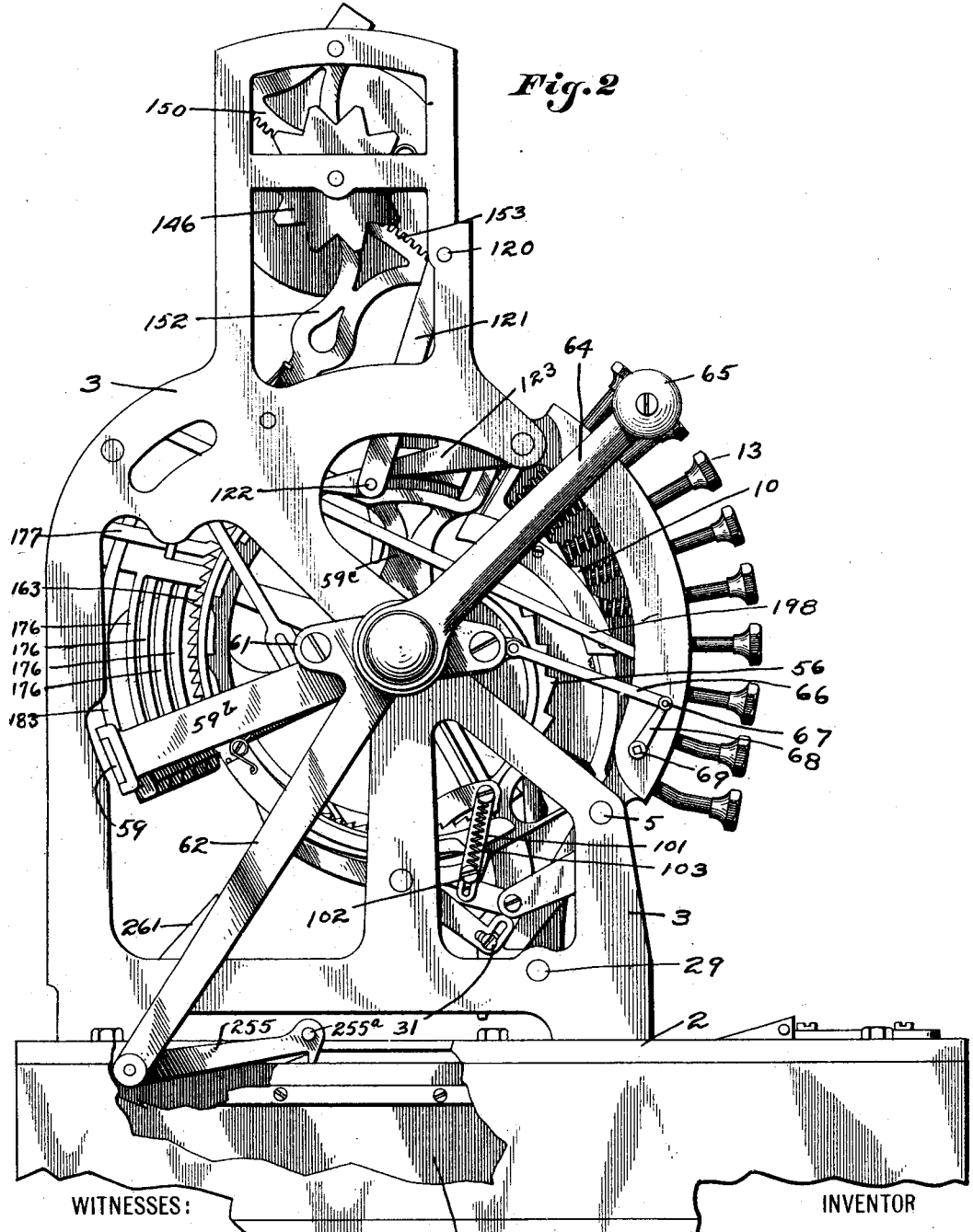
Figure 3:
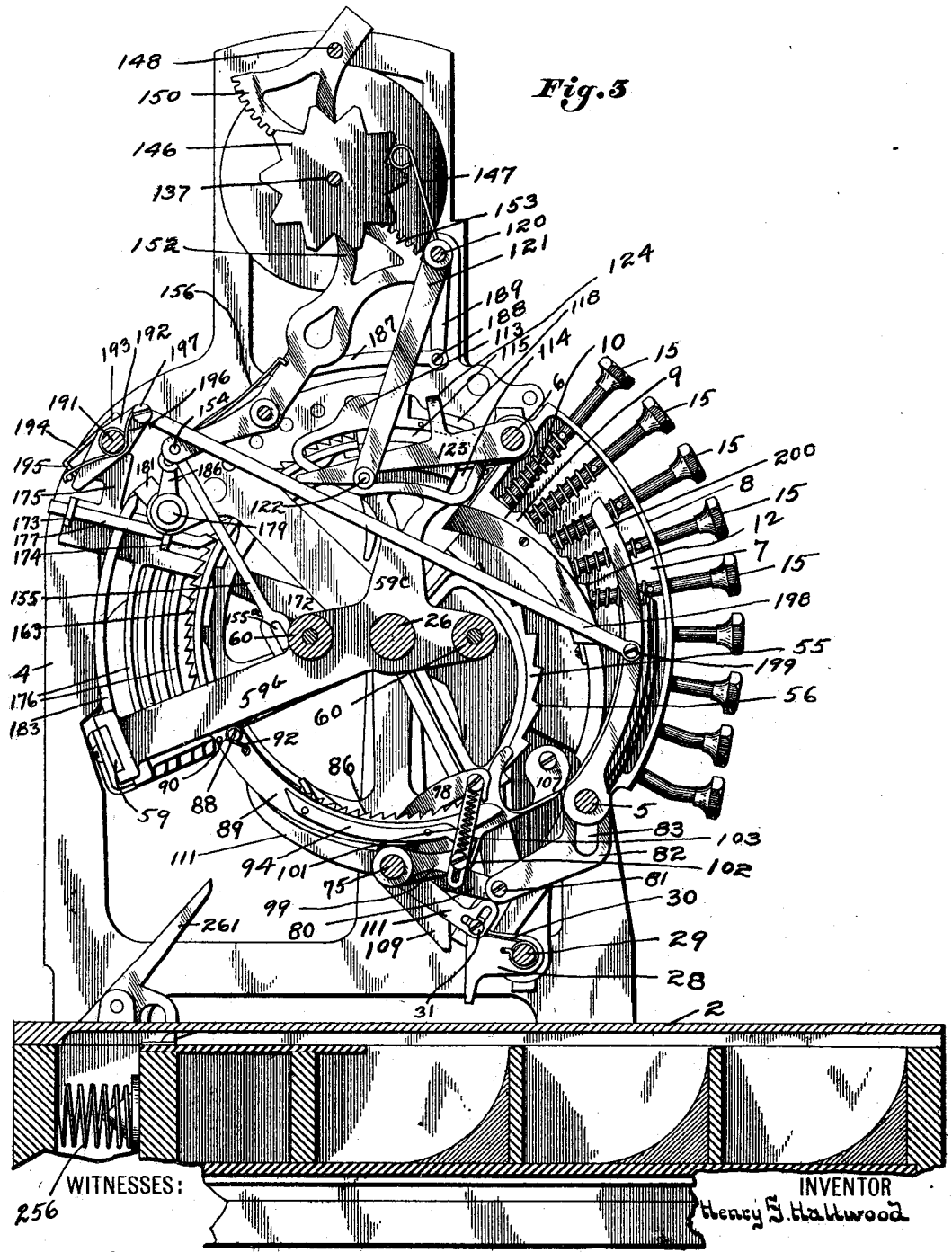
Figure 4:
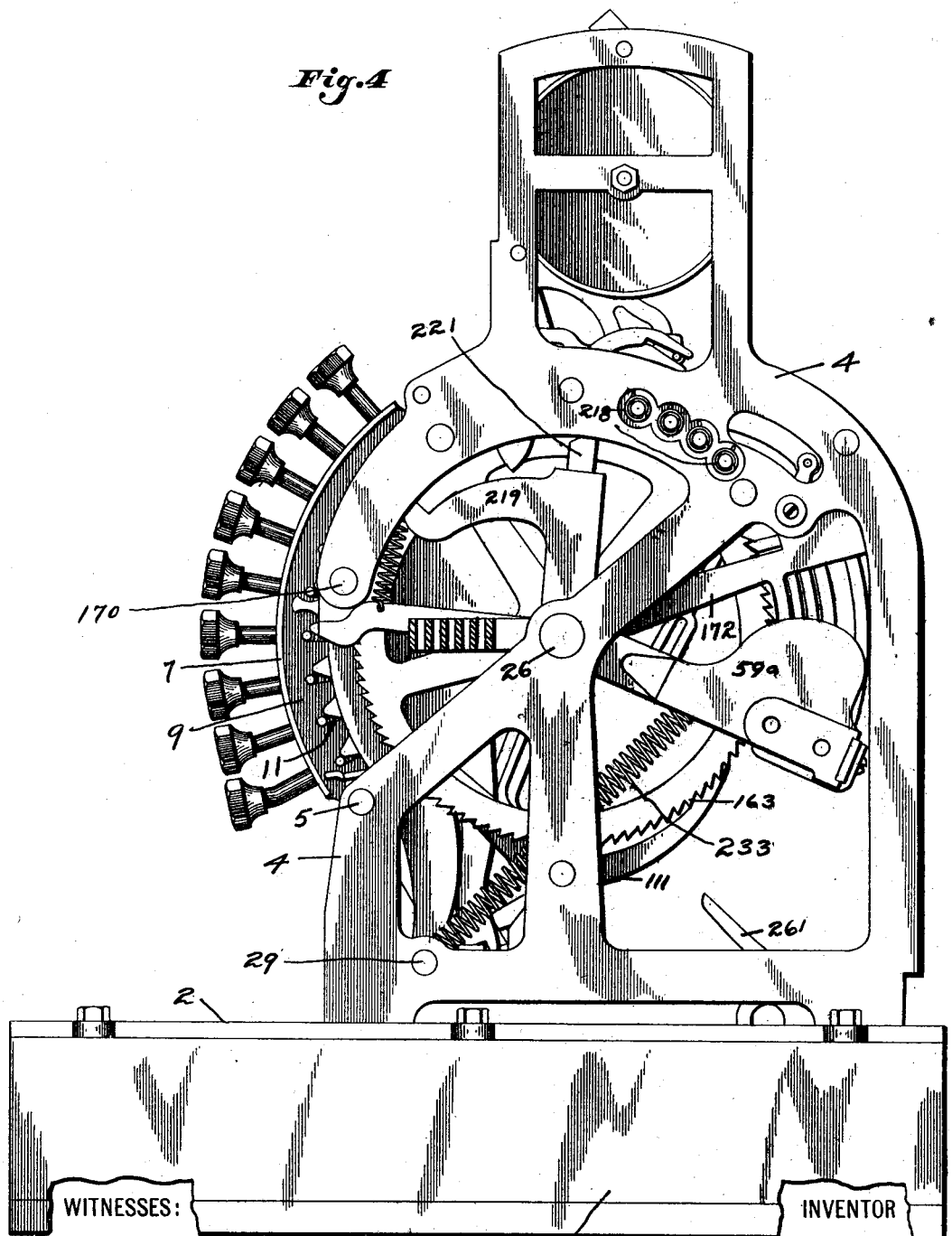
Figure 5:
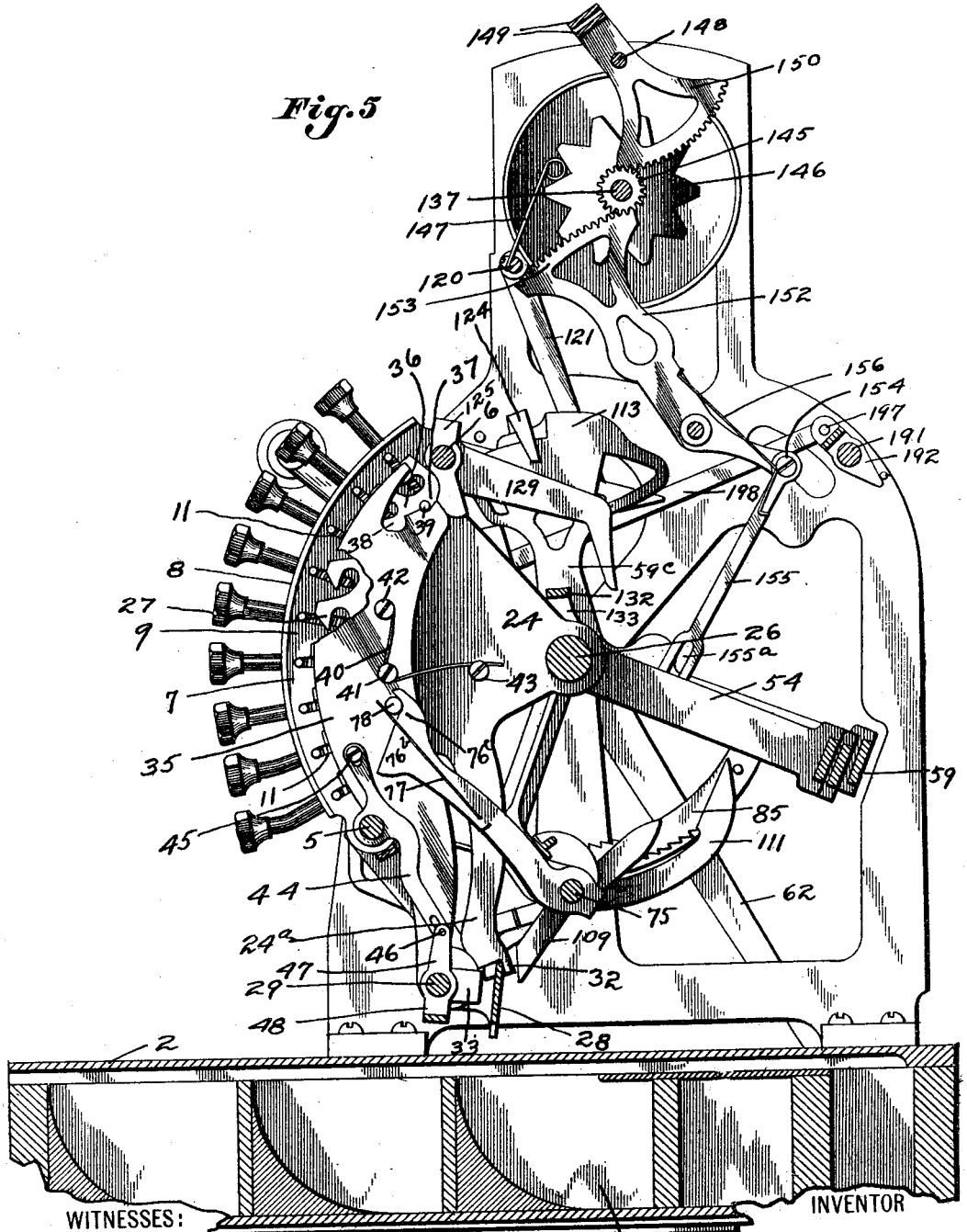

Figure 1 is a front elevation of my improved register with the case and printing mechanism removed therefrom for the sake of clearness in illustration. Fig. 2 is a view in elevation of that side of my improved register on which the operating lever is employed. Fig. 3 is a sectional view on line *x x* of Fig. 1. Fig. 4 is a view in elevation of that side of the register which is opposite the side employing the operating lever, such view being shown without the printing mechanism. Fig. 5 is a sectional view on line *y y* of Fig. 1. Fig. 6 is a sectional view on line *z z* of Fig. 1. Fig. 7 is a sectional view on line *z z* of Fig. 1 looking in the opposite direction from that shown in Fig. 6. Fig. 8 is a sectional view on line *v v* of Fig. 1, said section being taken through the casing and showing the internal registering mechanism removed. Fig. 9 is a detail plan view of the registering and printing segment carrying yokes. Fig. 10 is a detail view in perspective of a spring actuated trip employed in the manner hereinafter described in connection with the transfer mechanism. Fig. 11 is a detail view in perspective illustrating the spring connection of one of the transfer rods with the framework of the machine. Fig. 12 is a similar view of the resetting plate employed as hereinafter described. Fig. 13 is a partial rear elevation and partial section of a cam frame employed in connection with the indicating mechanism. Fig. 14 is a detail view in perspective of a portion of the cash register and its support showing in connection therewith means for coupling said drawer in connection with the operating parts of the register. Fig. 15 is a partial elevation and partial sectional view showing the relative positions of the transfer rods, depending triggers and tripping device. Fig. 16 is a detail view in perspective of a portion of one of the registering wheels showing the resetting mechanism in connection therewith, the latter being partially in section. Fig. 17 is a detail view in perspective of a portion of the transfer mechanism. Fig. 17ᴬ is a detail view in perspective of a locking and resetting frame employed in connection with the transfer mechanism. Fig. 18 is a similar view in perspective of the key locking mechanism. Fig. 19 is a detail view partially in section and partially in elevation of the department keys and their casing, showing in conjunction therewith the means for preventing the depression of more than one of said keys. Fig. 20 is a view in perspective of a yoke and lever employed in the manner hereinafter set forth for preventing the operation of certain keys when a no-sale key has been depressed. Fig. 21 is a detail view in perspective of a lock and latch plate, the same being shown in connection with cams for preventing the depression of a value key after an initial key has been depressed. Fig. 22 is a perspective view of a department key counting device. Fig. 23 is a sectional view through the gravity bar or yoke. Fig. 24 is a plan view of a portion of an arm of said gravity yoke.

Fig. 25 is a side elevation of said arm. Fig. 26 is a detail view in perspective of the outer end portion of said arm in connection with a pawl tripping device to be hereinafter described. Fig. 27 is a view in perspective of two of the registering wheel operating pawl controlling segments showing in connection therewith a portion of the cam frame illustrated in Fig. 13. Fig. 28 is a perspective view of one of the pawl carrying arms and its connected parts. Fig. 29 is a similar view of a locking mechanism employed as hereinafter described. Fig. 30 is a similar view of a portion of the case lid lock and counting device. Fig. 31 is a perspective view of portions of two registering wheels and spring actuated dogs for preventing reversal of the same. Fig. 32 is a perspective view of one of the amount printing segments. Fig. 33 is a similar view of a department printing segment. Fig. 34 is a view partially in section and partially in elevation of the target locking cam. Fig. 35 is a view in elevation and section of the cam finger and adjoining parts employed in compelling the return of the department and initial keys to their normal positions after operation. Fig. 36 is a view in perspective of the cam finger shown in Fig. 35, the same being illustrated in connection with adjoining parts. Fig. 37 is an inner side elevation of the tape and check printer. Fig. 38 is a sectional view of said tape and check printer frame taken on line *w w* of Fig. 37. Fig. 39 is a sectional view taken on line *u u* of Fig. 38 showing a side elevation of the check printer. Fig. 40 is a similar view taken on line *u u* with the parts shown in their normal positions and with certain parts indicated in Fig. 39 removed. Fig. 41 is a sectional view of the check printer on line *t t* of Fig. 38. Fig. 42 is a sectional view on line *s s* of Fig. 38. Fig. 43 is an outer side elevation of the tape printing mechanism with the side frame removed for clearness of illustration. Fig. 44 is a sectional view on line *r r* of Fig. 38. Fig. 45 is a sectional view on line *p p* of Fig. 38. Fig. 46 is an end elevation of the paper reel with the outer reel section removed. Fig. 47 is a partial elevation and partial section of said paper reel. Fig. 47ᴬ is a longitudinal section of the outer portion of a paper reel supporting shaft. Fig. 48 is an outer side elevation of the check and tape printer operating gears. Fig. 49 is a view in elevation of a portion of a printed tape. Fig. 50 is a similar view showing one side of a printed check. Fig. 51 is a view of the opposite side thereof. Fig. 52 is a sectional view through the numbering and dating mechanism taken on line *l l* of Fig. 43. Fig. 53 is a transverse section on line *m m* of Fig. 54. Fig. 54 is an underside view in elevation of the numbering and dating mechanism. Fig. 55 is a sectional view on line o o of Fig. 43. Fig. 56 is an end elevation of the printing roll illustrated in Fig. 55. Fig. 57 is a detail view in perspective of the tape and check printer operating cam. Fig. 58 is a plan view of a yoke and spring actuated pawl body employed in the numbering mechanism of the check printer. Fig. 59 is a side elevation of a portion of the outer side plate of the check printer and Fig. 60 is a plan view of one end of the printing segment inking device.

Similar numerals refer to similar parts throughout the several views.

In carrying out my invention I employ a base portion consisting of a horizontal drawer casing 1, the cover plate of which is in the form of a horizontal metal base plate 2 from opposite side portions of which rise the end frame standards 3 and 4. These end frame standards are connected at suitable points in the manner hereinafter shown and described by frame rods. Of these rods, 5 and 6 extend transversely between the forward portions of the frame standards and at one side of the center of the machine support a key frame 7. This key frame consists of an outwardly curved or bowed face plate 8 which has formed on its inner side at intervals inwardly projecting parallel wings or ribs 9. Each of the wings 9 has its inner portion formed with a laterally projecting shoulder 10 and each of said wings has formed therein radially arranged slotted openings 11. The curved shoulders 10 are provided with successively arranged stops or notches as indicated at 12.

13 represent the value keys which are arranged one above the other and in parallel rows which extend from the right side of the key frame plate toward the left. To the left of these value keys is arranged a row of initial or identification keys 14 and to the left of the latter a row or partial row of department keys 15, on the heads of which are printed words or abbreviations of words indicating the character of the transaction, such as received on account, cash, charge, paid out, no sale. The heads of the value keys are numbered to represent different amounts, the row to the right being numbered in the present case from one to nine inclusive and indicating cents, the row to the left thereof indicating cents in multiples of ten and the next rows to the left indicating dollars and tens of dollars respectively. Each of the initial keys 14 is provided with a letter on its head, this numbering and lettering of the keys being shown more clearly in Fig. 1. The stems of all these keys, as indicated for the department keys in Fig. 19 of the drawing, pass loosely through openings in the face plate 8 adjacent to the sides of the wings 9 and are provided on the inner side of said face plate with projecting transverse pins 16. The pins 16 of the value keys and initial keys project only on one side of said keys, while the corresponding pins of the department keys project, for the reasons hereinafter shown, on both sides thereof. The inner end portions of the key stems extend loosely, as indicated in Fig. 19, within radially arranged openings 17 in the steps or notched portions 12 of the shoulders 10. Between the pins 16 and said shoulders 10, and surrounding the key stems, are coiled springs 18 which normally retain said keys in their outer positions. On the inner side of that shoulder 10 through which the department key stems are adapted to pass, I provide an elongated casing 19 which is curved to correspond with said shoulder, the inner side of said casing being provided at intervals with openings 20, these openings being arranged at points in line with said key stems. Within the casing 19, I provide a number of loosely arranged blocks 21 which, when pressed together and toward the forward and lower end of the casing 19, serve to cover the openings 17 in the wing shoulder 10. These blocks are normally retained in this forward or closed position through the medium of a spring strip 22, the lower end of which bears upon the upper block and the upper end of which is secured to the framework. At the junction of the upper and forward sides of the blocks, the latter are beveled slightly as indicated, forming transverse recesses or notches between the blocks, in which the lower or inner portions of the inclined ends of said department key stems are adapted to be forced in the manner hereinafter described.

23 represent lock plates of which there is one for each set or row of value keys and one for each set or row of initial and department keys, the latter being indicated respectively at 24 and 25. Each of these lock plates has the general form of a battle ax having its head portion at its rear side fulcrumed on a central or main shaft 26 which extends between the end standards 3 and 4 of the machine frame. In this manner the lock plates are so supported as to bring the forward portion of one of the same adjacent to each of the key frame wings 9. This forward edge of each of the lock plates is curved to conform to the curvature of said wings and said curved edge has formed thereon hook shaped projections which are indicated at 27. The points of these hooks are, however, omitted from the initial lock plates, as shown in Figs. 21 and 5 of the drawing. The downwardly extending stem portions 23ª of the value lock plates 23 normally rest upon the upper side of the longer bar of a yoke 28, the end portions of which are fulcrumed on a transverse frame rod 29. This yoke is normally elevated by a spring 30 which, as indicated in Fig. 3 of the drawing, is connected with said rod 29 at one end and has its remaining end engaging a projecting screw or pin 31 of said yoke. The downwardly extending stem portion 24ª of the lock plate 24 is formed on its rear side with an angular termination and extension 32 which, when said yoke is raised to its normal position, as indicated in Fig. 21 of the drawing, engages the rear side of said yoke, as shown in Fig. 5. The lower end of the stem 25ª of the department lock plate is recessed or notched, said recessed portion normally engaging the upper side of the inner bar of a comparatively short yoke 33, the side arms of which are also fulcrumed on the rod 29, said yoke 33 being normally supported by a suitable spring 34. (See Fig. 1.) This yoke 33 is shown more clearly in Fig. 20 of the drawing.

35 represent latch plates, the lower ends of which are fulcrumed on the horizontal frame rod 29, there being one of these latch plates for each of the lock plates 23, 24 and 25. The latch plates, as shown, are formed with curved or convexed outer edge portions normally overlapping the hook recesses of the lock plates. Each of the latch plates has its upper end portion provided with a recess 36 which is formed, as indicated respectively at 37 and 38, with upper and lower rear and forward offsets or pin seats. In the upper and rear seat or offset 37 of each of the latch plates normally rests a laterally projecting pin 39 of the adjoining lock plate, the engagement of said pins and offsets serving to normally retain the hook fingers of the lock plates in such position that an inward movement of one of the keys of a corresponding set would result in the pin 16 of said key coming into contact with the inclined face of one of said hooks. The lock plates are normally pressed downward and the latch plates forward through the medium of springs 40 which have their central portions wound about laterally projecting pins 41 on the latch plates and have their ends bearing respectively against the rear sides of latch plate pins 42 and upper sides of lock plate pins 43.

On the shaft or rod 5, I fulcrum a lever 44, the upwardly extending arm of which is slotted and engages loosely a pin 45 which projects from the forward portion of the initial latch plate 35. The lower or downwardly extending arm of the lever 44 is also slotted and engages a laterally projecting pin 46 of the upwardly extending arm 47 of a horizontal lug frame 48, the latter consisting of a bar provided with projecting rings 49 which are journaled on the shaft 29 (see Fig. 21). Each of the rings 49 is provided on its rear side with a projecting lug 50. With the yoke 33 heretofore described is pivotally connected, as indicated more clearly in Fig. 20 of the drawing, the lower end of an upwardly extending bar 51, through a slotted opening 52 of which passes loosely the frame rod 5. The upper end of this bar 51 is beveled or inclined, as indicated at 53, and is adapted to contact with the underside of the laterally projecting pin 16 of the no-sale key 15.

Fulcrumed on the main shaft 26 is a set of frame yokes 54, these frame yokes being of different sizes and arranged one within the other as shown more clearly in Fig. 9 of the drawing. These fulcrumed side bars of the yokes 54 which are on the left of the center of the machine are formed with a forwardly projecting segment 55, the rim of each of the latter being in the arc of a circle which is eccentric to the shaft 26 and said rim being provided with successively arranged notches or stop shoulders 56. As indicated in the drawing, there are one of these segments for each row or set of value, initial and department keys; and the lower end extension of each segment, with the exception of the department segment, is provided with a laterally projecting pin 57. Those side arms of the yoke frames 54 which are fulcrumed to the right of the center of the shaft 26 are provided with forward and thence laterally extending arms or extensions 54ª, these angular yoke extensions being employed for the purpose hereinafter set forth. The yoke frames 54 are normally pressed downward by spring rods 58 which, as indicated in Fig. 9 of the drawing, have their forward ends connected with the shaft 26 and their rear ends engaging the upper sides of said yoke frames. On the outer side of and loosely embracing the outer yoke 54 is a gravity yoke 59, the side arms 59ª and 59ᵇ of said gravity yoke being fulcrumed on the shaft 26. The rear horizontal bar of the gravity yoke 59 is, as shown more clearly in Fig. 7 of the drawing, provided with an inwardly projecting bracket 59ᵈ upon which the yokes 54 are supported in the elevated position when said gravity yoke is elevated. The side arm 59ᵇ of said yoke 59 extends forward a short distance and is provided on each side of the shaft 26 with a laterally projecting lug 60. The lugs 60 are connected with the head 61 of a lever 62, (this lever being shown in Fig. 14). The lever head 61 is provided with an outwardly projecting pin 63 with which is connected one end of an operating lever 64, the outer end of the latter being provided with a suitable laterally projecting handle 65, as indicated more clearly in Fig. 2 of the drawing. With a forward extension of the side arm 59ᵇ of the yoke 59 is pivotally connected the rear end of a forwardly extending bar 66, the forward end of said lever 66 being jointedly connected at 67 with one end of an arm 68, the remaining end of which is connected with the central operating shaft 69 of a counting device which is located in a lateral extension of the key frame plate 8. This counting device is of that well known construction which, as indicated in Fig. 22 of the drawing, consists in a cylindrical body 70 having a slotted opening 71, which registers with the slotted opening 72 in the frame plate 8, and which further consists in the central shaft 69 on which is mounted peripherally numbered disks 73, the numbers on which are displayed through said slotted openings. These numbered disks are provided with a desirable or well known form of transfer mechanism by which a complete rotation of one of said disks results in throwing the adjoining disk the distance of one number. One of these counting devices is, as indicated in Fig. 1 of the drawing, arranged adjacent to each of the department keys, said key frame plate extension being slotted to show therethrough the numbers on the counting disks and each of said slotted openings having printed above the same letters indicating the department to which the counter belongs. As shown more clearly in Fig. 22 of the drawing, each of the counter shafts 69, with the exception of that shaft into which the bar 68 is connected has, connected with its outwardly projecting end an arm 74 through the bifurcated outer end of which extends the laterally projecting pin 16 of the corresponding department key stem 15.

75 represents a horizontal rod which extends below and parallel with the shaft 26. On this rod 75, I journal yokes 76, there being one of these yokes for each of the segments 55 with the exception of the department segment. As indicated more clearly in Figs. 27 and 29 of the drawing, each of these yokes is formed with a short arm 76$^a$ which is provided with a hook termination and which is adapted to engage the upper side of the pin 57 of the corresponding segment 55. The remaining arm of the yoke 76, which is indicated at 76$^b$ is of greater length and terminates in an enlarged head 76$^c$ which presents an angular face, as shown. Connected with the lower portion of each of the yoke arms 76$^b$ is one end of a spring 77 which, extending upward along the outer side of said arm, projects slightly beyond the angular head of the latter. Between the angle of the head 76$^c$ and the upper end portion of the spring 77 is embraced a laterally projecting pin 78 of the corresponding latch plate 35. Also journaled on the shaft or rod 75 is a yoke 79 the horizontal bar 79$^a$ of which normally bears against the rear sides of the yoke arms 76$^a$. The yoke 79 is provided on one end with a forwardly extending arm 80 which, at its outer end, is pivotally connected at 81 with an angular lifting bar 82, the latter being provided below the center of its height with a vertical slotted opening 83 through which passes loosely the frame shaft or rod 5. The upper end of the bar 82 is normally supported adjacent to the laterally projecting pin 16 of the no-sale key stem 15. The yoke bar 79$^a$ is held in contact with the rear sides of the lever arms 76$^a$ through the medium of a spring 84 which is connected with the shaft 75 and which exerts a downward pressure on the arm 80. On the side arm 59$^b$ of the gravity yoke I secure one end of a downwardly and forwardly curved bar 85, this bar having its outer portion and upper and lower sides provided with inclined teeth as indicated at 86 and 87, the teeth of the upper side inclining forwardly and the teeth of the lower side inclining rearwardly (see Fig. 23). On the outer side of the bar 85, I pivot at 88 (see Figs. 25 and 3) one end of a bar 89 which is substantially parallel with the bar 85. The pivot end of the bar 89 is provided with an angular recess forming a shoulder 90 with which is adapted to contact a laterally projecting pin 91 of the bar 85 and limit the downward movement of said bar 89. The inner end of the bar 89 is retained in contact with the pin 91 through the medium of a spring 92 which is wound about the pivot pin 88 and has one of its ends bearing against the side yoke bar 59$^b$ and its remaining end engaging a laterally projecting pin 93 on said bar 89. In its outer portion and on its outer side the pivoted and spring actuated bar 89 has formed therewith an elongated curved cam projection 94, this cam projection being formed in its outer portion with a raised cam projection or head 95 which terminates in an outwardly and downwardly inclined portion 96. The inner end of the cam projection 94 terminates in an underside bevel or curved incline as indicated at 97. On the shaft 75 adjacent to one side of the bar 85, I pivot two pawls 98 and 99, the pawl 98 having a hook or shoulder termination 100 which normally engages the outer end and upper side of the bar 85.

101 represents a connecting bar or strap, the upper end of which is pivotally connected with the head of the pawl 98 and the lower slotted end of which receives loosely a shoulder screw 102 which projects from the pawl 99. This shoulder screw is connected with the pivot screw of the pawl 98 through the medium of a coiled spring 103, the tendency of which is to keep the screw 102 in the upper end of the slotted opening of the bar 101. Projecting from the central portion of the bar 101 is a pin 104 (see Fig. 23).

At the inner end of the curved arm adjacent to the yoke side bar 59$^b$, I provide a laterally projecting pin 105 and, on the outer end or head of the pawl 98, I provide a laterally projecting pin 106.

Secured to the department latch plate 35, as indicated in Fig. 3, is the angular bracket arm 107 of a rearwardly extending trip arm 108, the latter having a bifurcated rear end, as shown more clearly in Fig. 26 of the drawing. This bifurcation embraces loosely the shaft 75. The arm 108, as indicated in the drawing, is provided in its forward portion and upper side with an upper incline which is adapted to contact with the underside of the pin 106 of the pawl 98. On the shaft 75, I fulcrum a yoke shaped frame 109, the body of which projects forwardly from said shaft and terminates adjacent to the rear sides of the lower ends of the stems of the department and initial lock plates as indicated in Fig. 5. As shown more clearly in Fig. 18, one arm of the yoke frame 109 extends rearwardly and terminates in an angular or laterally projecting head 110, the latter being bent laterally to bring the same over or in alinement with the rearwardly extending portion of an arm 111 which is also fulcrumed on the shaft 75 and which has its forward end provided with an angular slot 112 (see Fig. 3) through which projects the pin 31 of the yoke frame 28. The rear and upper end of the arm 111 is provided with a laterally projecting head, as indicated at 111ª in Fig. 18. The inner end of the yoke side bar 59ᵇ is provided with an upwardly extending arm 59ᶜ, the upper end or head of which, as indicated at 113, is in the form of an oblong cam frame, the central opening of which is in the nature of an oblong curved slot 114 having its rear end inclined (see Figs. 34 and 3 of the drawing). In constructing this cam frame head, the slotted opening 114 is bridged in its central portion and on its rear side by a back plate 115 from the central portion of which projects forwardly within the slotted opening 114 a curved rib or guide bar 116, the latter being shown partly in elevation and partly in section in Fig. 34 of the drawing. In the enlarged or thickened upper side of the cam frame I provide a vertical slotted opening 117 and within the latter I pivot near one end a pawl 118, the rear end of which is in contact with a short spring 119 projecting from a socket in the body of the frame and the forward end of which pawl is provided with a downwardly projecting tooth which normally extends within the upper portion of the slotted opening 114, this tooth or projection presenting on its rear side an inclined or curved surface, as shown.

Journaled in the upper and forward portions of the frame standards 3 and 4 is a shaft 120 with one end of which is connected a downwardly extending arm 121, the lower end of which is provided with an inwardly projecting pin 122 which extends within the slotted opening 114 of the cam frame 113. As indicated in Fig. 3 of the drawing, the normal position of the pin 122 is in the rear and lower portion of the cam frame slot.

123 represents a hook bar the forward end of which is pivoted on the frame rod 6 and the rear hook end of which normally engages the pin 122 of the arm 121. This hook bar is formed in its rear portion with an upwardly projecting yoke or keeper 124.

Journaled on the shaft 6 is a frame 125, (see Figs. 35 and 36), said frame having downwardly projecting parallel fingers 126 and 127, each of said fingers being provided at its termination with a laterally projecting lug or shoulder 128. The frame 125 also comprises a rearwardly and thence downwardly extending angular hook finger 129, the latter being provided on its outer side with a laterally curved shoulder 130.

Projecting from the rear side of the cam head 113 is a pin 113ª.

Upon the shaft 26, I mount a frame 132 which consists of a horizontal bar which extends over said shaft and parallel therewith, as indicated in Fig. 13 of the drawing, and it further consists in downwardly extending parallel arms 133, there being one of these arms for each of the segments 55 and each of said arms being provided with a journal projection 134 through which the shaft 26 passes. Each of the frame arms 134 is formed with a rearwardly projecting cam lug 135. (See Fig. 27.) One end of the frame bar 132 is united with the arm 59ᶜ of the gravity yoke 59. Extending transversely through the upper portion of the frame and connecting the standards 3 and 4 is a target or indicator shaft 137 on which are journaled the rotating targets or indicator disks which are intended to display the amount of a purchase, the initial of the salesman and the character of the sale. At the left and mounted upon said shaft 137 is an indicator or target disk 138 on which is printed at desirable intervals words corresponding with those on the keys of the department set. On the right of this department target or disk is the initial target 139 on the periphery of which is printed at intervals letters corresponding with those on the initial bank of keys, also the dollar sign. On the next three succeeding targets to the right are printed the numerals from naught to nine inclusive, these targets being the value targets and indicated at 140. On the central portion of the shaft 137, I journal a target of double width, such as indicated at 141, the latter having two parallel rows of numerals thereon from naught to nine and these numerals standing in such positions as to admit of one row thereof being read properly from the rear side of the machine and the remaining row from the front side of the machine. To the right of this double target 141, I mount on said shaft 137 successively arranged targets 142 which are numbered from naught to nine, inclusive and the same being adapted to be read from the rear side of the machine. I also provide at the right of these value targets 142 initial and department targets 143 and 144, the printed matter on which is adapted also to be read from the rear. On the central portion of each of the cylindrical or disk like targets I secure a laterally projecting pinion wheel 145 and on the outer end of each of these pinion wheels is secured a ratchet or star wheel 146. With these ratchet wheels are adapted to engage the upper ends of pawls 147 which are secured at intervals on the shaft 120. Journaled on a transverse top rod 148 are yokes 149, these yokes being of different length and each of said yokes having its downwardly extending arms terminating in gear segments 150. The teeth of the segments of the outer and longer yoke 149 engage the teeth of the pinions 145 of the two department indicator disks 138 and 144. In a like manner the pinions 145 of the initial indicator disks are connected through one of said yokes 149 and the corresponding value disks are similarly connected, with the exception of the central double disk 141. Fulcrumed on a transverse rod 151, which extends between the frame standards beneath the rear portion of the targets, are target operating levers 152, the latter being slightly angular in form and the upper arms or portions thereof terminating in gear segments 153, the latter gearing with the pinions 145, there being one of these target operating levers for each of the segments 55. The lower and rearwardly extending arm or portion of each of the target operating levers 152 is jointedly connected, as indicated at 154 in Fig. 5 with the upper end of a downwardly extending connecting bar 155, this connecting bar and the lever 152 being normally pressed forward by a spring 156 which is coiled about the pivot 154 and the ends of which engage the rear sides of said bar and lever. The lower end of each of the connecting bars 155 is provided with an angular slot 155ª. The bars 155 are connected respectively with the yoke frames 54 through the medium of pins 157 which project from said yokes through said slotted openings, said pins, as indicated in Fig. 27 of the drawing, normally extending through the lower ends of said slotted openings.

Rotatably mounted upon the shaft 26 at the right of the key board are value or amount registering wheels, there being five of these wheels shown in the present case and each of said wheels, with the exception of the one to the extreme left, having its periphery provided with sets of numbers arranged one after the other, each set comprising the numerals from naught to nine inclusive. Counting from the right to left, these registering wheels are numbered for the sake of reference, respectively 158, 159, 160, 161 and 162. The wheel 158 indicates cents from naught to nine inclusive, the wheel 159 indicates dimes from naught to nine, the wheel 160 indicates dollars, the wheel 161 tens of dollars and the wheel 162 hundreds of dollars, the latter wheel having its periphery numbered continuously from naught to ninety-nine inclusive. In constructing each of the registering wheels, it is provided on one side with a toothed flange 163, there being one of these teeth for each numeral on the periphery of the wheel. Between the numerals naught and nine I provide outwardly projecting lips 164 on the wheels 158 to 161 inclusive and on the wheel 162 one of these lips is provided between naught and ninety-nine. Each of the registering wheels is also provided on its inner side opposite the lips 164 with inwardly projecting lips 165. Embracing the forward sides of the registering wheels is the front horizontal bar 166ª of a yoke 166, the side arms of which swing on the shaft 26. As indicated more clearly in Fig. 16 of the drawing, the yoke bar 166ª is provided at intervals on its underside with springs 167. which are arranged to project from sockets in said yoke bar and against the lower ends of which springs are adapted to bear the forwardly projecting fingers 168 of curved catch bars 169, these catch bars extending between the registering wheels and having their laterally turned upper ends in position to engage the inwardly projecting lips 165 of said registering wheels. The yoke 166 is normally elevated and its bar 166ª held in contact with a transverse shaft 170 through the medium of a spring 171. As appears in Fig. 16, the wheels 15 are provided with cams 165ª which are placed just in advance of the lips 165 and upon which the fingers 169 ride so that they will pass to the rear of the lips without interfering with the forward movement of the wheels during registration.

Mounted to swing on the main shaft 26 are the inner ends of pawl carrying arms 172 (see Fig. 28) the outer end portion of each of these arms being enlarged or increased in height and being provided at its outer end and at a point at the inner end of its enlargement with oppositely located laterally projecting guide flanges 173 and 174. The upper side of each of the pawl arms 172 in its outer and enlarged portion is formed with an upwardly extending and rearwardly projecting hook finger 175. Of these pawl arms, there is one for each of the registering wheels, with the exception of the wheel to the extreme left, said pawl arms extending between said registering wheels. Each of the pawl arms 172 is provided in its outer enlarged portion with a downwardly extending curved finger 176. Extending loosely through oppositely located openings in the flanges 173 174, of each of the pawl arms is a bolt or plunger 177, the inner end of this bolt or plunger being, as indicated more clearly in Fig. 7 of the drawing, pointed and adapted to engage the teeth 163 of the corresponding registering wheel. Suitably supported above the inner portions of the pawl arms 172 is a transverse rod 178 and in rear of this rod 178 is suitably journaled a shaft 179. This rod 178 extends loosely through elongated openings 180 in the ends of the side arms of a yoke 181, these side arms being provided adjacent to the outer portion of the yoke with elongated openings 182 through which said journaled rod or shaft 179 passes. The longer bar of the yoke which extends on the outer side of the shaft 179 is formed with downwardly extending and parallel curved fingers 183 and the upper side of the side arms of the yoke 181 are provided with upwardly and inwardly projecting angular brackets 184, these brackets being connected with the shaft 179 through the medium of pins 185 which extend upward from said shaft and extend loosely through the inturned portions of said brackets.

Rigidly connected with the shaft 179 is an upwardly extending arm 186, to the outer end of which is pivoted the rear end of a forwardly extending bar 187, the forward end of which is pivoted, as indicated more clearly in Fig. 3 of the drawing at 188, to the lower end of an arm 189 which, extending upward, is, as shown in Fig. 1 of the drawing, connected with the pawl carrying shaft 120. As shown in Fig. 28 of the drawing, each of the plungers 177 has formed on its inner side, or that face which adjoins the side of the pawl arm 172, a recess 190 through which passes loosely the corresponding finger 183 of the yoke 181.

Connecting the rear portions of the standard frames above the pawl hook fingers 175 is a fixed shaft 191 which, adjacent to one of the frame standards, has journaled thereon the end bar or head piece 192 of a rocking frame 193, this frame having its remaining end journaled on said shaft and being formed with a downwardly extending hook plate 194, the inturned hook or lip 195 of which is adapted to engage the hook fingers 175 of the pawl arms. Connected with the shaft 191 is a spring 196, one end of which is connected with a pin 197 on the inner end of the frame head 192 and the remaining or outer end of which engages an inwardly projecting pin 197$^a$ of the frame standard 4. This spring 196 serves to normally retain the lower and outer portion of the frame head 192 in contact with said pin 197. With the pin 197$^a$ is pivotally connected the rear end of a forwardly and downwardly extending bar 198, the forward end of the latter having a pivotal connection at 199 with the central portion of a curved bar 200, the lower end of which is journaled on the shaft 5 and the upper portion of which extends upward on the inner sides of the laterally projecting pins 16 of the no-sale, paid out and charge department keys.

Suitably journaled in the framework of the machine above the registering wheels and arranged in the arc of a circle parallel with the arcs described by said registering wheels (see Fig. 17) are transverse shafts or rods 201. On each of these shafts is secured a bracket or block 202, these brackets being arranged out of alinement with each other one above each of the four registering wheels to the left when viewed from the front. Each of the rods 201 adjacent to its outer end has projecting downwardly therefrom a short depending trigger 203 (see Figs. 11 and 15), the rear and lower side of each of these triggers being beveled as shown.

204 represents angular bars, the lower ends of the substantially vertical arms of which are fulcrumed on the main shaft 26, one of said angular bars being thus fulcrumed between each pair of the registering wheels. The rearwardly extending arm 204$^a$ of each of these angular bars has its end portion provided with a laterally projecting pin 205 which loosely engages a notch or recess 206 in a projecting lug 207 of the corresponding bracket 202. To the upper portion of each of the vertical arms 204$^b$ of the lever 204 is fulcrumed the lower portion of a catch lever 208, the latter being provided opposite its fulcrum point with a forwardly projecting pawl finger 209 which is provided near its outer end with a downwardly projecting tooth 209$^a$ and said lever is also provided in its upper portion with a short forwardly projecting arm 210. To each of the rearwardly extending arms 204$^a$ is pivoted, as indicated at 211, a forwardly extending hook bar 212, the hook shaped forward end of which is provided on its inner side with an angular recess or notch 213 which is adapted to engage the correspondingly shaped top and forward face of the head of the catch lever 208. The above described engagement of the hook bar and catch lever head is normally retained through the medium of a coiled spring 214 which connects said hook and the lower portion of the catch lever body. It will be observed that the engagement last described also serves to elevate the pawl arm or finger 209 out of the path of the teeth of the adjoining registering wheel. In rear of its pivot point the hook bar 212 is provided with a laterally projecting pin 215, with the upper side of which contacts the rearwardly inclined lateral shoulder of a pawl bar 216, the latter being fulcrumed centrally upon a transverse frame rod 217.

In Fig. 17 of the drawing, I have shown portions of two adjoining registering wheels and we will assume that the portion nearest the eye is of the dimes wheel 159 and the remaining wheel portion the cents wheel 158. While the pawl arm or finger 209 is normally supported above the teeth of the dimes wheel, it will be observed that the pawl arm 216 has its forward and inclined portion retained in the path of the projecting lips 164 of the adjoining cents wheel. In order to normally retain the upper arm 204ª of the lever 204 and hook bar 212 in their rearmost positions, I employ a coiled spring 218 (see Fig. 11) for the outer end of each of the rods 201. One end of each of these springs is connected with the stationary framework of the machine and the remaining end portion thereof is connected with and coiled about the end of one of said rods, the tendency of said spring being to turn the rods rearwardly.

As shown more clearly in Fig. 10 of the drawing, the forward end of the side arm 59ª of the gravity yoke 59 is formed with an upwardly extending arm 219, from the upper end portion of which projects forwardly a hook finger 220. Pivoted between forwardly projecting lugs on the lower portion of the arm 219 is the lower end of a trip bar 221, the latter having its laterally projecting head 222 beveled on its forward and upper faces, as shown. The upper portion of this strip bar is limited in its outer swinging movement by a pin 223. The trip bar is normally pressed outward by a spring 224 which is contained in a hollow projection 225 on the face of said trip bar and the inner end of which bears against the arm 219. The spring actuated and normally outwardly pressed trip bar thus provided has its outer and beveled end portion retained in position to successively contact with the triggers 203 when the gravity yoke bar 59 swings downward and forward. Upon a transverse rod 229 which extends in front of the upper portion of the registering wheels are spring actuated dogs 230 (see Figs. 31 and 7). These dogs are respectively retained in engagement with the teeth of the registering wheels. I also journal on the shaft 229 a frame 226, the latter consisting of a horizontal bar 226ª which at one end is formed with a rearwardly projecting portion 226ᵇ which is in the form of an oblong frame, as shown more clearly in Fig. 17ᴬ of the drawing. This frame portion 226ᵇ projects, as indicated more clearly in Fig. 7 of the drawing, between the pawl fingers 210 and 209 of the catch lever 208. As shown more clearly in Fig. 17ᴬ, the outer end of the frame bar 226ª has formed therewith a rearwardly extending arm 227 which terminates in a rearwardly and upwardly curved finger 227ª. The underside of the forward portion of the arm 227 is recessed to form a shoulder 227ᵇ. To the outer side of the arm 227 is pivoted at 227ᶜ a latch finger 228, the upper end of the latter being recessed to form a notch or angular shoulder 228ª. The lower end portion of the finger 228, which normally depends below the body of the arm 227, is provided with an outwardly projecting flange portion 228ᵇ, the latter being adapted to contact with the shoulder 227ᵇ of the arm 227. As indicated in Figs. 7 and 15 of the drawing, the upper angular or notched end of the finger 228 normally engages the forward side of a fixed horizontal stop pin 228ᶜ.

Upon the transverse rod 170 (see Figs. 12 and 7) I mount the lower portion of an inwardly inclined spring stop plate 131, the latter being provided in its outer portion with inwardly projecting fingers 132, these fingers adapted when the said plate is pressed inward to be projected into the paths of the registering wheel lips 164.

233 represents a spring which connects the gravity bar 59 with the frame rod 29, said spring exerting a downward and forward pull on said gravity bar.

My improved cash register is furnished with a suitable form of casing which incloses the mechanism and framework herein described and which is indicated at 234 in Fig. 8 of the drawing. This casing is provided in its upper portion with oppositely located glass covered openings 235 through which the numbers on the peripheries of the indicator disks or targets may be viewed from front and rear respectively. In the forward side of the case 234 and opposite the registering wheels I provide a doorway, in the upper portion of which is suitably hinged a door 236. As indicated in Fig. 30 of the drawing, I form the casing 234 at the lower boundary of the doorway with an inwardly projecting flange 237, the latter having a central transverse recess 238 therein. To the inner side of the lid 236, I secure a lock 239, the latter having connected therewith a casing 240 in which is contained suitable counting mechanism, such as numbered disks, the numbers of which are adapted to be displayed through openings 241 in the face of said casing. This lock and counting mechanism is suitably operated by a key 242 which passes through a key hole from the outer side of the lid. The lock employed is of the character which employs two downwardly extending and flaring hook bolts 243 and an intermediate vertical bolt 244, the latter being provided in the present case with an opening 245. The hook bolts 243 are adapted, as indicated in the drawing, to engage the undersides of the separated portions of the case flange 237 and thereby lock the lid in connection with the case. Upon the shaft 5 is journaled a frame yoke 246, and as indicated in Fig. 18 of the drawing, the arm 246$^a$ of this yoke extends upward and is provided with a slotted opening in its end portion, said slot receiving loosely the pin 16 of the no-sale key stem. The remaining arm 246$^b$ of the yoke frame 246 extends horizontally above the shaft 5 and, as indicated more clearly in Fig. 30 of the drawing, is provided in its outer portion with an outwardly projecting pin 247, the latter being adapted, as indicated in said Fig. 30, to engage the opening 245 of the central lock bolt 244. Within the drawer casing 1, I provide a sliding cash drawer 248 and within the forward portion of the base plate 2 above one side of said drawer I provide a comparatively long slotted opening 249 (see Fig. 14). In rear of this slotted opening and in alinement therewith I provide upon the plate 2 an adjustable trip bar 250, through the slotted openings of which project guide pins 251, as shown. The forward end of this trip bar is formed with an inclined head 252 of a U or yoke form, as shown. Extending laterally from this head and adapted to project through the side of the machine casing 234 is an operating rod 253. Secured on the inner side of the rearward portion of the drawer is an upwardly projecting catch tooth 254, the rearward side of which is inclined. To the lower end of the lever 62 is pivoted the rearward end of a forwardly extending catch bar 255, the downturned or hook end of which is adapted, as indicated in said Fig. 14, to engage the tooth projection 254 of the drawer. The head of the catch bar 255 is provided with a transverse pin 255$^a$. In rear of the drawer and interposed between the latter and the rear end of the casing 1, I employ a coiled spring 256 (see Fig. 3). Fulcrumed on the inner and upper side of the drawer at the rear end portion thereof is a spring actuated latch bar 257, the upturned rear end of which normally projects, through the pressure of the spring 258 of said latch bar, through an opening in a transverse top plate 259, with which the rear side of the drawer is provided and also within an opening 260 in the plate 2. On the upper side of said plate 2 in rear of said opening 260, I fulcrum the rear end of an angular lever 261 one arm of which extends upwardly and forwardly in the path of the gravity yoke bar 59 and another arm of which extends within the opening 260 in position to contact with the upturned end of the catch bar 257.

Mounted on the base plate 2 of the register adjacent to one end of the machine, is the base plate 270 of a check and tape printer frame, of which 271 represents the inner vertical standard, which is provided in its forward and rear portion with upwardly extending bearing arms 272 and 273, and of which 274 is the outer frame standard which is extended upward opposite the inner frame standard arm 273. The check printer frame consists primarily in an inner frame plate 275 and an outer frame plate 276 which is parallel therewith, these frame plates terminating in their rear portions with disk like enlargements 275$^a$ and 276$^a$. Journaled in the head portions of the frame plates 275 and 276 is a transverse shaft 277. On this shaft 277 is carried between said frame plate heads (see Fig. 42) a printing and feeding roll 278, said roll having formed on its periphery suitable type projections which may indicate suitable words such as "amount purchased" "please pay cashier." At the ends of the type covered portion of the periphery of the roll 278 are feeding flanges 279 and on the outer side of the inner flange 279 I mount on said shaft 277 a gear wheel 280. The shaft 277 is provided with an extension on the outer side of the frame plate 275, on the extremity of which is loosely mounted a pinion wheel 281. This extension of the shaft 277 is formed with a notch 282 with which is adapted to engage a spring actuated pawl 283 one end of which is eccentrically connected with the inner face of the pinion 281 (see Fig. 38). Loosely mounted on a shaft 284 which extends between the side frame heads of the check printer in rear of and below the shaft 277 is a printing and feed roll 285, this roll carrying, as indicated more clearly in Fig. 55 of the drawing, a printing collar 286, the latter having type projections on its periphery, these type projections indicating the name and address of a person or firm. At the sides of the printing collar 286, the roll 285 is provided with knurled flanges 287. The shaft 284 has that portion thereof on which the roll body 285 is mounted provided with a lateral enlargement, such as is indicated at 288, and the inner end of said roll is formed with an eccentrically located recess 289 (see Figs. 55 and 56). Loose on the shaft 284 is a gear wheel 290 from which projects eccentrically a pin 291, the latter extending within said roll recess 289. The outer end of the shaft 284 carries an operating crank 292, the outwardly projecting outer arm of which contains a spring actuated plunger 293 which is adapted to enter a socket 294 in the outer frame plate 276$^a$ and, when in such engagement, prevents rotation of the shaft 284. The wheel 290 gears with the wheel 280. Journaled in front and above the center of the roll 278 is an inking roll 295, this inking roll being formed of suitable absorbent material and having its periphery in frictional contact with the faces of the type on the roll 278. 296 also represents an inking roll which is journaled above and in rear of the center of the roll 285, the periphery of which is in contact with the type faces on said printing roll.

Journaled in rear of the roll 278 is a platen roll 297 which is adapted to press a strip of paper in contact with the type on the roll 278. 298 represents a journaled platen roll which performs a similar office for the printing roll 285.

299 represents a swinging yoke which is located between the side frame plates of the check printer at a point below and in front of the roll 278, said yoke having, projecting from its upper portion, end trunnions 300 (see Figs. 42 and 52), these trunnions bearing in vertically slotted openings 301 (see Fig. 44) in the frame side plates 275$^a$ and 276$^a$. Through the parallel arms of the yoke 299 passes a transverse shaft 302, said shaft being rigidly connected with the inner arm thereof. Mounted to turn on the shaft 302 in the inner portion of the yoke 299 (see Fig. 52) is a yoke 303. The inner arm of this latter yoke is provided, as indicated in Fig. 53, with a forwardly projecting finger 304. Journaled transversely in the inner or upper portion of the yoke 303 is a spring-actuated pawl body 305, the latter being provided at intervals with downwardly projecting pawls or teeth 306 which gradually decrease in length from right to left. Mounted on the shaft 302 are four printing wheels 307, these wheels having type figures projecting from their peripheries, the type figures on each wheel running from naught to nine, as shown in Fig. 54 of the drawing. At the inner end of the set of type wheels 307 and between the pairs of the latter are mounted on the shaft 302 ratchet wheels 308 of less circumference than the wheels 307, each of said ratchet wheels being provided with a laterally projecting pin 309 through the medium of which it is secured to the adjoining type wheel. Each of these ratchet wheels has that tooth or notch which is opposite the type numeral 9 formed of greater depth than the remaining teeth or notches thereon, one of these deeper notches being shown at 310 in Fig. 53. Mounted on a rod or shaft 311, which is in rear of the pawl body 305, are depending pawls 312, the lower and hook ends of which are held in the path of the teeth of the ratchet wheels 307 through the medium of spring strips 308$^a$, said wheels being thereby prevented from reversal.

Mounted on the shaft 302 is a printing wheel 313, this printing wheel having transversely arranged on its periphery parallel rows of type projections indicating abbreviations of the names of the months of the year. This printing wheel 313 is formed with a short outward extension in the form of a ratchet wheel, such as is indicated at 314. The printing wheel 313 is also provided with an outwardly extending central tubular extension or sleeve 315, through which the shaft 302 passes loosely. On the outer end of the tubular extension 315 is carried a head or finger disk 316 on the periphery of which is printed, stamped or otherwise made to appear the abbreviations of the months of the year. Mounted on the tubular extension of the wheel 313 adjacent to said wheel is a date printing wheel 317 on which are type faces representing the numerals 1. 2. 3. This date wheel 317 is also provided with an outwardly extending tubular extension 318 which terminates in an operating head 319, the latter having on its periphery numbers corresponding with those on the wheel 317. Mounted on the sleeve or tubular extension 318 is an outer date printing wheel 320 on which appear the type numerals naught to nine inclusive. The wheel 320 is provided with a tubular extension or sleeve 321 which surrounds the sleeve 318 and which also terminates in a head 322, on the periphery of which appear the numerals corresponding with those on the wheel 320. Both the wheels 317 and 320 are formed with ratchet extensions 323 with the teeth of which and the teeth of the wheel ratchet 314 engage additional pawls 312.

Connecting the upper sides of the check printer side plates, is a bar 324, the latter being provided with a downwardly curved finger 325 which projects within the path of the finger 304 of the yoke frame 299. The outer dating wheel sleeve 321 bears in an upwardly and forwardly curved slotted opening 326 in the side frame plate 276 (see Fig. 39) and the inner end or extension of the shaft 302 passes through a similar slotted opening 327 in the side plate 275 (see Fig. 37).

In front of the numbering and dating wheel above described, I journal an inking roll 328.

As indicated more clearly in Fig. 48 of the drawing, I secure to the yoke side bar 59$^a$ a downwardly extending and forwardly curved rack plate 329, the toothed rear and lower edge of which engages the teeth of the pinion 281. I also secure to the yoke side bar, at a point above or on the inner side of the plate 329, a shorter rack or segment bar 330, the teeth of which mesh with those on the outer end of a segment 331 which is carried on one end of a transverse shaft 332 which is journaled in the check printer frame above the numbering and dating mechanism. The outer end of the shaft 332 is provided with an arm 333 from the lower end of which projects inwardly a pin 334, the latter extending loosely within a curved slotted opening 335 in the forward end portion of a bar 336. This bar 336 is pivoted at its rear end, as indicated at 337, to the check frame side plate head 276ª. The outer trunnion 300 of the yoke 299 also projects through the curved slotted opening of said bar 336. On the inner side of the lower and rear portion of the segment 331, I provide a projecting pin 338, which also projects within a curved slotted opening of a bar 339, which is shown in plan in Fig. 38 and which is partly shown in elevation in Fig. 37, this bar corresponding in construction with the bar 336. On the forward side of the segment 331, I secure the upper end of a spring bar 340, the lower portion of which extends downward in front of the curved forwardly projecting foot portion of said segment. Between this segment foot and lower end of the spring projects the outer end portion of the shaft 302.

Below the numbering and dating mechanism hereinbefore described I provide a paper guide plate 341, this guide plate being slightly bowed or curved as shown and having its forward portion provided with an upper side shearing plate 342 between which and the body of the plate 341 is formed a paper passage. As indicated in Figs. 42 and 41 the shearing plate 342 has rising from one side and adjacent to the inner end thereof a lug 343. The guide plate 341 is provided centrally on its upper side with a transverse platen bar 344 which extends beneath the numbering and dating printing wheels.

345 represents a cutting frame, the rear bifurcated end of which is pivoted to opposite sides of the guide frame 341 as indicated at 346 and the forwardly extending portion of which terminates in parallel arms 346ª.

346ᵇ indicates a spring strip, one end of which is secured to the rear and underside of the guide body 341 and the forward and free end portion of which exerts a downward pressure upon the rear portion of the cutter frame 346. The extremities of the arms 346ª are provided with outwardly projecting pins 347 (see Fig. 41).

As shown in Fig. 42 of the drawing, I secure to the vertical forward end of the body of the cutting frame 345 and between the inner ends of the arms 346ª an upwardly projecting knife or cutting blade 348, the upper edge of which is beveled or sharpened as shown. Secured to the outer face of this knife blade is an upwardly projecting guide strip or plate 349, the upper portion of the latter being inclined or curved forwardly, as shown.

350 represents an inking device which is in the form of an oblong box, as shown in Figs. 38 and 42 of the drawing, which extends in front of the inking roll 328. This inking device or casing, in addition to containing ink, is provided in its forward portion with a transverse inking pad 351 of suitable absorbent material, the upper side of which projects through a slotted opening in the upper side of said casing. At each end the ink case is formed with an upwardly projecting flange 352 (see Figs. 38 and 41) and from each of these flanges project outward an end pin 353, one of these end pins extending through a slotted opening 354 in the inner side plate 275 (see Fig. 37) and the remaining or outer pin projecting through a slotted opening 355 in the outer check printer side plate as shown in Fig. 59 of the drawing. This slotted opening 355 is provided at its forward end with an upturned arm or offset 355ª. Extending transversely across the inking case 350 at suitable separated points are ink pad dividing blades 356, these blades projecting forwardly and upwardly, as indicated in Fig. 42. The outer end of the inking case is also provided with a pin 357 which also projects through the slotted opening 355 of the check frame side plate, this latter pin having a squared outer end portion.

On the outer side of the outer frame plate 276², as indicated in Figs. 39 and 40, I provide a sliding plate 358, this plate having its upper portion provided with horizontal slotted openings 359 through which project loosely the head portions of shoulder screws 360. The plate 358 is also provided in its lower and forward portion with a forwardly projecting slotted arm 361 through which projects loosely the head of a shoulder screw 362. The lower and forward end of said plate is also provided with a downwardly extending and outwardly thickened arm 363. In the plate 358, I form a vertical slotted opening 364 which is adapted to register with the vertical arm 355ª of the frame slot 355. Through this slotted opening 364 projects the squared end of the pin 357 of the inking device. Pivoted, in rear of this pin 357, at its rear end is a short lever 365, the forward notched end of which engages the outer end portion of the pin 357. In its forward end the lifting lever 365 is provided with a downwardly projecting extension 366 which is beveled or rounded, as shown, on its forward sides. Below the rear pin 360 and the pivot pin of the lever 365, I increase the thickness of the plate 358 as indicated at 358ª. As indicated at 367, I recess the under and forward side of the plate 358, said recessed portion presenting a curved upper side from a point on the forward side of the enlargement 358ª to a point in the rear of the bottom portion of the slotted projection 361.

368 represents a stop pawl which is pivoted in its forward portion at 369 and which, normally resting upon a laterally projecting pin 370, has its outer end portion projecting over the upper boundary of the recess 367.

From the outer side of the check printer frame plate 276ᵃ I support a tape printer frame comprising inner and outer parallel side plates 371 and 372, these side plates being united in the manner hereinafter shown.

373 is a cam shaft which extends transversely through and is journaled in the forward portion of both the check and tape printer frames. On the inner end of the shaft 373, I mount loosely a pinion wheel 374 (see Fig. 48) and, on that face of said pinion which is adjacent to the outer side of the inner check printer frame plate 275 is pivoted eccentrically a spring actuated pawl 375, this pawl bearing on the periphery of a cam collar 376 on said shaft and adapted to drop into engagement with a shoulder 377 of said cam ring. On the shaft 373 adjacent to the ring 376, I secure the inner end of an outwardly extending cam finger 378. On the outer side of the cam finger 378, I mount rigidly on said shaft 373 a cam sleeve 379, the latter being provided with a tangential projection 380 which extends in a direction parallel with the finger 378. On the outer side of the cam sleeve 379, I carry on the shaft 373 a cam finger 381 corresponding in form with the cam finger 378. The cam bodies 378, 380 and 381 are contained within the space between the inner sides of the check printer side plates. On the outer side of the outer plate 276 the shaft 373 carries an angular cam body 382, the arms of which are indicated respectively at 383 and 384 in Figs. 40 and 57. On the outer side of the angular cam 383, the shaft 373 carries a cam disk 385, the latter being eccentrically supported on said shaft and having formed with its outer side an outwardly projecting boss 386 from which projects a tooth 387 (see Fig. 45). On the inner side of the tape printer frame the shaft 373 carries a cam sleeve 388 which, corresponds in form with the cam sleeve 379 and which as prescribed for the latter, is provided with a tangential arm or projection 389. On the outer end of the shaft 373 is mounted a cam finger 390 which extends substantially at right angles with the direction of projection of the cam arm 389. The cam body 388 is within the tape printer frame and the projection 390 is on the outer side thereof.

Pivoted on pins 391, which project inwardly from the upper portion of the check printer side plates 275 and 276, are the forward ends of parallel arms 392 of a platen yoke 393, the transverse rear bar of this yoke having mounted thereon a suitable platen pad 394. This platen yoke frame is normally pressed downward by springs 395. Connecting the yoke arms 392 in a transverse bar 396, the latter having secured thereon the rear portion of a spring plate 397, the inwardly or rearwardly extending portion of which extends beneath the platen head or transverse portion 393, or is adapted to contact with the outer end of the cam projection 380 of the cam sleeve 379.

In the rear end portion of the tape printer frame and between the plates 371 and 372 is journaled a guide roller 398 and in front of this roller is adjustably supported an inking case and pad 399. Through the rearwardly extending arms 400 of this inking device extends a transverse shaft 401 which projects from the enlargement 358ᵃ of the plate 358. The body of this inking device is similar in construction to the inking device 350, being provided with an upwardly projecting inking pad 402. The transverse rod 401 passes loosely through a slotted opening 403 in the inner frame plate 371, and the outer end or side of the tape printer inking device is provided with a projecting pin 404 which extends loosely through an angular slotted opening 405 (see Fig. 43), in the outer tape printer frame plate 372. On the outer side of the frame plate 372 is fixed one end of a spring strip 406, the remaining end of the latter projecting through an opening 407 in said frame side and bearing against one of the arms 400 of the inking device 399.

Journaled in the frame side plates of the tape printer is a transverse shaft 408 which, on the outer side of the inner frame plate, carries a star wheel 409 (see Fig. 45). The teeth of this star wheel are adapted to contact with a shoulder in the outer end portion of a stop pawl 410 which is pivoted to the frame plate 371, this pawl serving to prevent a backward rotation of said star wheel.

Mounted on the shaft 408 between the tape printer side plates is a feed roller of rubber or similar material 411 (see Fig. 44). Above the end portions of this roller are journaled feed idlers 412, the peripheries of which are in frictional contact with the periphery of the roller 411. On the outer side of the outer frame plate 372 the shaft 408 is provided with a thumb nut or finger piece 413.

Pivoted to the inner sides of the frame plates 371 and 372 are the forwardly extending parallel arms 414 of a swinging platen frame, upon the forward horizontal arm 415 of which is mounted a suitable platen pad 416.

In front of the feed roll 411, I provide between the check printer side plates a forwardly extending downwardly inclined plate 417.

Extending outward from the rear standard 273 of the inner frame plate of the check printer is a fixed rod 418. On the inner end of this rod or shaft 418 is loosely mounted a paper reel section 419 (see Fig. 47) this inner section consisting of a short tubular body provided in its outer portion with a peripheral flange 420, the outer end of said tubular body being formed with a half circumferential recess 420ª, said recess receiving the projection of the correspondingly shaped inner end of an outwardly extending reel section 421 which is also mounted on the shaft 418 and which in its outer portion is formed with separated flanges 422 and 423. The outer end of the reel tube section 421 is, as prescribed for the section 419, provided with a half circumferential recess 424 which receives the projecting portions of the correspondingly shaped end of an outer reel section 425, the latter consisting of a tubular body which terminates in an end flange or disk 426. The outer portion of the shaft 418 is formed with a longitudinal recess 427 therein, as indicated in Fig. 47ᴬ. Within this recess is secured one end of a spring strip 428 which, extending outward, is provided with a shoulder bend 429 which normally engages the outer side of the reel section flange 426. Upon the reel body or section 421, I mount a roll of paper 430 (see Fig. 42) and upon the outer reel body or section 425 is carried a paper roll 431.

432 represents a transverse shaft which has its inner end portion secured to and projecting outwardly from a forward extension of the check printer side plate 276 (see Figs. 38, 39 and 43). Upon the shaft 432 in its inner portion is loosely mounted a disk 434, the latter being formed with a half tubular central projection 435. This disk 434 has formed on its outer side a lateral extension in the form of a ratchet wheel 436 and with the outer side of said ratchet wheel is formed a friction disk 437.

438 represents a clutch shoe the upper side of the curved head of which is adapted to be held in frictional contact with the underside of the disk 437. This clutch shoe has a central downwardly extending arm 438ª (see Fig. 39) which bears upon a coiled spring 439 which is supported in a socket 440 formed in the lower enlarged portion of an arm 441. This arm in its upper portion is fulcrumed on the shaft 432 and is provided below its fulcrum point with a longitudinal slotted opening 442 (see Fig. 45), into which projects a pin 443 of the downwardly extending arm 438ª of the clutch shoe.

444 represents a driving arm, the inner ring shaped end of which loosely embraces the cam disk 385 of the shaft 373 and the outer end of which is pivoted to the upper end of the arm 441.

Loosely mounted on the reel shaft 432 is a reel tube 445, the recessed inner end of which engages the half tubular projection 435 of the flange 434. This tubular body 445 carries an outer end flange 446 and, as prescribed for the shaft 418, the shaft 432 is provided with an outwardly extending spring 447, the shoulder termination of which is adapted to prevent the tube 445 from slipping off the shaft 432.

448 represents a pivoted pawl the outer end of which engages the teeth of the ratchet 436 and prevents reversed rotation of the latter.

Secured to the outer reel flange 446, and extending from the inner side thereof adjacent to and parallel with the tubular body 445 is a paper binding strip 449.

Between the upper portions of the standards 272 is fixed a shaft or rod 450 (see Fig. 9). On the inner portion of this shaft are journaled the upper portion of angular printing segments 451 and on the outer portion of said shaft are journaled similarly formed printing segments 452. Of each of these groups of segments, the one to the right has formed on its lower end or printing surface type numerals running from naught to nine and representing values in cents. The next three segments to the left are similarly formed and the type numerals thereon represent respectively dimes, dollars and tens of dollars. The next segment to the left has formed thereon type initials corresponding with those on the initial keys of the register, while the printing segment to the extreme left has formed thereon type letter projections indicating abbreviations of the various departments as indicated on the department keys. The segments of the inner group 451 have their forwardly extending upper arms 451ª of varying lengths and connected with the outer end of the extensions 54ª of the yokes 54, these yoke extensions also being graduated in length as shown. The forwardly extending and upper arms 452ª of the group of printing segments 452, with the exception of the arm of the cents segment, have their outer ends connected with the corresponding arms 451ª of the check printing segments 451 through the medium of U-bars 453 which extend downwardly and rearwardly.

In order to illustrate the operation of my improved cash register and explain the utility of the various parts which have been described, we will assume that the value, initial and department keys are in their outer positions and that the cash indicating targets or wheels are so turned as to display the naught signs from both front and rear. We will further assume that a cash sale has been made amounting to five cents and that the sale is made by operator "B".

In order to properly register and indicate the amount, the initial of the operator and the character of the sale, the operator depresses in succession a five cent key, the initial key B and the cash key of the department set. On the depression of the five cent value key, the laterally projecting pin 16 of said key stem comes into contact with the inclined face of the corresponding hook finger 11 of that lock plate 23 which belongs to the cents bank or set of keys. This contact results in a slight upward movement of said lock plate, permitting the pin 16 to pass the lock plate hook and at the same time raising the lock plate pin 39 out of its seat in the recessed offset 37 of the latch plate 35. The continued inward movement of the key stem results in its projecting pin 16 exerting such pressure on the curved forward surface of the corresponding latch plate 35 as to result in forcing the latter rearward and in the pin 39 dropping into engagement with the inner or lower end of the latch plate recess 38. In this continued inward movement of the key stem the pin 16 thereof moves past the inclined head of the lock plate hook finger and said hook finger drops over and engages said pin, temporarily locking said key stem in a depressed position. The rearward depression of the latch plate above described, results, through its engagement with the yoke arm 76ᵇ (see Figs. 6 and 29) in swinging said yoke 76 rearward and the shorter arm 76ᵃ thereof becomes disengaged from the pin 57 of the segment 55 which belongs to the cents bank or set of keys. This operation will be seen more clearly by reference to Fig. 27 of the drawing, in which the yoke arm 76ᵃ is shown in engagement with the pin 57 of the dimes segment. The rearward movement of the yoke 76 above described, also results, through contact of its shorter arm 76ᵃ with the yoke 79, (see Fig. 29) in swinging the outer end portion of the spring actuated arm 80 upward and moving the slotted bar 82 upward until its upper end is in rear of the pin 16 of the no-sale key stem, thus locking the no-sale key against depression after the depression of the value key (see Figs. 3 and 29). The dropping movement of the lock plate, occasioned by its hook finger engaging the key pin above described, resulted in the lock plate arm 23ᵃ (see Fig. 18) coming into contact with and depressing the yoke 28. This depression of the yoke 28 resulted in a disengagement of said yoke with the angular projection 32 (see Fig. 21) of the initial lock plate arm 24ᵃ, thereby unlocking or releasing said initial lock plate and permitting of its being operated.

In case of an error in depressing one of the value keys and discovery of such error before the depression of an initial key, it is obvious that the mistake may be rectified without imparting a registering operation to the machine, by subjecting another value key in the same bank or set to a partial depression. Through this movement of the last mentioned key stem, the contact of its pin 16 with the hook finger of the corresponding lock plate, results in raising said lock plate sufficiently to allow the pin of the formerly depressed key to escape, through action of the key stem spring, to its outer position and, owing to the incomplete depression of the last key operated, it will also return to its normal position.

The next operation in order after the full depression of a value key is the depression of the initial key, which in the present instance we have assumed is the initial B. On the inward movement of the stem of this initial key, the initial lock and latch plates are subjected to the operation described for the corresponding value plates and the laterally projecting pin 16 of the initial key stem is engaged with the corresponding hook finger of the initial lock plate. The rearward movement of the yoke arm 76ᵇ of the yoke 76 of the initial bank, results, as described for the value key operation, in the hook arm 76ᵃ of the yoke 76 being disengaged from the projecting pin 57 of the initial segment 55, thereby permitting an operation of said segment. In the rearward movement of the initial latch plate 35 (see Fig. 21) the outward or forward swinging movement of the lower end of the lever 44, through its engagement with the arm 47 of the yoke 48, results in throwing the projecting teeth or lugs 50 of the yoke frame 48 into such position and proximity to the lower ends of the value lock plates as to prevent movement of the same. In this manner, it will be seen that, after the depression of an initial key, the value keys cannot be depressed and those previously depressed cannot be released. Owing to the fact that the hook fingers of the initial lock plate are formed blunt or without the pointed terminations, it is obvious that after one initial key has been depressed an attempted inward depression of another key in the same bank must result in the laterally projecting pin 16 thereof coming into contact with those blunt hook finger surfaces, thereby preventing an operation of a second initial key.

The department keys are normally prevented from depression through the fact that the lower end portion of the department lock plate normally engages the rear side of the yoke 33. However, the depression of the initial key heretofore described and the consequent downward movement of the lower arm or extension of the initial key lock plate results, through the contact of the latter with the yoke 33, in depressing said yoke until it is out of engagement with the lock plate extension 25ᵃ of the department bank, a key of the department bank being thus permitted to be depressed. Assuming that the department key now depressed is the cash key, it will be seen that the blocks 21 (see Fig. 19) which are above or in rear of the department key stem will be forced toward the upper and rear end of the channel piece 19 and the cash key stem allowed to be projected through the proper opening 20. Owing to the fact that the blocks 21 together with the depressed key stem, serve to practically fill the space within the channel piece 19, it is obvious that the depression of other keys of the department set is prevented. In the rearward movement imparted to the upper portion of the initial latch bar 35 through, the depression of the initial key, said latch bar, owing to its contact with the arm 126 of the frame 125, (see Figs. 5 and 36) swings said frame 125 on its shaft 6 and results in the arm 129 moving upward and contacting with and lifting the arm 124 of the hook bar 123 (see also Fig. 3). This lifting of the hook bar 123 results in its hook portion being disengaged from the pin 122 of the bar 121 which depends from the spring actuated pawl shaft 120. The bar 121 being thus released, it is free to swing upward through the action of the spring of the shaft 120 thus releasing the pawls 147 from engagement with the target wheels 146 and allowing said target wheels, through the action of the spring actuated segments 152, to be swung to points showing the zero indication on the fronts of the set of targets to the left and on the rear of the set of targets to the right. It is evident that when the cash key of the department set was depressed, the engagement of its stem pin 16 with the slotted arm 74 resulted in imparting a sufficient movement to the shaft 69 of the cash counter to cause the counter to indicate an additional unit 1.

Owing to the pivotal connection of the bracket 107 (see Figs. 3 and 26) with the department latch plate 35, it will be seen that when said department latch plate is forced inwardly by the depression of a department key, the hook arm 98 will be lifted through contact of the arm 108 with the pin 106, until said hook arm 98 is out of engagement with the end of the rack bar 85. The outer yoke 59 is now free to swing downward and forward and in its forward movement the pin 104 of the bar 101 comes into contact with the upper side of the lateral projection 94 of the bar 89, said lateral projection 94 traveling outward beneath said pin, retaining the hook arm 98 in an elevated position, while the tooth end of the pawl 99 is, through the spring 103, held in engagement with the teeth 87 on the underside of the arm 85. Through this engagement of the pawl 99 and the teeth 87, the yoke 59 is prevented from being returned to its upper or normal position until the pin 104 has passed the lateral projection 94 of the bar 89. Near the completion of the downward movement of the gravity yoke 59, said yoke comes into contact with the longer arm of the lever 261 (see Figs. 3 and 6), while the shorter arm of the latter, being thus depressed through the opening 260 in the casing plate 2, forces the spring actuated catch bar 257 out of engagement with said casing plate and permits the drawer to be moved outward by power of the spring 256. The dropping or downward swinging movement of the gravity yoke 59, results in releasing these yokes 54 from support, the segment pins 57 of which have been previously released in the manner hereinbefore described through depression of keys in the sets belonging to such segments. In this manner the released yokes 54 are permitted to descend and their segments 55 are permitted to swing upward until the notches or teeth 56 of the swinging segments engage the inner ends of the key stems which have been depressed, the degree of swinging movement thus permitted the yokes depending upon the keys depressed. In the beginning of the downward swinging movement of the yoke 59 heretofore described, the yoke arm 59$^c$ is swung rearwardly, with the result that the cam projections 135 of the frame 132, which is connected with said arm 59$^c$, are moved out of engagement with the lower ends of the target segment operating bars 155. The lower ends of these spring actuated bars 155 now swing forwardly, under tension of the spring 156, until the pins 157 are in the outer extremities of the shorter arms of the slotted openings 155$^a$. Through this engagement of the shouldered ends of the bars 155 and the pins 157 and the downward movement of the released yokes 54, the bars 155 are pulled downward with the result that, through the corresponding swinging movement of the segments 152, the targets which are geared with said segments are rotated to degrees corresponding with the degree of downward movement of the yokes 54, so as to display from the proper reading points, the amounts and indications corresponding with the value, initial and department keys depressed. The motion thus imparted to the set of targets to the left is contributed to the corresponding targets to the right, through the medium of the yokes 149 (see Fig. 6) and the engagement of the segments on the arms of said yokes with the pinions 145.

In the raising of the hook finger 123 heretofore described and the disengagement of said hook finger with the pin 122 of the bar 121, it will be seen that the bar 121 will have swung upward and rearward until the pin 122 is in the rear end and upper side of the cam frame 113 (see also Figs. 3 and 34). In the rearward swinging movement of the cam frame or head 113 before described, it will be seen that the pin 122 travels from the rear end of the slotted opening 114 over the central rib or projection 116 and past the depending tooth of the pawl 118, temporarily raising said pawl during this operation. In this manner the pin 122 is now locked in the forward and upper portion of the slotted opening 114 and the pawl 118 has again dropped to the position shown in Fig. 34.

In the downward movement of the gravity yoke 59, it will be seen that the operating lever 64 will be swung rearward and the lever bar 62 will be moved forward or outward. The rearward movement of the operating lever 64 also resulted, through the connection of the bar 66 with the counting device operating arm 68, in an operation of the lower counting device which, in Fig. 1 of the drawing, is marked with the word "Crank." The partial rotary motion imparted to the shaft 120 (see Fig. 3) resulted, through the connection of said shaft with the arm 189 and bar 187, in imparting a rearward swinging movement to the arm 186 of the shaft 179. This movement of said shaft 179 resulted also in a rearward movement of the frame 181 (see Fig. 28). In the rearward movement of this frame, it is obvious that its fingers 183, through their engagement with the lateral recesses 190 of the pawls 177, will serve to force said pawls outward until their inner ends are out of engagement with the teeth of the registering wheels. The pawl carrying arms 172 being normally supported on the yokes 54, it is obvious that those pawl carrying arms which are supported on the yokes, dropped in the manner heretofore described will descend with said yokes. In the present case, the only pawl carrying arm to descend is that which belongs to the cents registering wheel. In the downward movement of the dropped pawl 177, the parts are so arranged that the yoke which supports the arm 172 of said pawl drops a sufficient distance only to carry the pawl past a number of teeth on its registering wheel corresponding with the value mark on the key depressed. The operating lever 64 may now be pulled forward to the position indicated in Fig. 2. In the first part of this forward movement of the operating lever and in the consequent first forward movement of the cam frame of the gravity yoke arm 59$^c$, it is obvious that the pin 122 of the bar 121 will move downward in the forward end of the frame 113 and, during the continued forward movement of said cam frame, said pin will travel beneath the rib 116. It is obvious that the head of the pawl 118 will prevent a return of the pin 122 through the channel which is above the rib or flange 116. In this movement of the arm 121, it will be seen that the target pawls 147 will be thrown into engagement with the teeth of the ratchet wheels 146, thus holding the targets against rotation. Through the connection of the arm 189 (see Fig. 3) and bar 187 and the connection of the latter (see Fig. 28) with the arm 186 of the shaft 179, the frame 181 is moved inward, with the result that the pawls 177 are forced inward until their inner ends are in engagement with the teeth of the registering wheels. At the completion of the downward movement of the gravity yoke 59 heretofore described the pin 104 of the bar 101 (see Figs. 23 and 25) moved off the inner end of the lateral shoulder or flange 94 of the bar 89, thus permitting the bar 101 to drop downward until the pawl 99 is out of engagement with the underside teeth 87 of the bar 85 and the tooth or hook of the pawl 98 is in position to engage the inner teeth 86 on the upper side of the bar 85. In the lifting movement of the gravity yoke above described, it is obvious that the successive engagement of the pawl tooth 100 with the teeth 86 will continue until said pawl tooth is, as shown in Fig. 23 of the drawing, in engagement with the outer end of the bar 85, the pawl 98 thus serving to insure the full upper movement of the yoke 59 before the same can be again moved forward or downward. In the upward swinging movement of the yoke 59 and its bar 85, the pin 105 (see Fig. 23) comes into contact with the inclined projection 110 (see Fig. 18) of the arm of the yoke 109, resulting in depressing said yoke arm, raising the yoke 109 and at the same time elevating, through contact of said yoke, the lock plates 24 and 25 of the initial and department key sets, thus releasing the pins 16 of said initial and department key stems and allowing said keys to return to their normal positions. The elevation of these lock plates results in lifting the lock plate pins 39 out of the lower ends of the latch plate recesses 36, thereby permitting the spring 40 of the initial and department lock and latch plates to move said latch plates forward to their normal positions and cause the pins 39 to drop into the offsets 37 of the recesses 36.

Any attempt of the operator of the machine to hold a department or initial key in a depressed position during the raising of the gravity yoke 59 will be defeated, owing to the fact that in the forward swinging movement of the cam frame head 113, its pin 113$^a$ will, by contact with the downwardly projecting end portion of the finger 129 of the frame 125, result, through pressure of the arms 126 and 127 of said frame 125 against the latch plates of said key sets, in forcing the latch plates out, and consequently forcing said keys outward (see Figs. 5 and 36). Through the employment of the connecting lever 44 between the initial latch plate 35 and the arm of the frame 48 (see Fig. 21), the outward movement of said initial latch plate above described also results in said frame 48 being moved until its projecting lugs 50 are thrown downward and out of the way of the stems of the lock plates of the value key sets. The forward swinging movement of the cam frame 113 and the connection of its supporting arm 59ᶜ with the frame 132, results in turning said frame on the shaft 26 until the cam projections 135 thereof (see Fig. 27) exert a rearward pressure on the lower end portions of the slotted target operating arms 155, this pressure being sufficient to bring the pins 157 into the lower portion of the longer arm of the slotted opening 155ᵃ and permitting said pins to travel upward in said slots during the upward movement of the yokes 54 without lifting said bars 155. Toward the completion of the upward movement of the gravity yoke, the pin 105 (see Fig. 23) comes into contact with the inclined head 111ᵃ of the lever 111 and, through such contact and the connection of said lever with the yoke 28, (see Figs. 3 and 18) the rear portion of said yoke is swung upward thereby lifting the lock plates of the value keys and returning the value, lock and latch plates to their normal positions. In this upward movement of the yoke 28, it is obvious that the angular projection 32 of the initial lock plate stem 24ᵃ will again engage the yoke 28 preventing the depression of an initial key. In the upward movement of the yokes 54 hereinbefore described, it is obvious that the previously dropped pawl arms 172 will be elevated to their normal positions and that, in so doing, the engagement of the dropped pawls 177 with the teeth of the corresponding registering wheels will result in said registering wheels being rotated to an extent dependent upon the extent of swinging movement of said arms. In the present instance, the five cent value key having been depressed and the corresponding yoke 54 dropped and the pawl 177 having dropped over five of the teeth of the cents registering wheel, it is obvious that said wheel will be rotated until five of its teeth have passed a given point, thus indicating the numeral five on the cents wheel from the point of observation on the forward side of the machine. In the upward swinging movement of the gravity yoke produced by operation of the operating lever, it will be seen that the engagement of the catch bar 255 with the tooth or projection 254 of the drawer (see Fig. 14) will result, through the rearward swinging movement of the arm or bar 62, in the closing of the drawer. In case it is desired to leave the drawer open and not close the same at the termination of each transaction, it is obvious that the slotted plate 250 (see Fig. 14) may be moved rearward, by exerting a rearward pressure on the handle or rod projection 253, until the inclined head 252 of said bar is in such position that the laterally projecting pins 255ᵃ of the catch bar 255 will travel up the inclined face of said bar head, thereby disengaging the catch bar from the drawer projection 254 and permitting the drawer to remain in an open position during subsequent operation of the registering mechanism and permitting the drawer to be operated independently of said registering mechanism.

When a paid out or charge department key is depressed and it is not desirable to indicate the amount on the registering wheels, the projecting pin 16 of the stems of said paid out or charge keys contacting with the curved arm 200 (see Fig. 3) forces the latter together with the bar 198 rearward, swinging the yoke 192 until the angular catch plate 194 engages the undersides of the hook projections 175 of the pawl carrying arms 172, said pawl carrying arms being thus prevented from dropping or operating to produce a registration.

Assuming now that the no-sale key is depressed, it is observed that in this operation the laterally projecting pin 16 of the no-sale key comes into contact with the inclined head or upper end of the slotted bar 51 (see Figs. 20 and 3) with the result that said bar 51 is depressed together with the yoke 33, the depression of the latter causing its disengagement from the lower end of the department lock plate and permitting said lock plate and department latch plate to be operated in the manner heretofore described. The inward or rearward movement of the department latch plate consequent on the inward movement of the no-sale key, results, in the manner heretofore described, in releasing the targets and resetting the same so as to display the naught signs from the reading points and causing the department target to indicate "no sale". The depression of the no-sale key also brings the pin 16 into the path or opposite the upper end of the bar 82 (see Fig. 29) with the result that a value key cannot be depressed owing to the contact of the value latch plate pins 78 with the heads of the arms 76ᵇ (see Figs. 5, 6, and 29). In this manner the depression or operation of a value key is prevented after a no-sale key has been depressed.

I will now proceed to describe the operation of the transfer mechanism whereby amounts are transmitted from one registering wheel to another.

Assuming that the registering wheels were originally set so that the zero or naught characters thereon are displayed on the fronts of the registering wheels on a common plane, it is evident that the hereinbefore described operation of depressing the five cent key and manipulating the operating lever must have resulted in turning the cents registering wheel of the cash group until the numeral five is displayed at the point above mentioned. Assuming now that the next sale to be registered, also amounts to five cents, said five cent key is again depressed, the operating lever swinging rearward as before described. On the forward movement of the lever, the cents wheel is again rotated until an additional five cents is registered thereon or until five numerals have passed the point of observation. This additional registration and movement of the cents wheel is such as to result in the display of the naught sign at the point of observation in place of the previously displayed numeral five, owing to the arrangement of the numerals on the peripheries in groups or series of ten each. In Fig. 17 of the drawing, I have illustrated portions of two registering wheels which, for the sake of clearness in illustration, we have assumed represent cents and dimes wheels, the latter being represented by the wheel segment nearest the eye in said figure. The movement of the cents wheel hereinbefore described causes an engagement of one of its peripheral contact lugs 164 with the end of that pawl arm 216 which is arranged above the cents wheel, the point of said pawl arm passing said lug and being consequently raised thereby. The elevation thus imparted to the forward end of the pawl arm 216 results, through the downward pressure of the rear portion of said arm against the pin 215, in raising the hook end or head of the adjacent hook bar 212 out of engagement with the head of the pawl 208 allowing the lower tooth or arm 209 thereof to drop, by tension of the spring 214, into engagement with a tooth of the adjacent dimes wheel. When the operating lever is again released and allowed to swing rearward, it is obvious that the rearward swinging movement which is imparted to the spring pressed trip bar 221 (see Figs. 10 and 15) will cause the upper end of the latter to successively engage the depending triggers 203 of the shafts 201. It will be seen that the contact above described of the trip bar and depending triggers must impart partial rotations to the shafts 201. In the present instance, the partial rotation which is imparted to the first of these shafts and the consequent slight forward movement of the lever arm 204ª, is sufficient to cause the dimes registering wheel to be moved a distance of one tooth or number through the engagement of the pawl arm 209 therewith. In this manner the point of observation on the forward side of the cents wheel is made to display a cipher or naught sign, while the adjoining or opposite point on the dimes wheel will display the numeral 1, thus indicating that ten cents has been registered. In the forward movement of the lever 204 which is imparted by the tripping action or engagement of the lever 221 with the pins 203 and the consequent forward movement of the pawl arm 209 of the dropped pawl 208, the outer end portion of the pawl arm 209 engages the underside of the frame bar 226ª; this engagement or wedging action of the pawl arm between the tooth of the dimes wheel and said bar 226ª serving to insure the engagement of the pawl tooth 209ª with the tooth of the registering wheel and operating thereby to prevent any return of the pawl carrying lever 204 to its normal position. The trip bar 221 having passed the last or outer pin 203, and the upturned end of the finger 220 of the arm 219 coming into contact with the downwardly projecting portion 228ᵇ of the catch finger 228 (see Figs. 15 and 17) results in moving the upper portion of said catch finger out of engagement with the pin 228ᶜ. A continued movement of the arm 220 and its pressure on the shoulder 227ᵇ of the arm 227 results in raising the bar 226ª away from the outer end of the pawl finger 209, thus permitting the latter to be moved upward and also results in raising the frame projection 226ᵇ of the frame 226 which, through its contact with the underside of the finger 210 of the dropped pawl 208, lifts said finger until the head of the lever 212 again engages the same, the pawl thus being again latched in an elevated position. The tension of the springs 218 of the shafts 201 act, when the pawl fingers 209 are released in the manner above described, to draw the lever 204 together with the parts connected therewith rearward to their normal positions. It is evident that although I have described only the method of transfer from the cents wheel to the dimes wheel, the different sets of transfer mechanism corresponding with that above described, are operated in a corresponding manner to transfer from the dimes wheel to the dollars wheel, from the dollars to the tens of dollars and from tens of dollars to hundreds of dollars. It will be seen that in the upward movement of the gravity yoke and the consequent forward swinging movement of the arm 219, the contact of the depending pins 203 with the beveled head portion 222 of the trip bar 221 will result only in said trip bar moving outward at each contact with said pins, and that, the arm 227ª and catch finger 228 being released from engagement with the arm 220, said arm 227ª and its finger are dropped to their normal positions.

Assuming now that a number of registering transactions, such as hereinbefore described, have taken place and it is desired by the proprietor of the machine, to read the indications on the front of the registering wheels, it is obvious that it will become necessary in order to complete the registration of the last transaction to operate those transfer pawls which, through the last transaction, have been dropped into engagement with the teeth of the registering wheels. In order to properly accomplish this, connections are employed with the door 236 whereby access cannot be gained to the interior of the machine and the registrations read until the registering wheels have been moved to indicate the last transaction; and, in order to open said drawer and produce said last registration, it is first necessary to depress the no-sale key. The depression of this no-sale key (see Figs. 18 and 30) results, through the engagement of its pin 16 with the arm 246ª of the yoke 246, in swinging said yoke inward until its pin or bolt 247 is drawn out of the lock bar 244. This disengagement of the bolt 247 and lock bar admits of the proprietor turning a key in the lock 239, thereby disengaging the lock fingers 243 from the frame projection 237 and admitting of the door being opened. In the depression of said no-sale key and the consequent dropping of the gravity yoke 59, it will be seen that, in the manner heretofore described, those transfer pawls which have previously been dropped into engagement with the teeth of the registering wheels in carrying out a part of the last transaction, will be operated so that, when the lid or door is opened, the complete registrations will appear on the peripheries of the registering wheels. It will also be understood that the turning of the key in the lock 239 and the connection of said locking mechanism with the counter 240 will result, as in the operation of the ordinary mechanical counters, in displaying an additional numeral through one of the counter openings 241, said counter thus indicating the number of opening operations of the door. It now being desired to reset the registering wheels to zero, the spring plate 131 (see Figs. 12 and 7) is pressed inward until its projecting teeth 132 are in the paths of the lips or projections 164 of the registering wheels and the yoke 166 is moved downward until it contacts with the rod 5. This downward movement of said yoke, results, through the engagement of its catch bars 169 with the inwardly projecting lips or shoulders 165 of the registering wheels, in moving said registering wheels until the lips 164 are in contact with the projections 232 of the spring plate 231 and the zero signs are displayed at the reading points.

I will now proceed to describe the operation of the check and tape printing mechanism and the manner of producing records on said checks and tape of the various transactions of the machine.

In the downward swinging movement of the cents yoke 54, which was released by the depression of the five cent key of the cents bank, it will be seen that the cents printing segments 451 and 452 will be swung downward and forward until the type numeral projections five of said segments are respectively over the platen heads 394 and 416 of the check and tape printers. The depression of the initial and department keys permits, through the connection of the initial and department printing segments with the initial and department yokes 54, similar downward and forward swinging movement of said initial and department printing segments, that type initial on the initial segment corresponding with the initial on the initial key depressed and that type indication of the department corresponding with the indication on the department key depressed being thus supported immediately above said platens in said check and tape printers. In order to start the paper strip 430 of the check printer into the check printing mechanism, the end of the tape is inserted between the printing wheel 278 and the roller 297. In order to feed the paper strip a proper distance through the check printing mechanism and print the preliminary matter thereon, such as the words "Amount purchased," date, and number, before depressing the value, initial and department keys as above described, the no-sale key and the operating lever of the machine are operated the desired number of times to feed the paper strip between the rolls 278 and 297, between the former and the roll 285 and between the latter and the roll 298 thence beneath the dating and numbering printer wheels through the forward portion of the guide plate 341. In this operation the descent of the gravity yoke 59 (see Fig. 48) and its gear segment 329, results in an idle returning of the pinions 281 and 374. In the upward movement of said gravity yoke and segment, however, rotary motion is imparted to the pinion 281 and its shaft 277, resulting in the rotation of the printing roll 278, the latter by contact of its type with a strip of paper 430 simultaneously feeding said paper strip downward and printing thereon the words "Amount purchased." In passing between the printing rolls 278 and 285, the flanges of said printing rolls continue the feeding action of the paper strip, while the contact with the rear side of said strip of the type faces on the roll 285 result in producing printed matter on the back of the strip. In the next downward movement of the gravity yoke 59 and its segment 329, the engagement of the toothed segments 330 and 331 result in the downward and forward movement of the latter which, through the engagement of its spring strip 340 and the end of the shaft 302, results in forcing said shaft, and the numbering and dating printing mechanisms mounted thereon, downward and rearward to the position indicated in Figs. 37, 42 and 43, the end of the shaft 302 fitting the slotted opening 327 in the frame plate 275. In this manner the number and date printing wheels 307, 313, 317 and 320 are moved downward to such position as to bring the downwardly projecting type faces thereof immediately above the platen bar 344 (see Fig. 42). In the downward swinging movement above described of the segment 331, the arm 333 of its shaft 332 swings rearward and upward and in the latter part of this movement the pin 338 of the segment 331 and the pin 334 of the arm 333 exerts such downward pressure on the slotted bars 339 and 336 as to result in said bars forcing the outwardly projecting ends of the dating and numbering device downward to produce an imprint on the paper strip which is below the numbering and dating printing wheels.

Previous to the operation above described, the consecutive numbering wheels 307 (see Figs. 52, 53 and 54) are so set that the consecutive numbering wheel 307 to the right, has its type numeral 1 on the under or printing side of said wheel and the remaining numbering wheels to the left are so set as to bring their naught type projections on their undersides. The dating wheel 313 is, by rotation of the thumb nut 316, turned until the proper month is indicated by the type numerals on the underside of said wheel and, in a similar manner, through turning of the thumb disks or nuts 319 and 322, the dating wheels 317 and 320 are set with the proper type numeral on their undersides. It will thus be seen that in the downward movement of the dating and numbering device above described, the units type wheel 307 will print the numeral 1 on the paper strip and the wheels 313, 317 and 320 will likewise print thereon the month and day of the month.

The manner of turning the consecutive numbering wheels the distance of one type numeral at each operation and the manner of transferring from one wheel to another is well known, but may be referred to briefly. At each upward swinging movement of the numbering and dating wheel frame 299, which is imparted in the manner heretofore described, the arm 304, by contact with the hook projection 325 (see Fig. 42) results, through the engagement of the pawl or tooth 306 of the unit ratchet wheel 308, (see Fig. 52) in moving said unit wheel a distance of one tooth and consequently a distance of one type numeral thereon. The downward movement of the frame 299, which results in the contact of the arm 304 with the projections 343, operates to draw said pawl tooth backward and into engagement with the next succeeding tooth. After successively engaging the teeth of the ratchet of the unit wheel, the pawl tooth 306 finally drops into engagement with the deeper tooth 310 thereof, thus permitting the next succeeding and slightly shorter pawl or tooth 306 to drop into engagement with a tooth of the ratchet wheel of the adjoining numbering wheel. In this manner the amounts are successively transferred in tens from one numbering wheel to another.

In the opening of my description of the operation of the check and tape printers, I have described the operation of dropping the proper printing segments 451 and 452 into printing positions. Again assuming that these keys have been operated and that the operating lever has been dropped rearward, an upward movement of said lever and a consequent upward movement of the gravity yoke 59 and the yokes 54 results as follows:—In the first part of the upward movement of the gravity yoke, the engagement of the teeth of the gravity yoke gear segment 329 with the teeth of the pinion 374 (see Fig. 48) and the engagement of the pawl 375 with the shoulder 377 of the shaft sleeve 376 causes a rotation of the shaft 373. In this rotation, the contact of the projecting fingers of the cams 378 and 381 with the lateral pin projections 347 of the arms 346ª of the knife lever 345 results in raising said knife carrying lever until its cutting blade 348 shears against the end of the guide plate 341 and severs the paper strip. During the last described operation, the cam projecting finger 383 comes into contact (see Fig. 40) with the downwardly projecting nose of the bar 365, resulting in lifting the latter and, through the engagement of said bar 365 with the end projection 357 of the inking pad box 350, said ink box is elevated, causing its pad 351 to ink the faces of the type on the printing segments which are immediately above the same. The continued movement of the cam projection 383 causes its contact, immediately after the inking operation above described, with the forward side of the enlargement 358ª of the plate 358, this contact resulting in forcing said plate 358 rearward together with the inking box until the latter is in the position indicated in Fig. 42 of the drawing. The inking box being thus drawn rearward and out of the way, the cam projection 380 of the cam body 379 comes into contact with the spring strip 397 of the platen frame 392, causing the platen head 393 and its pad 394 to rise until the latter presses the paper into printing contact with the inked type projections of the operated printing segments 451. The cam projection 380 having passed out of contact with the spring 397, it is obvious that the latter together with the platen frame will drop to its normal position. It will thus be seen that the paper check or that end of the paper which has been severed from the main body of the strip may be removed from the check printer and it will further be seen that said check will have had printed on its face the words "Amount purchased", the consecutive number of the check, the date, the amount of the transaction, character of the transaction and initial of the operator. It will also be seen that the rear side of the check will have printed thereon such matter as may be indicated in type on the printing roller 285. The continued upward movement of the gravity yoke and the consequent continued rotation of the shaft 373 results in the cam finger 383 coming into contact with the downwardly extending arm 363 of the plate 358, thereby moving said plate and ink box forward to their normal positions. This continued upward movement of the gravity yoke and the corresponding upward movement of the yokes 54 results in lifting the previously dropped or operated printing segments to their normal positions and in lifting the numbering and dating mechanism to its normal or elevated position, the latter operation being attained through contact with the foot projection of the inner end portion of the segment 331 with the end of the shaft 302, this contact resulting in lifting said shaft end in the slot 327.

Prior to the operation of the check printer above described, the strip from the paper roll 431 is, in the manner indicated in Fig. 44 by dotted lines, fed downward below the roll 398, thence forward over the platen head 415, over the feed roller 411 and beneath the friction rollers 412, thence over the plate 417 to the reel 445, with which the end of said strip is connected. Simultaneously with the upward movement of the inking box and pad of the check printer hereinbefore described, the cam arm 390 of the shaft 373, (see Fig. 43) by contact with the underside of the projection 404 of the tape printer ink pad frame, raised the latter until its pad was in contact with the lower type faces of the operated printing segments 452. On the passing of the cam finger 390 out of contact with the ink pad projection 404, the latter and the ink pad frame is permitted to drop and said ink pad is moved rearwardly, owing to its connection with the plate 358, which connection is effected by the rod 401. Simultaneously with the upward printing movement of the printing platen 394 of the check printer, a similar movement is imparted to the platen 415 of the tape printer, this platen tape printer being elevated to press the paper strip 431 into contact with the inked type faces on the lower sides of the operated printing segments 452, through the contact with said platen of the arm of the cam 389, this cam being shown in an operative position in Fig. 44 of the drawing. In this manner the tape has printed thereon the amount of the transaction, the initial of the operator and the character of the transaction.

In the first half of the upward movement of the gear segment 329, the pinion 374 has imparted thereto one half of a complete revolution, imparting thereby a corresponding rotation to the shaft 373 and the cam body 385, with the result that during this first half revolution the bar 444 is moving rearwardly and the friction shoe carrying arm 441 is swung forwardly. In the remaining upward movement of the gear segment and the corresponding remaining half revolution of the shaft 373 and its cam 385, said cam operates to move the bar 444 forwardly resulting, through engagement of the shoe 438 with the disk 437, in a rotation of the reel 445, this rotation of said reel being sufficient to wind a desirable portion of the paper strip on to said reel. In connection with this last described operation, it will be noted that as the paper strip is gradually coiled or wound on to the sleeve of the receiving reel 445, the circumference of the paper rolled thereon is gradually increased, with the result that the movement of said reel necessary to take up the slack in the paper gradually decreases. By the construction herein set forth, it is obvious that when the slack in the paper is taken up and said paper strip is thus drawn taut, the clutch shoe may slip on the periphery of the friction disk 437 without rotating the reel. It will thus be seen that simple, reliable and effective means are provided for compensating for the increase in the size of the roll on the reel. During the latter part of the rotary movement above described of the cam body 385, its tooth 387 comes into contact with one of the peripheral notches of the wheel 409, (see Fig. 45) thus rotating the feed roll 411 sufficiently to move the paper strip 431 forward a desirable distance, or such distance as to bring its printed portion a desirable distance in front of the printing point. In order to draw the printed tape forward to a greater distance for the purpose of reading the last transaction printed, it is obvious that this may be accomplished by turning the thumb piece 413; thereby rotating the feed roll 411.

It being desirable to discontinue the printing of checks and use the tape printer only, the spring actuated plunger 293 (see Fig. 55) is drawn out of engagement with the frame socket 294 and the crank arm 292 rotated until the cam portion 288 of the shaft 284 is in such position as to hold the type faces and the peripheries of the flanges 287 of the roll 285 out of frictional contact with the roll 278. By thus throwing said printing roll 285 out of frictional engagement with the roll 278, it is obvious that the paper strip 430 will fail to feed through. It is obvious that in case it is not desired to print the tape, the paper strip 430 may be disengaged from the feeding mechanism of the tape printer.

It will be observed in the foregoing specification and in the drawings that the order in which the keys are arranged and that the mode of operation provide for a certain predetermined order of key depression. I do not wish to be confined to any particular order, however, because it is obvious that the keys may be arranged to suit the requirements of any business, that is to say, the order as shown may be reversed without changing the principle of the invention—in which event the transaction setting element and initial setting element would precede the value setting element—or the value keys can be placed in the middle, with the transaction and initial elements on each side as preferred, and as shown in my Patent No. 992,128, and co-pending application 341,897, but in this application the order shown is the same as that in my co-pending applications 735,748 and 59413, the primary object being, in every case to compel the complete and proper use of the machine, and to prevent its incomplete and improper use, and for this purpose I provide interlocking means to compel the use of a setting element of each class before the departmental segregation is effective.

Heretofore all department elements of cash registers have been ineffective for the purpose of compelling a correct indication, registration and printed record of each commercial transaction, because thereon and therein it is possible to create foolish indications and records, such as No Sale $5.00 and Recd on a/c—0.00. I believe that I am the first in the art to provide means which compel a registration, indication and record in figures—letters and words, or in numbers—initials and characters, therefore I do not wish to confine myself to the devices herein shown as it is obvious, as shown in my co-pending applications, that the principles involved are of wide application, therefore I desire to claim the same broadly as follows:

1. In a keyboard mechanism, a series of value keys, a series of initial keys and department keys, and locking means to prevent the depression of a department key until a value key and an initial key have been depressed.

2. In a keyboard mechanism, a series of value keys, a series of initial keys and normally locked department keys, and locking means controlled by the initial keys to unlock the department keys and to prevent the release of the value keys after an initial key has been depressed.

3. In a keyboard mechanism, a series of value keys, a series of initial and department keys, and locking means controlled by the department keys to prevent the release of either the initial keys or value keys after an initial key has been depressed and before a department key has been depressed.

4. In a cash register, a bank of value keys, a bank of initial keys, a bank of department release keys, cross-pins on each of said keys, interfering means adjacent said department bank of keys engaging the cross-pins thereon to hold said keys normally against depression, said interfering means being removed only by the depression of both a value key and a clerk's initial key.

5. In a cash register, a bank of value keys, a bank of clerks' initial keys, a bank of department release keys, and a detent plate normally interfering with the depression of said release keys until both a value and an initial key are depressed.

6. In a cash register and recorder of the class described, comprising value keys, clerks' initial keys, and department release keys, the combination with interlocking mechanism for the same, of selective means to compel the depression of both a value key and a clerk's initial key before a department release key can be depressed to effect a registration.

7. In keyboard mechanism, three or more banks of keys, and interlocking mechanism connecting said banks of keys, said mechanism operating upon the depression of a key in any one bank to unlock the keys in one of the other banks.

8. In a cash register, a plurality of groups of keys, and locking devices controlled by the keys of one group to lock the keys in one of the other groups and to unlock the keys in still another group.

9. In a keyboard mechanism, a plurality of parallel rows of keys, and interlocking mechanism connecting said rows whereby the depression of a key in an inner row locks the keys in the row on one side thereof and unlocks the keys on the opposite side thereof.

10. In a keyboard mechanism, a plurality of groups of keys, one of which is normally unlocked and mechanism connecting the said groups whereby the depression of a key in the unlocked group unlocks the keys in the adjacent group, and the depression of a key in that group unlocks the next adjacent group and locks the keys in the first mentioned group.

11. In a cash register, the combination of a normally locked cash drawer, a plurality of groups of keys, and means requiring the depression of a key in three of said groups before the drawer can be unlocked.

12. In a keyboard mechanism, the combination of a series of value keys and initial keys, and locking means controlled by the initial keys whereby the operation of an initial key locks into operative position both the initial and value keys that have been depressed.

13. In a keyboard mechanism, a series of numbered or value keys, a series of initial and department keys, and locking means whereby a department key cannot be depressed until both a value key and an initial key have been operated.

14. In a cash register, a registering device, a series of value keys for controlling the same, a series of initial keys and a series of department keys, means for preventing the operation of the registering device until a department key has been operated, and locking means requiring the depression of both a value key and an initial key before a department key can be depressed.

15. In a cash register, the combination of a series of value keys, a series of initial and a series of department keys, with locking mechanism to prevent the operation of a value key and to permit the operation of a department key after an initial key has been operated, and means to prevent the simultaneous operation of more than one department key.

16. In a cash register, indicating devices, value, initial and department keys adapted to control the movement of said devices, a normally closed cash drawer, and means requiring the operation of one of each of the said keys to release the drawer.

17. In a cash register, a value key, a clerk's key, a transaction key, and interlocking means between said keys for preventing their depression in other than a predetermined order.

18. In a cash register, a normally closed cash drawer, a no-sale key, means for opening the drawer upon the depression of the no-sale key, and mechanism for forcing the no-sale key into normal position as the drawer is closed.

19. In a cash register, the combination with a series of numbered or value keys, of a series of initial and department keys, interlocking mechanism between the value, initial and department keys, requiring their operation in a certain sequence and mechanism to force the initial and department keys into normal position before another registration can be made.

20. In a registering device, normally locked register operating mechanism, a series of value keys for controlling the registering device, a special key for releasing said mechanism, and means operated by said mechanism for positively forcing the said key back to its original position.

21. In a cash register, a normally locked cash drawer, a special key for releasing said drawer, and means for positively forcing the said key back to its original position as the drawer is closed.

22. In a cash register, registering and indicating devices, a normally closed cash drawer that is adapted to be moved in and out without operating the said devices, value, initial and department keys, and means requiring an operation of one of each of said keys to release the drawer before a registration can be made.

23. In a cash register, the combination with a registering mechanism comprising adding wheels and devices for rotating the latter, of a lever through which the operation of the registering mechanism is attained, a sliding cash drawer and a detachable connection of said cash drawer and the adding wheel operating lever, whereby the drawer may be operated by the lever, or may be left unoperated when the lever is operated.

24. In a cash register, the combination with a registering mechanism comprising pawl operated rotating adding wheels and a swinging frame through the movement of which, motion is contributed to said adding wheels, of a sliding cash drawer and means whereby said swinging frame may engage with, or be disengaged from said drawer.

25. In a cash register, a normally closed cash drawer means for locking said drawer in closed position, a series of register operating devices, value keys adapted to determine the movement of the register operating devices, initial keys to identify the clerk operating the register, locking devices connecting the value and initial keys, department keys for identifying the nature of the transaction, means for unlocking the cash drawer when the key of each kind is depressed, and an operating lever adapted to restore the register operating devices to normal position without closing the drawer.

26. In a cash register, indicator and recorder of the class described, a series of operating yokes, one or more sets of type connected thereto, means for supporting a roll of paper, a printing mechanism, a feeding mechanism, springs for setting the operating yoke, and type carriers, a hand lever for returning the same to normal position and a drawer adapted to be actuated by the said main lever.

27. In a cash register, the combination with a series of value initial and department keys, of printing mechanism adapted to print either a strip or check or both, and locking means controlled by the department keys to prevent the operation of the printing mechanism until the depression of a value key has been followed by the depression of an initial key.

28. In a cash register, the combination with a series of value initial and department setting elements, of a printing mechanism adapted to print a strip or check or both, and means to compel the operation of each of the setting elements before the printing mechanism can print the value, initial and nature of the transaction.

29. In a cash register, the combination with a series of value initial and department setting elements, of a printing mechanism adapted to print a strip or check or both, and means to prevent the printing mechanism from printing the value initial and nature of a transaction until each setting element has been operated.

30. In a cash register, the combination with a series of value department and initial keys, of printing mechanism adapted to print a record of the transaction upon a strip and at the same time produce a check with said record thereon and locking means controlled by the department keys to prevent the complete operation of the printing mechanism until the depression of a value key has been followed by the depression of an initial key.

31. In a cash register, the combination with a series of value department and initial keys, of printing mechanism adapted to print either a strip or check or both, and locking means controlled by the department keys to prevent the complete operation of the printing mechanism until the depression of a value key has been followed by the depression of an initial key.

32. In a cash register, indicator and recorder of the class described, a series of operating yokes, one or more sets of type connected thereto, means for supporting a roll of paper, a printing mechanism, a feeding mechanism, springs for setting the operating yokes and type carriers, a normally locked hand lever for returning the same to normal position, and selective means for releasing the lever.

33. In a cash register, the combination with a series of value initial and department keys, of a printing mechanism adapted to print either a strip or check or both, locking means controlled by the initial keys to lock the operated value and initial keys in their operated positions and prevent the operation of the printing mechanism until a department key has been operated.

34. In a cash register, the combination with a series of value setting elements, a series of department setting elements and a series of initial setting elements in the order named, a printing mechanism adapted to print either a strip or check or both, locking means controlled by the initial setting element to prevent the complete operation of the printing mechanism until each of the setting elements has been operated.

35. In a cash register, the combination with a series of value setting elements, a series of initial setting elements and a series of department setting elements in the order named, a printing mechanism adapted to print either a strip or check or both, locking means controlled by the department setting elements to prevent the complete operation of the printing mechanism until each of the setting elements has been operated.

36. In a cash register, the combination with a series of value setting elements, a series of initial setting elements, and a series of department setting elements, of a printing mechanism comprising a check printing device or a tape printing device or both, adapted to print either a check or tape or both, means to prevent the complete operation of the printing mechanism until each setting element has been operated.

37. In a cash register, the combination with a registering mechanism, a series of value initial and department keys, and swinging yoke frames for each series, of a check printing mechanism and a tape printing mechanism each comprising movable inking devices and movable platens, paper feed, supply and receiving rolls, a set of swinging printing segments for each of said printing devices, said printing segments being connected with, and controlled by, extensions of said swinging yoke frames and the extent of movement of said yoke frames being governed by the keys depressed.

38. In a cash register, the combination with a frame-work, sets of depressible value initial and department keys, a swinging yoke frame for each set of said keys, journaled printing segments connected with extensions of said yoke frames and mechanism between the keys and swinging frames which control the movement of the latter and of the printing segments, a swinging gravity yoke frame 59 and a toothed bar 329 extending therefrom, of a printing mechanism comprising printing rolls, inking devices, paper feed mechanism, a platen and a gear connection between said printing mechanism and said toothed bar whereby the swinging movement of the latter operates the former.

39. In a cash register, the combination with a registering mechanism, a series of value initial and department keys and swinging yokes controlled by said keys and swinging printing segments controlled by extensions of said yokes, of a check printing device comprising feed and printing rolls a fulcrumed platen, an inking device, a paper strip cutting device and paper reels and means connected with the register mechanism for operating the same, said check printing mechanism being adapted to print checks indicating the value initial and department keys depressed.

40. In a cash register the combination with a registering mechanism, a series of value initial and department keys and yoke frames therefor controlled by said keys, and printing segments controlled by extensions of said yoke frames, of a printing mechanism comprising feed and printing rolls, a fulcrumed platen, inking device, paper strip cutting device and paper reels said printing mechanism being adapted to be operated by the register mechanism and one of the feed and printing reels adapted to be thrown out of operative position to prevent the feeding of a paper strip through said printing device.

41. In a cash register, the combination with a registering mechanism sets of depressible keys, a swinging frame for each of said key sets and an outer swinging gravity frame and swinging printing segments controlled by the register mechanism, of a printing mechanism comprising paper feed rolls, a paper cutting device, a fulcrumed platen and inking mechanism and a journaled shaft 273 having cam projections thereon, a gear connection between said cam shaft and said gravity frame, said shaft cam projections being adapted to operate the paper cutter platen and inking devices.

42. In a cash recorder, an operating device, a gear segment moved by said operating device, a shaft turned by said segment, type carriers, an inking device, a platen, and cams on said shaft for operating the inking device and then the platen.

43. In a tape printing device, the combination with a printing mechanism, of a journaled tape receiving reel, a disk carried thereon, a spring actuated brake shoe contacting with the periphery of said disk and means for imparting motion to said shoe.

44. In a tape printing device, the combination with printing mechanism, a journaled tape receiving reel, of a friction disk on said reel, a swinging arm 441 and a spring actuated brake shoe carried on said arm.

45. In a combined check and tape printer, a series of movable printing segments for each printer, a swinging platen and a paper feed roll for each printer, a single shaft having cam projections which operate the platen and the feed rolls and means for rotating the shaft.

46. In a cash register, the combination with a main operating lever adapted to be operated at will by the closing of the drawer or by hand with the drawer open, of a series of yokes arranged to be operated thereby, means for limiting the movements of the yokes, a series of type carriers, and means for maintaining an unbroken connection between the yokes and the type carriers so that the said carriers move positively with the yokes in both directions.

47. In a combined register, indicator and recorder, having reciprocating depressible setting keys for values, initials and departments, one or more sets of type, means for supporting a roll of paper, a printing mechanism, a feeding mechanism, and a hand lever for operating both of said mechanisms.

48. In a cash register, indicator and recorder of the class described, a series of operating yokes, one or more sets of type connected thereto, means for supporting a roll of paper, a printing mechanism, a feeding mechanism, springs for setting the operating yokes and type carriers, a main lever for returning the same to normal position, and a handle for operating the main lever.

49. In a cash register, a set of value and a set of special keys, means for locking the keys in either set when depressed, means for operating the cash register, and mechanism operated by the said means for first releasing the special and then the value keys.

50. In a cash register, a set of value and a set of special keys, means for locking the keys in either set when they are depressed, an unlocking device common to the locking devices of the keys of both sets, and means for moving the unlocked device, the latter being adapted to first unlock the initial and then the value keys.

51. In a cash register having an operating mechanism, a set of special and a set of value keys, means for locking the keys in either set in their operated position, means for unlocking first the special keys and then the value keys and means for positively forcing the special keys to their normal positions when the operating mechanism is restored to its normal position.

52. In a cash register, a series of adding wheels, mechanism for turning said adding wheels, a series of value keys coöperating with said mechanism to determine the extent of movement of said wheels, a no-sale key, an operating device for said mechanism, means for normally locking said device, means for unlocking the said device when the no-sale key is depressed, and means for positively forcing the no-sale key outwardly as the said operating device returns to its normal position.

53. In a cash register, a registering device, means for normally concealing the registering device, a lock bolt for normally holding said concealing means in its operative position, means for holding said lock bolt against movement, a special key for releasing the lock bolt so that it may be moved to release the concealing means, and a register operated by the lock bolt.

54. In a cash register, a registering device, an indicating device, locking means for holding the indicating device when set, a series of value keys for determining the extent of the movement of the indicating device, a series of initial keys, means controlled by the initial keys for releasing the indicating device and means for preventing the operation of an initial key until after a value key has been operated.

55. In a cash register, the combination with a set of oscillatory indicators and gear segments controlling the movement of the same, of series of depressible keys, swinging frames 54 the extent of movement of which is governed by the keys depressed, arms 155 having angular slots in their lower portions which loosely engage projections on said swinging frames, said arms 155 connected with the indicator operating segments and a swinging frame 132 having cam projections 135 adapted when the frames 54 swing upward to exert pressure on the lower portions of said arms 155, substantially as specified.

56. In a cash register, a cabinet, a lid for said cabinet, a special key, a lock for said lid, mechanism requiring the operation of said key before the lid can be unlocked, and a counter for registering the operations of the lid lock.

57. In a cash register, a registering device, means for normally concealing the registering device, a lock bolt for normally holding said concealing means in its operative position, means for holding said lock bolt against movement, and a special key for releasing the lock bolt so that it may be moved to release the concealing means.

58. In a cash register, a register operating mechanism, a register device, transfer devices for said registering device, means for normally holding the operating mechanism against movement, means for normally concealing the registering device, a lock bolt for holding the concealing means in its operative position, means for holding the lock bolt against movement, and mechanism for releasing the register operating mechanism and the lock bolt so that transfer can be effected and so that the register concealing means can be unlocked.

59. In a cash register, the combination with a registering mechanism, sets of depressible keys controlling the operation of said registering mechanism and a no-sale key comprised in said sets, of a cabinet or case for said mechanism, a doorway therein and lid therefor, a lock for said lid and connections between said lid lock and the no-sale key whereby said lid cannot be operated without depressing the no-sale key.

60. In a cash register, the combination with a registering mechanism comprising a series of adding wheels and means for normally retaining the same locked against rotation and a depressible no-sale key, of a case or cabinet for said mechanism, a doorway and lid therefor, a lock for said lid, connections between said lid lock and said no-sale key and connections between said no-sale key and the adding wheels locking mechanism whereby the depression of said no-sale key releases the adding wheels and permits the opening of the case lid, substantially as specified.

61. In a cash register, the combination with a registering mechanism and sets of depressible keys, of a casing or cabinet for said mechanism, a doorway or lid therefor, a combined lock and counter for said lid, said lock provided with a downwardly extending bolt 244 which when in its outer position prevents the unlocking of the lock mechanism, a swinging frame bar 246 having a finger 247 which normally engages an opening in said bolt 244 and a connection between said bar 246 and one of said depressible keys whereby the depression of said key swings said frame 246 and releases said finger 247 from said lock bolt.

62. In a cash register, the combination with a series of rotatable adding wheels, and mechanism for retaining said adding wheels normally locked, of a series of department keys and mechanism between said department keys and said adding wheel locking mechanism whereby a depression of either of the department keys releases said adding wheels.

63. In a cash register, the combination with a registering mechanism, a series of value keys and a special or no-sale key, the latter having a laterally projecting pin 16, of a key locking mechanism journaled frames 76 having arms 76ᵇ, a spring actuated yoke frame 79 adapted to press said arm 76ᵇ into engagement with said key locking mechanism, a vertically movable bar 82 having a jointed connection with said yoke 79, the upper end of said bar adapted to be projected in the path of the no-sale key pin 16 by a depression of a value key, substantially as specified.

64. In a cash register, a registering device, an indicating device, value keys for determining the movement of said devices, means for normally holding said register and indicating devices against operation, a special key for releasing the indicating device and another special key for releasing the registering device.

65. The combination of a toothed wheel, a pivoted lever, a reciprocating bolt mounted on said lever for turning said wheel, a reciprocating arm normally engaging said bolt to lock the same into engagement with the adding wheel, and means for moving the said arm and bolt out of engagement with the wheel upon the depression of a release key.

66. In a cash register of the class described, the combination with a registering mechanism, of operating levers for the same, bolts mounted on said levers, operating arms for moving said bolts into engagement with the registering mechanism, and oscillating devices for said operating arms adapted to hold said operating bolts in contact with the registering mechanism until after the registering mechanism has come to rest, whereby overthrow of the register mechanism is prevented.

67. In a cash register, the combination with a register comprising a series of adding wheels, of operating levers therefor, bolts mounted on said levers, arms for moving said bolts positively out of engagement with the adding wheels upon the initial movement of the operating levers, and positively into engagement with said wheels upon the return of said levers to normal position.

68. In a cash register, the combination with a register, comprising a plurality of wheels having ratchet teeth formed in their peripheries, of locking bolts engaging said ratchet teeth, an operating mechanism for effecting the advance and retraction of said bolts, and means connected to said operating mechanism, arranged upon its initial movement to unlock said bolts from the ratchet teeth and to relock the same in the ratchet teeth during the entire advance movement of the wheels.

69. In a cash register, the combination with register ratchet wheels, of oscillatory bolt carriers bearing reciprocating bolts to engage and advance said wheels and an operating device normally locking each bolt and carrier to its respective wheel, said operating device upon its initial movement effecting the retraction of the bolts from the wheels and subsequently advancing the bolts to turn the wheels.

70. In a cash register, the combination of register ratchet wheels, oscillatory bolt carriers with sliding bolts to engage and operate said wheels, an operating device normally locking the bolts to the wheels and adapted to effect the initial retraction and subsequent advance thereof, into engagement with the wheels, a series of actuators, one for each of the bolts, means for displacing the operating device as a preliminary to retraction of the bolts, and retaining said operating device so displaced during such retraction of said bolts, with provisions for effecting the restoration of the operating device to lock the bolts into engagement with the ratchet wheels during the entire advance movement of the bolts and wheels.

71. In a cash register, the combination of register ratchet wheels, oscillatory bolt carriers with sliding bolts to engage and operate said wheels, an operating device normally locking the bolts to the wheels, and adapted to effect the initial retraction and subsequent advance of said bolts, into engagement with the wheels, a reciprocating frame carrying the operating device and displacing the latter as a preliminary to retraction of the bolt carriers, means for reciprocating said frame to displace said operating device and retaining the frame in its displaced adjustment during the retraction of the bolts, and means controlled by the operating mechanism for returning said frame and locking bolts to normal position.

72. In a cash register, the combination with ratchet registering wheels, carrying arms with bolts normally engaging the ratchets, a series of yokes, a main actuating lever for said yokes, all mounted concentrically, and a rod actuated frame for disengaging said bolts from and engaging said bolts with the registering wheels.

73. In a cash register and recorder, the combination of register ratchet wheels, oscillatory carriers bearing reciprocating bolts to engage and advance said wheels, a frame arms on said frame for effecting the retraction of the bolts and the subsequent advance thereof to turn the wheels, and means for reciprocating said frame.

74. In a cash register, the combination of register ratchet wheels, oscillatory carriers bearing sliding bolts to engage and advance said wheels, operating devices for effecting the retraction of the bolt carriers and the subsequent advance thereof to turn the wheels, a reciprocating frame for displacing the operating devices, as a preliminary to retraction of the bolt carriers, and means for reciprocating said frame to disengage the bolts upon the initial movement of the oscillatory carriers and to reëngage said bolts upon returning the frame to normal position.

75. In a cash register, the combination with series of depressible keys, numbered and toothed adding or registering wheels, swinging yokes 54 and mechanism whereby the extent of movement of said yokes is governed by the keys depressed, of fulcrumed pawl carrying arms 172 supported on said yokes, a sliding bolt or pawl 177 mounted in each of said arms and having its inner ends adapted to engage the teeth of one of the registering wheels, a frame 181, means for imparting an outward and inward movement thereto and fingers 183 carried on said frame and coöperating with said bolts or pawls for the purpose described.

76. In a cash register, a registering wheel, a pivoted lever, a normally locked bolt carried by said lever for advancing the register wheel, an operating arm adapted to lock said bolt to the register wheel, a series of release keys, means operated upon the depression of any of said keys for moving the operating arm to free the normally locked bolt from its register wheel, substantially as described.

77. In a cash register, the combination with a series of adding wheels and an indicating mechanism a series of value, initial and department keys, interlocking mechanism requiring the operation of said keys in sequence, locking means under control of certain department keys to prevent adding the amount indicated.

78. In a cash register, the combination with series of depressible keys, numbered and toothed adding or registering wheels, swinging yokes 54 and mechanism whereby the extent of movement of said yokes is governed by the keys depressed, fulcrumed pawl carrying arms 172 having hook projections 175, bolts or pawls 177 carried on said arms and adapted to engage the teeth of the registering wheels and means for moving said bolts in and out of such engagement, of a fulcrumed catch bar 194 and connections between the latter and certain keys whereby the depression of such keys results in said bar 194 being thrown into engagement with the hook projections 175 of the pawl arms 172, substantially as specified.

79. In a cash register, the combination with a registering mechanism, a swinging yoke frame 59 adapted on its upward movement to operate the registering devices, an operating lever connected with said frame 59 and an arm 85 extending from said frame 59 and having its upper and lower sides toothed, of a pawl mechanism comprising pawl fingers 98 and 99 adapted to engage respectively with the upper and lower teeth of said arm 85 and respectively insure the complete elevation of said frame 59 and a complete downward movement thereof on the operation of the lever, substantially as specified.

80. In a cash register, indicator and recorder of the class described, the combination with value, clerks' and department release keys, of a series of yokes, a hand lever, a normally locked main operating lever, a latch for holding the main operating lever, and means under control of the release keys adapted upon depression to positively unlock the main operating lever.

81. In a cash register, indicator and recorder of the class described, the combination with value, clerks' and department release keys, of a series of yokes, a hand lever, a normally locked main operating lever, a latch for holding the main operating lever, and means under control of the hand lever for positively locking the main operating lever in normal position.

82. In a cash register, the combination with an operating mechanism, of a no-sale key, a register, devices for turning the register to zero, transfer devices, and means for preventing the operation of the turn-to-zero devices until after the depression of the no-sale key.

83. In a cash register, the combination with a normally locked operating member of, a series of value setting elements, a series of initial setting elements, a series of transaction setting elements, and a series of unit counters to show the number of times each transaction setting element has been operated, and means to compel the operation of each setting element before the normally locked operating member can be used to operate the register.

84. In a cash register, the combination with a normally locked operating member of, a series of value setting elements, a series of initial setting elements, a series of transaction setting elements, and a series of unit counters to show the number of times each transaction setting element has been operated, and means to prevent unlocking the normally locked operating member until each of the setting elements has been operated.

HENRY S. HALLWOOD.

In the presence of—
C. C. SHEPHERD,
A. L. PHELPS.